US006887333B1

(12) United States Patent
Kessler et al.

(10) Patent No.: US 6,887,333 B1
(45) Date of Patent: May 3, 2005

(54) SYSTEM AND METHOD FOR ENVIRONMENTALLY CLEANING A PACKAGE FOR A HEAT TRANSFER DECORATING MACHINE

(75) Inventors: Leonard J. Kessler, Reading, OH (US); Ignatius S. Yee, Cincinnati, OH (US)

(73) Assignee: Jefferson Smurfit Corporation, Cincinnati, OH (US)

( * ) Notice: Subject to any disclaimer, the term of this patent is extended or adjusted under 35 U.S.C. 154(b) by 0 days.

(21) Appl. No.: 10/389,196

(22) Filed: Mar. 14, 2003

(51) Int. Cl.[7] .......................... B44C 1/165; B65C 9/00; A23L 3/00; B08B 3/00; B08B 5/00

(52) U.S. Cl. ...................... 156/230; 156/238; 156/240; 156/272.2; 156/540; 156/542; 156/DIG. 24; 426/234; 426/392; 426/407; 134/72; 15/309.2; 15/319

(58) Field of Search ................................ 156/230, 234, 156/235, 238, 240, 241, 277, 289, 272.2, 540, 379.9, 541, 542, 552, 580, 583.1, DIG. 24, DIG. 33, DIG. 36, DIG. 38, DIG. 44; 426/131, 234, 392, 397, 407, 408; 134/72; 15/300.1, 302, 303, 309.2, 319

(56) References Cited

U.S. PATENT DOCUMENTS 3,660,910 A * 5/1972 Evans et al. .................. 34/60
4,173,508 A * 11/1979 Lind .......................... 156/499
4,180,105 A 12/1979 Harvey ....................... 141/165
4,239,569 A 12/1980 Harvey ....................... 156/156
4,275,856 A 6/1981 Harvey .................... 242/75.44
4,290,519 A 9/1981 Harvey ....................... 198/483
4,806,197 A 2/1989 Harvey ....................... 156/449
5,028,293 A 7/1991 Harvey ....................... 156/449
5,173,988 A * 12/1992 Bhatia et al. ............. 15/309.2
5,188,696 A 2/1993 Good, Jr.
5,259,912 A 11/1993 Cline
5,306,382 A 4/1994 Pichel et al.
6,098,689 A 8/2000 Fiwek ........................ 156/540

* cited by examiner

*Primary Examiner*—Jerry A. Lorengo
(74) *Attorney, Agent, or Firm*—Brinks Hofer Gilson & Lione

(57) ABSTRACT

A heat transfer decorating machine is disclosed. In particular, the disclosed heat transfer decorating machine provides mechanisms to allow the machine to be rapidly re-configured from applying labels to a particular article configuration to applying labels to a different article configuration by an operator without substantial use of tools. In addition, the disclosed heat transfer labeling machine features a distributed drive system which provides a motor for all major movable mechanical elements rather than use a centralized drive system with a distributed transmission. Further, the disclosed heat transfer decorating machine is capable of labeling filled and chilled articles by providing for removal of environmental contamination prior to application of the labels.

45 Claims, 34 Drawing Sheets

SYSTEM AND METHOD FOR ENVIRONMENTALLY CLEANING A PACKAGE FOR A HEAT TRANSFER DECORATING MACHINE

REFERENCE TO RELATED APPLICATIONS

The following co-pending and commonly assigned U.S. Patent Applications have been filed on the same date as the present application. These applications relate to and further describe other aspects of the embodiments disclosed in the present application and is herein incorporated by reference:

U.S. patent application Ser. No. 10/389,008, "SYSTEM AND METHOD FOR CONFIGURING A HEAT TRANSFER DECORATING MACHINE FOR DIFFERENT PACKAGE CONFIGURATIONS", filed herewith; and U.S. patent application Ser. No. 10/389,001, "DISTRIBUTED DRIVE SYSTEM AND METHOD FOR A HEAT TRANSFER DECORATING MACHINE", filed herewith.

REFERENCE TO APPENDIX

Appendices A and B are included herein. Appendix A includes an exemplary configuration for a programmable logic controller according to one embodiment. Appendix B includes an exemplary programming configuration for a motion controller according to one embodiment. The included files of Appendix B are:

| Creation Date | File Size (bytes) | File Name |
|---|---|---|
| 03/07/2003 | 64,386 | MAIN.bas |
| 02/21/2003 | 14,899 | PDP_COMM.bas |
| 03/10/2003 | 6,716 | platen curve.txt |
| 02/24/2003 | 329 | SERVO_RESET.bas |
| 03/07/2003 | 432 | STARTUP.bas |
| 03/04/2003 | 10,867 | WM1_DANCER.bas |
| 03/04/2003 | 25,858 | WM1_MAIN.bas |
| 03/04/2003 | 1,402 | WM1_MROLL.bas |
| 03/05/2003 | 3,412 | WM1_REGIST.bas |
| 03/03/2003 | 10,853 | WM2_DANCER.bas |
| 03/05/2003 | 25,837 | WM2_MAIN.bas |
| 03/02/2003 | 1,364 | WM2_MROLL.bas |
| 03/05/2003 | 3,429 | WM2_REGIST.bas |

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Numerous decorating techniques are known in the art, some of which include the application of a label onto a hollow article to be decorated. One of the techniques which is desirable in this type of decorating is the usage of a heat transferable label which includes a decorative predetermined design thereon and may thus be transferred onto the article or container being decorated.

The heat transfer process permits for multicolored designs to be applied to a container in a single operation. The heat transfer process involves the use of a release-coated carrier upon which the design to be transferred is printed. The design is transferred from the web-like carrier to the container generally by using a combination of heat and pressure. The principal advantage of the heat transfer technique is that multicolored designs of an infinite variety may be applied to a container.

Because of the heat requirements associated with the release and application of the label from the web onto the container, it has been generally accepted practice to maintain the container in a stationary position, albeit rotatable in the instances of circular containers, during the decorating step. This has resulted in numerous prior art types of apparatus which employ intermittently moving mechanisms which include one to engage and deposit a container at a decorating station. Yet another mechanism engages the container at a decorating station. This latter mechanism must permit relative movement between the container and die to facilitate application of the label onto the container to be decorated. Once the container has been decorated it is removed from the decorating station by yet another mechanism and conveyed to another destination. Each of these functions has required numerous types of moving parts and mechanisms to impart the desired motion and transfer of the container to and from a decorating station.

Because of the intermittent movement associated with such systems, the speed of decoration has been limited. The various movements have curtailed operating speeds and placed heat transfer labeling systems in a limited and low rate of production category.

Other prior art heat transfer label systems have been devised which overcome the disadvantages of these machines and provide for a system wherein articles are decorated in a continuous manner.

FIGS. 1–4 show various perspective views of a heat transfer labeling machine of the prior art. The article to be decorated by the depicted heat transfer labeling apparatus is illustrated in the form of an irregular shaped container 10. The container 10 is moved in the direction of the arrow (FIG. 1) to a decorating station indicated generally at 20 at which a label 11 is applied. Label 11 is carried to decorating station 20 by a release coated carrier web 12 which includes thereon a plurality of spaced labels 11 and registration marks 13 disposed between labels on the top portion of web 12.

Container 10 is conveyed toward the decorating station 20 by an endless belt 21 which passes over drive wheels 22 and 23. Mounted within the endless belt 21 is a vacuum chamber 24 which has its upper surface in engagement with the inside portion of the belt 21. Disposed in the center of the belt 21 are a plurality of spaced apertures 25 which permit a vacuum to be applied to the bottom of the container 10 thus holding and stabilizing the container during conveyance. Disposed adjacent to the end portion of belt 21 is a feedscrew 26 which has a pitch suitable for engagement with the particular size container 10. The container 10 is engaged by the threaded portion of screw 26 and fed to a receptacle holding means 30. To facilitate feeding of container 10 into receptacle holding means 30, is a horizontal transfer plate 31 disposed at the end of belt 21 to assist in transposing the container from the conveyor belt 21 into the receptacle 30.

Receptacles 30 are fastened to an endless chain 32 which is driven over sprockets 33, 34, 35, 36, 37 and 38. Chain 32 is a link type to which the receptacle 30 is fastened. Receptacle 30 consists of split halves 39 and 39*a* (FIG. 1) which have a deep dish contour which substantially matches the bottom portion of the container 10 being decorated. The container 10 is fed by feedscrew 26 into the receptacle 30 with the leading bottom edge of the container engaging the leading or forward half 39 of the receptacle 30 (see FIG. 1). As the container moves forward and while still engaged with the feedscrew 26, chain 32 moves over sprocket 37 with the trailing half 39*a* of the receptacle 30 moving up and into holding engagement with the bottom of the container 10.

While the lower portion of container 10 is being moved into receptacle 30, the upper open portion of the container is moved into engagement with a cup-shaped inflating nozzle 40. A plurality of spaced nozzles 40 are fastened to a timing belt 41 which passes over gears 42, 43, 44 and 45, each of which has external teeth matching those provided on the interior of timing belt 41. Also, drive gears 46 and 47 (FIG. 1) engage timing belt 41 and are mounted in adjustable support members 48 which permit adjusting the tension of timing belt 41. The remaining gears 42 through 45 are suitably mounted in bushings 49. Disposed between the upper and lower portions of timing belt 41 is a manifold 50 to facilitate inflating container 10 while at the decorating station 20.

A plurality of cup-shaped nozzles 40 are spaced from one another on timing belt 41 and include a container engaging portion 51. (FIG. 1) The center portion of cup 51 is recessed and of a size compatible for engaging the top opening of the container 10. Cup 51 is preferably fabricated from a nylon material. Bushing 52 is threaded into the center of cup portion 51 and serves to fasten the cup to timing belt 41. In order to permit passage of the rearward extending portion of bushing 52, gears 42–47 are recessed and do not engage the center portion of timing belt 41 which is similarly recessed. Bushing 52 has a circular shaped rearwardly extending portion which has a diameter just slightly less than the width of a groove provided in the lower portion of manifold 50. In this manner, the groove serves as a guide when timing belt 41 is in engagement with the lower portion of manifold 50. Air is thus permitted to enter the container 10 while at the decorating station 20.

Supports 66 are provided for guiding the containers 10 as they travel on input and exit conveyors 21 and 60. Also, when only one side of a container is being decorated further support may be provided for containers 10 while at the decorating station by providing a vertically oriented endless belt 29 for engaging and supporting the side of the bottle not being decorated.

Once the container leaves decorating station 20, at which label 11 was applied, it is routed onto exit conveyor 60. A vacuum chamber 61 is also disposed between the upper and lower surfaces of conveyor belt 60 which is driven about wheel 62 and a similar one disposed at the other end thereof. Belt 60 contains slots 63 in the center portion thereof to permit the application of a vacuum to the lower portion of the container 10. Container 10 is discharged from the receptacle 30 as the leading portion 39 moves downward and out of engagement with container 10 after the receptacle passes over sprocket 34. While the trailing half 39*a* of the receptacle 30 is still in engagement with the container, the forward portion of container 10 is moved onto plate 65 which is disposed between endless chain 32 and exit conveyor 60. While on plate 65, movement of container 10 is controlled by the trailing container which tends to push the container onto plate 65 and then conveyor 60. As the receptacle 30 drops out of engagement with the container, inflating nozzle 40 is similarly disengaged from the open top portion of container 10. As each nozzle 40 passes over gear 43, it is moved in an upward direction towards the next pulley 42. This thus causes the recessed portion of nozzle 40 to lift out of engagement from container 10. The decorated bottle which exits from conveyor 60 is then ready for filling or other further processing. It is noted that the speeds obtainable with the heat transfer labeling apparatus of this invention (over 200 labels per minute) make the equipment suitable to serve as an in-line piece of equipment along with filling machines and associated equipment.

The drive system for the various conveyors will be described with particular reference to FIGS. 3 and 4. A variable speed DC drive motor 70 is provided in each module to drive the article and label moving members. Motor 70 is continuously operated and as required, engaged and disengaged from the drive system by means of a clutch 70*a*. The output of drive motor 70 is transmitted to a mechanical speed controller gear box 71 by means of chain and sprocket drive 72. Output from the mechanical gear box 71 drives a web metering roll 73, the output drive shaft including thereon a clutch-brake 74. Another output from the drive motor 70 is coupled by chain and sprocket drive 75 to gear box 76. Also, by means of chain and sprocket coupling 77 which is connected to a right angle gear-box 78, drive motor 70 is mechanically coupled to a similar drive motor of an adjacently spaced module. The adjacently spaced module is identical to the one herein described and as will be described later, is utilized to decorate two sides of the same article. Sprocket 79 is mechanically connected to a similar sprocket on an adjacent module, thus providing a direct mechanical linkage of the DC drive motors 70.

Output shaft 80 from the gear box 76 drives the transfer roller cams 81 and 81*a* mounted on a common shaft by means of the chain and sprocket drive 82. Cams 81 and 81*a*, and the manner in which they serve to drive the label transfer rollers, will be more fully described hereinafter. Another chain and sprocket drive 83, connected to output shaft 80, drives gear box 84 which in turn has its output driving the chain and sprocket 85. Shaft 86 is driven at one end by chain and sprocket 85 while another chain and sprocket drive 87 is thereby driven to provide an input drive to gear box 90 which in turn is employed to drive the various conveying mechanisms. In this respect, shaft 91 in addition to driving gear box 90 has its output at the other end coupled to the feedscrew 26 via chain and sprocket drives 92 and 93. The conveyor 21 is driven by drive wheel 22 which is driven from one output of the gear box 90 by means of chain and sprocket drives 94 and 95. Gear 43 drives the inflating nozzle timing belt 41 with gear 43 being driven by the same output from gear box 90 as is sprocket 34 for driving receptacle chain 32. Sprocket 34 for chain link belt 32 is driven by the chain and sprocket drive 96 coupled to the output from gear box 90 whereas gear 43 is driven therefrom via chain and sprocket drives 97 and 98. Also driven from the same output of gear box 90 is discharge conveyor belt 60 which is driven by the chain and sprocket 96 which in turn is coupled to the chain and sprocket 99 which drives the chain and sprocket 100. Thus is provided a synchronized conveying system for continuously carrying articles 10 through the apparatus with the various speeds regulated while driven from a single source.

Further driven from the same DC variable drive motor 70 is the label carrying web 12. A control panel 101 is provided on the module to regulate the speed of the motor 70 which as previously mentioned, drives the web metering roller 73 through the clutch-brake 74 and gear box 71. Transfer roller cams 81 and 81*a* are driven directly from the main motor via gear box 76, shaft 80 and chain and sprocket drive 82 which is connected to shaft 102. The output of shaft 102 also drives shaft 103 through the chain and sprocket arrangement 104.

Tachometer 103*a*, driven off shaft 103, reads the operating speed of the machine and provides a visual display on module panel 101.

The supply of new labels is provided on supply wheel 110, the dispensing of which is regulated by metering roll 73. The web 12 as it is unwound from supply reel 110 passes over idler roller 111 and then over dancer roll 112, the operation of which will be more fully described below. The web next is routed to feed roller 113 and then into the web metering roller 73 adjacent to which a photocell 122 is disposed. Photocell 122 is disposed to be in a position capable of reading registration marks 13 and thus control the web feed speed. Web 12 encircles web metering roller 73 and is fed therefrom through pinch roller 114 over adjustable roller 115. The supply of labels on web 12 is fed by the metering roller 73 which has pinch roller 114 adjusted so as to press against it with the feed dispensed by the metering roll 73 being regulated by an associated brake 73*a*. Metering roll 73 also has an electric clutch-brake 74 which is activated by a photocell (not shown) disposed adjacent the decorating station 20 which in turn determines the presence or absence of a container at the decorating station. Thus, if no article is present to be decorated, clutch 74 disengages metering roller 73 and terminates feeding of web 12.

Adjustable roller 115 is manually movable in slot 116 by means of the rotatable handle 117. This manual adjustment permits for approximate label positioning on the container prior to operation of the machine.

The web being fed by metering roller 73 next passes over idler rollers 125, 126, 127 and 128 and is then routed to pass over the elongated preheat plate 130 which is electrically maintained at a temperature of approximately 200° F. In addition, radiant heater 129, also referred to as a "platen," is disposed facing the opposite face of the web 11 so as to further preheat the label prior to arrival at the decorating station 20. The platen temperature is typically 300–400° F. At decorating station 20 are disposed a pair of heated transfer rollers 131 and 132 which are adapted to facilitate transfer of the label 11 onto article 10. Transfer roller 131 has the outer label engaging surface formed of a silicone rubber material of 35 durometer hardness which is heated to a surface temperature of approximately 130°–250° F. The interior of transfer roller 131 is iron oxide filled to provide suitable conductivity. In this manner, transfer roller 131 is maintained at a temperature sufficient to cause transfer of the label 11 to the article 10. Transfer roller 132 is metallic, preferably copper, having a layer of chrome plating on the surface. Transfer roller 132 is heated to a surface temperature of approximately 500°–600° F. so as to effect release of the label 11 from the web 12.

The transfer rollers 131 and 132 are each pivotally mounted and in operative engagement with cams 81 and 81*a* so as to sequentially regulate movement of the transfer rollers into and out of engagement with the article 10 as it arrives at decorating station 20. Cams 81 and 81*a* are mounted on a common shaft 102 which as previously mentioned is driven directly from the drive motor 70.

Transfer roller 131 is mounted in heated housing 133 which is pivotally mounted at 134. A cam follower 135 in engagement with upper cam 81 controls the article engaging and disengaging movement of the roller 131. A spring 136, urges transfer roller 131 and heated housing 133 out of engagement from article 10 except when moved into engagement by means of cam 81. Transfer roller 132 is similarly pivotally mounted at 137 and has spring 138 urging the roller out of engagement from web 12. A cam follower 139, coupled to transfer roller 132, engages lower cam 81*a* which thus controls movement of the metallic transfer roller 132.

Web 12 as it leaves decorating station 20 passes over idler rollers 150, 151 and 152. The web next passes over dancer roll 153 and then over idler roller 154 onto the rewind reel 155. Disposed adjacent the rewind reel 155 and beneath dancer roll 153 is a proximity switch 156, a similar switch 157 being disposed adjacent supply reel 110 and beneath dancer roll 112.

A constant amount of drag is imparted to the label supply wheel 110 by means of the dancer roll 112 and associated proximity switch 157. Specifically, dancer roll 112 is mounted to pivot about shaft 160 which has mounted at its base an arm member 161 which is movable over proximity switch 157. A spring 163 urges dancer roll 112 in a direction of maximum extension of the carrier web length from the supply wheel 110, i.e. in a position furthest away from the source of supply as measured along the web travel path. Disposed beneath arm member 161 is a magnetically activated proximity switch 157 which in turn regulates the degree of braking applied by brake 165 which is mounted on the web supply shaft 166. Potentiometer 167 is connected to web supply brake 165 and may be manually regulated to initially set the desired degree of braking. Subsequently, the movement of dancer roll 112 exerts a substantially constant force or drag on the web supply wheel 110.

A similar proximity switch 156 is provided for the rewind label roller 155. In this connection, dancer roll 153 includes a similar arm disposed over proximity switch 156. Proximity switch 156 however, is connected to clutch 170 which controls movement of take up reel 155 as will be more fully described hereinafter.

Rewind wheel 155 is driven directly by DC motor 70 through gear box 76. In this respect, output shaft 80 of gear box 76 is coupled to clutch 170 by means of the chain and sprocket drive 171. The output from clutch 170 is coupled to the rewind reel 155 by means of the chain and sprocket drive 172 (FIG. 4).

The path of travel of label carrying web 12 is traced. Initially the web exits from the label supply wheel 110 and passes over idler roller 111. Dancer roll 112, which is movable from the solid position to the dotted position, maintains a substantially constant drag on label supply wheel 110 by means of brake 165. After passing over dancer roll 112, the web is routed to metering roll 73 disposed adjacent to photocell 122. Feed of the web 12 is regulated by metering roll 73 which in turn is responsive to a signal from photocell 122 disposed adjacent thereto. As mentioned, metering roller 73 meters the web supply and is driven directly by the electric drive motor 70 via clutch 74 and the associated brake 73*a*.

After being dispensed from metering roll 73, the web then is routed over the adjustable roller 115 and then over idler rollers 125, 126, 127 and 128 and over preheater 130. Web 11 is next routed through the decorating station 20 at which point label 11 is applied to container 10. As mentioned, transfer roller 131 and 132 are operated in timed relation with respect to the registration marks with the transfer rollers moving sequentially into and out of engagement with the container 10 responsive to the movement of cams 81 and 81*a*. In this manner, exact registration is achieved and decoration of the container accomplished with the labels capable of being applied in a predetermined location with respect to the position of the seam.

Prior to the initial operation of the machine, adjustment screw 117 is employed to adjust the positioning of the label 12 with respect to the positioning of the conveyors. As mentioned, rotation of screw 117 causes a forward or rearward movement of roller 115 thus adjusting the label position at decorating station 20. Once manual adjustment is completed, automatic operation is maintained by means of the photocell 122 reading registration marks 13 as previously described.

A stepping motor is provided with its output shaft 180 coupled to gear box 71 by means of the chain and sprocket drive 181. Signals provided to the stepping motor, such as from photocell 122 thus provide for automatic web speed regulation.

Exemplary heat transfer decorating machines include the DI-NA-CAL® Model 700 heat transfer labeling machine, the DI-NA-CAL® Model 2400 heat transfer labeling machine and the DI-NA-CAL® Model 720 heat transfer labeling machine, all manufactured by Smurfit-Stone Container, Corp, DI-NA-CAL® Label Group, located in Cincinnati, Ohio.

More detail regarding the prior art heat transfer labeling machine described above may be found in U.S. Pat. No. 4,180,105, entitled "ARTICLE INFLATING SYSTEM,", issued Dec. 25, 1979 to Harvey and assigned to Diamond International Corp., now owned by the assignee of the present application; U.S. Pat. No. 4,239,569, entitled "HEAT TRANSFER LABELING MACHINE,", issued Dec. 16, 1980 to Harvey and assigned to Diamond International Corp., now owned by the assignee of the present application; U.S. Pat. No. 4,275,856, entitled "HEAT TRANSFER LABELING MACHINE,", issued Jun. 30, 1981 to Harvey and assigned to Diamond International Corp., now owned by the assignee of the present application; U.S. Pat. No. 4,290,519, entitled "ARTICLE SUPPORT SYSTEM,", issued Sep. 22, 1981 to Harvey and assigned to Diamond International Corp., now owned by the assignee of the present application; U.S. Pat. No. 4,806,197, entitled "CONTINUOUS MOTION ROUND BOTTLE TURRET,", issued Feb. 21, 1989 to Harvey and assigned to Dinagraphics, Inc., now owned by the assignee of the present application; U.S. Pat. No. 5,028,293, entitled "CONTINUOUS MOTION BOTTLE DECORATING APPARATUS,", issued Jul. 2, 1991 to Harvey and assigned to Dinagraphics, Inc., now owned by the assignee of the present application; and U.S. Pat. No. 6,098,689, entitled "PROCESS AND DEVICE FOR DECORATING PACKAGES WITH CONVEX SURFACES," issued Aug. 8, 2000 to Fiwek, all of which are herein incorporated by reference.

As can be seen, the prior heat transfer decorating machines are complicated machines which are difficult to install and difficult to maintain. For example, the centrally driven transmission system of the above disclosed heat transfer decorating machine drives all of the major movable mechanical elements from a central motor with the motive force of the central motor distributed to the various elements via a complex network of drive shafts, pulleys, belts and gears. While this arrangement reduces costs by reducing the number of required drive motors and associated control and power requirements, such an arrangement makes initially setting and maintaining synchronization among all of the movable elements difficult and resource intensive. Further, the number of intervening parts between the motor and driven mechanical element introduces inaccuracies and imprecision into the movements of these mechanical elements, limiting the overall speed of the machine, and resulting in a lesser-quality final product, i.e. less accurate label placement.

Further, while product manufacturers would prefer to have a flexible decorating machine that they can use for different package configurations, such as labeling different size containers, the difficulties in modifying the prior decorating machines and their centralized power transmission system reduces the cost effectiveness of such a use. In addition, many of the parts of the above machine are carefully tailored to the package configuration being labeled. Re-configuring the decorating machine for a different package configuration is resource intensive process, often involving tearing the machine apart to replace non-adjustable configuration dependent parts, adjust configurable parts and synchronize and fine tune the machine back to an operating status. Such a process often resulted in machine downtime of over 8 hours in addition to the operator labor involved. In modern industries that require hundreds of packages to be labeled every minute, such downtime represents an intolerable waste of resources.

For example, changing the above mentioned model 700 decorating machine from one article configuration to another, requires the following steps (depending upon the differences between the two article configurations, one or more of the following steps may not need to be performed):

Beginning with the machine running package Ai and changing over to package B:

1. The operator first turns the gating screw switch to the OFF position to stop the inflow of articles into the in-feed section. The operator then allows the remaining product A articles in process to complete and the machine will cycle stop,
2. The operator turns OFF the flamers;
3. The Operator then switches the machine to MANUAL mode;
4. The operator then jogs the machine to move the heel cup chain master link to an accessible location. This permits the heel cup chain to be disconnected and removed;
5. The operator then turns the machine power OFF;
6. The label/web material is then removed from both web modules;
7. The gating screw drive belt guard is removed;
8. The gating screw drive belt is removed;
9. The gating screw is removed and the drive shaft is removed from the screw;
10. The gating screw support frame is removed from conveyor and the standoff spacers are exchanged. The support frame is then re-installed on the conveyor;
11. The drive shaft is installed in the new gating screw and the new gating screw is installed into the support frame for product B;
12. The gating screw drive belt is reinstalled;
13. The in-feed conveyor guide rails are moved into position for Product B.

Performance of steps 1–13 may take approximately 30 minutes;

14. The in-feed screw drive belt guard is then removed;
15. The in-feed screw drive belt is removed;
16. The in-feed screw is removed and the drive shaft is removed from the screw;
17. The guards from around both web modules are then removed;
18. The drive belt linking the two web module drive motors is disconnected;
19. The bolts securing the left hand web module to the tooling conveyor frame are removed;

20. The left hand web module is moved away from the tooling conveyor frame;
21. The hand wheels used to adjust the height of the upper tooling conveyor frame are removed;
22. The guard covering the upper tooling conveyor frame is removed;
23. The belt driving the upper tooling conveyor is removed;
24. The driven pulley for the drive belt driving the upper tooling conveyor is removed;

Performance of steps 14–24 may take approximately 30 minutes;

25. The upper tooling conveyor's right side horizontal frame member is removed;
26. The nozzle belt for product A is removed from the upper tooling conveyor frame;
27. The drive and driven pulleys for the nozzle belt from Product A are removed;
28. The drive and driven pulleys for nozzle belt for Product B are then installed;
29. The nozzle belt for Product B is installed;
30. The upper tooling conveyor's right side horizontal frame member is then re-installed;
31. The driven pulley for the drive belt driving the upper tooling conveyor are installed;

Performance of steps 25–31 may take approximately 3 hours;

32. The heel cup drive belt is removed from the right angle gearbox to the heel cup chain drive pulley;
33. The drive and driven pulleys for the heel cup drive belt are removed;
34. The heel cup chain for Product A is broken apart/split at the master link permitting the heel cup chain to be removed from the lower tooling conveyor;
35. The in-feed and exit dead plates are removed;
36. The heel cup chain drive and driven sprockets are removed from the lower tooling conveyor;
37. The heel cup chain drive and driven sprockets for Product B are installed;
38. The drive and driven sprockets for the belt driving the heel cup chain are installed;
39. The heel cup chain for product B is installed;
40. The in-feed and exit dead plates for product B are installed;
41. The belt driving the heel cup chain is installed;
42. The upper tooling conveyor is then moved to the approximate operating height for Product B using manually adjustable jack-screws located on either side of the upper tooling conveyor;
43. The drive belt for the upper tooling conveyor is installed;

Performance of steps 32–43 may take approximately 3 hours;

44. The platen cam for product A is removed from each web module;
45. The shuttle cam for product A is removed from each web module;
46. The shuttle cam for product B is installed on each web module;
47. The platen cam for product B is installed on each web module;
48. The change gears and swing gears for product A are removed from each web module;
49. The change gears and swing gears for product B are installed on each web module;

Performance of steps 44–49 may take approximately 30 minutes;

50. The guard on the upper tooling conveyor frame is installed;
51. The hand wheels used to adjust the height of the upper tooling frame are installed;
52. The left hand web module is moved back into position with the center tooling frame and attached to center tooling frame;
53. The drive shaft for the in-feed screw for Product B is inserted into the screw and the screw is installed;
54. The drive belt for the in-feed screw is installed;
55. The drive belt linking the two web module drive motors is connected;
56. The guards are installed around both web modules;

Performance of steps 50–56 may take approximately 30 minutes;

57. Power to the machine is turned on;
58. The heel cup chain mechanical zero position is set;
59. The nozzle belt to adjusted to align with the heel cups;
60. The height of the upper tooling frame is set using two product B bottles placed in the heel cups using adjustable jack-screws located at each end of the upper tooling frame set;
61. The in-feed screw is timed to the heel cups;
62. The shuttle and platen cams are timed to the heel cups;
63. Label web is threaded on the web modules;
64. Test labeling of some bottles is performed;
65. Shuttle cams, platen cams, label height and register positions are adjusted as needed;
66. In-feed and out-feed conveyor speeds are adjusted as needed;
67. Pre and post flaming is set up;
68. Test labeling of some bottles is performed to test for quality and adhesion;
69. Any adjustments are made as needed and retested;
70. The machine is set in AUTO and returned to production with product B;

Performance of steps 57–70 may take approximately 30 minutes;

Total Performance time: 8.5 hours.

As can be seen, the above re-configuration process is extremely tedious and time consuming and prone to errors. Further, in order to perform a majority of steps, the operator would need at least the following tools: various screw drivers, various hex wrenches, various combination or open ended wrenches, pliers, a pry bar, a level and a hammer.

In addition, new packaging technologies are placing new demands on the heat transfer decorating machine. For example, in prior packaging techniques, the manufacturer of the containers was separate from the manufacturer who was buying and filling the containers (the "filler") with a particular product. The manufacturer would manufacture the containers and ship them to the filler. The filler would then pass the containers through a heat transfer labeling machine, such as the machine described above, to label the containers. In regards to food products, the filler would then have to clean and disinfect the containers prior to filling them. Such a cleaning and disinfection process disadvantageously affected the product flavor and shelf life.

Modern food product manufacturers are now switching to a form of "aseptic" packaging wherein containers are manufactured and filled with the product in the same environmentally controlled area. This allows the manufacturer to avoid the cleaning and disinfection process, thereby significantly improving both product flavor and shelf life. Unfortunately, with aseptic packaging, the containers cannot be labeled prior to filling. In addition, the temperature of the containers and product within is typically very cold as the products must be refrigerated throughout the manufacturing and filling process to prevent spoilage. The labeling process must not significantly alter this temperature so as to adversely affect the product flavor or shelf life. Further, to maintain environmentally controlled conditions, the container labeling may be required to occur in the same environmentally controlled area as where the container manufacturing and filling take place.

Accordingly, there is a need for a heat transfer labeling machine which is capable of being easily and quickly configured to label multiple package configurations. In addition, there is a need for heat transfer labeling machine which does not use a centralized power transmission. Further, there is a need for a heat transfer labeling machine which is capable of labeling filled and, potentially, chilled containers in both controlled and uncontrolled environments.

SUMMARY

The present invention is defined by the following claims, and nothing in this section should be taken as a limitation on those claims. By way of introduction, the preferred embodiments described below relate to an apparatus for applying a heat transfer label to an article. The apparatus includes an in-feed mechanism, the in-feed mechanism operable to receive the article and remove environmental contamination from the article prior to the article having a heat transfer label applied. In addition, the apparatus includes a label applicator operative to apply a heat transfer label to the article and a conveyor coupled with the in-feed mechanism and the label applicator and operative to convey the article from the in-feed mechanism to the label applicator.

The preferred embodiments further relate to a method for applying a heat transfer label to a contaminated article.

In one embodiment, the method comprises: receiving the contaminated article by an in-feed mechanism; removing the contamination from the contaminated article; conveying the decontaminated article to a label applicator; and applying a heat transfer label to the decontaminated article.

Further aspects and advantages of the invention are discussed below in conjunction with the preferred embodiments.

DETAILED DESCRIPTION OF THE DRAWINGS AND PRESENTLY PREFERRED EMBODIMENTS

Figure 1:
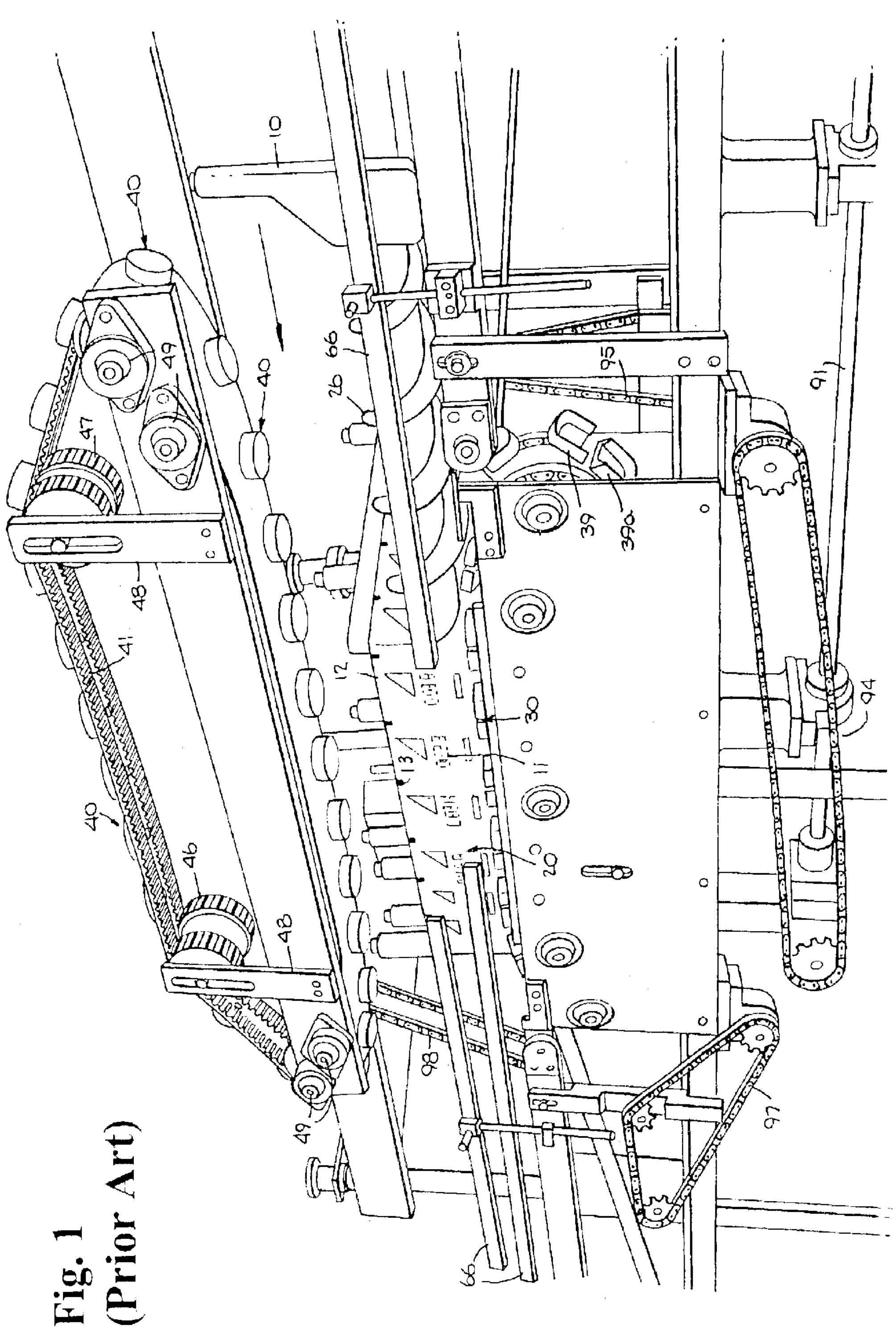
Fig. 1 (Prior Art)
FIG. 1 depicts a front perspective view of the label application section of a heat transfer labeling machine according to the prior art.
Figure 2:
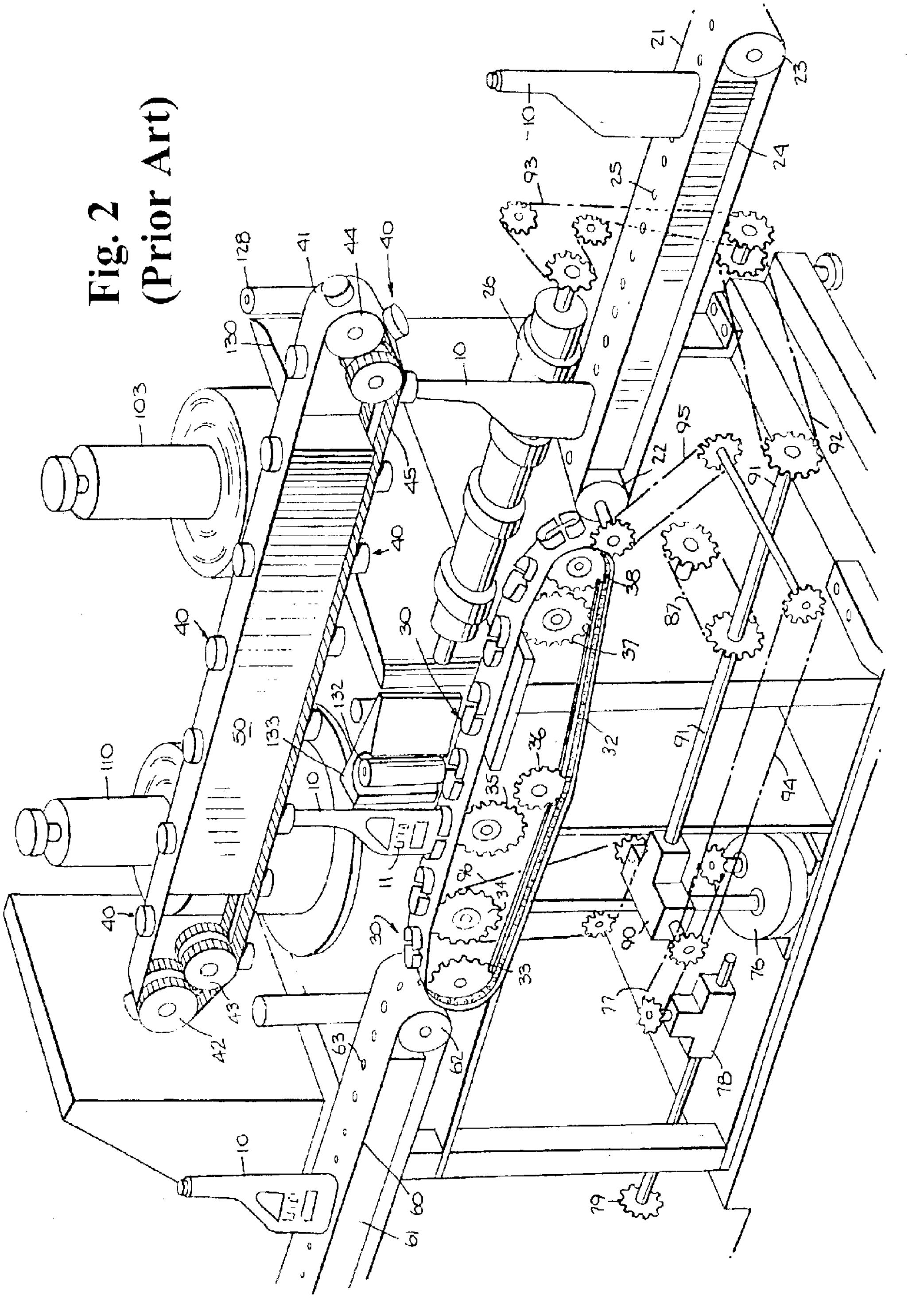
Fig. 2 (Prior Art)
FIG. 2 depicts a front perspective view of the decorating station according to the prior art for use with the heat transfer labeling machine of FIG. 1.
Figure 3:
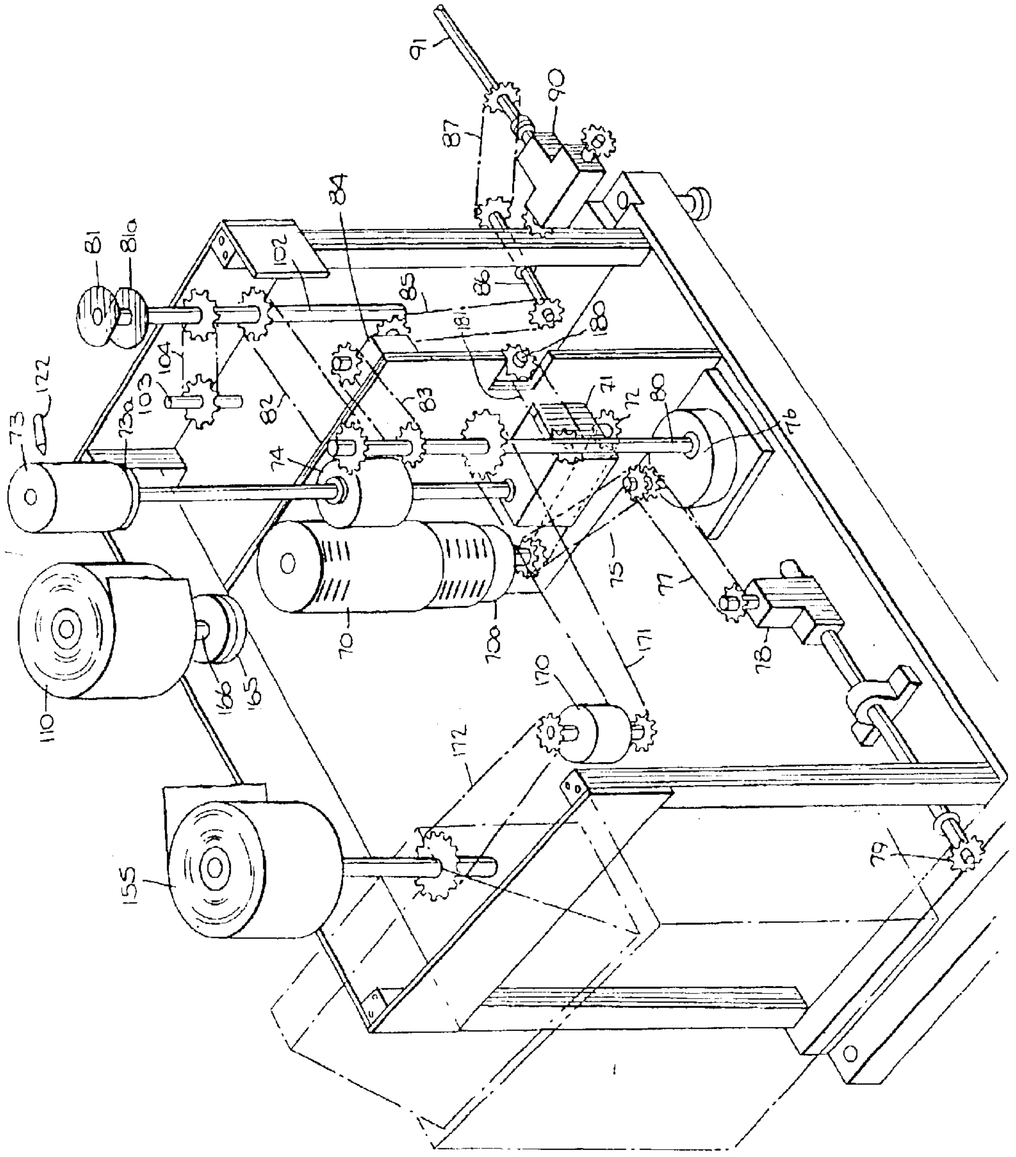
Fig. 3 (Prior Art)
FIG. 3 depicts the drive controls according to the prior art for use with the decorating station of FIG. 2.
Figure 4:
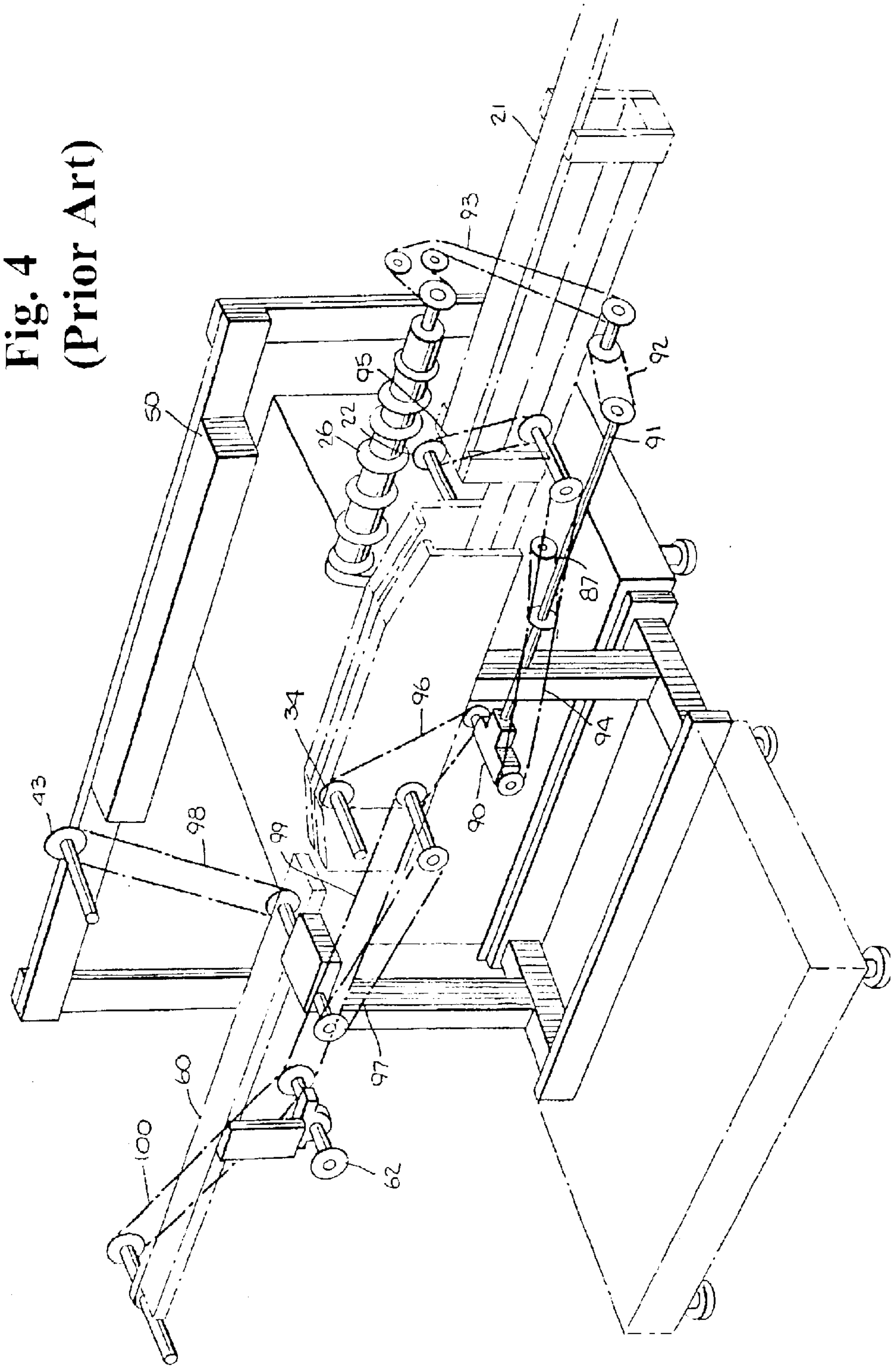
Fig. 4 (Prior Art)
FIG. 4 depicts a front perspective view of the drive controls according to the prior art of the heat transfer labeling machine of FIG. 1.

The disclosed embodiments relate generally to a heat transfer labeling apparatus and a method of applying a heat transferable label to a hollow or filled article, such as a plastic or glass container, bottle, etc. More particularly, the disclosed embodiments relate to such an apparatus and method wherein the apparatus is capable of being easily and quickly reconfigured for different package configurations by an operator substantially without the use of tools. In addition, the disclosed embodiments relate to a heat transfer labeling apparatus having a distributed power transmission system. Further, the disclosed embodiments relate to a heal transfer labeling apparatus capable of labeling both filled and chilled containers, in both environmentally controlled and uncontrolled areas.

In one embodiment, the disclosed heat transfer labeling apparatus includes mechanisms, described in more detail below, which allow the apparatus to be easily and quickly reconfigured to label different package configurations, such as different size bottles, referred to herein as a "changeover." In a second embodiment, the disclosed heat transfer labeling apparatus includes a distributed power transmission system which places a direct drive servo motor at each major movable mechanical element, as will be described in more detail below, thereby eliminating the complex and difficult to maintain centralized power transmission system and the associated drive shafts, pulleys, gears and belts. In a third embodiment, the disclosed heat transfer labeling apparatus is capable of labeling filled and chilled containers in an uncontrolled environment using an environmental preparation station which removes contamination from the container, such as condensation, prior to application of the label. Further, with regards to labeling articles containing refrigerated food products, the temperature of the contents is not raised by more than 1° F. due to the labeling process, which ensures that product flavor and shelf life are not adversely affected. It will be appreciated that each of the features described above may be implemented alone or in combination in a particular embodiment of a heat transfer label decorating machine.

An exemplary heat transfer decorating machine according to the preferred embodiments is the DI-NA-CAL® Model HTD-5000 Flex Line™ Heat Transfer Decorating Machine, manufactured by Smurfit-Stone Container Corp., DI-NA-CAL® Label Group, located in Cincinnati, Ohio. This machine features:

- the ability to label panel bottles from 12 oz to 2i5 gallons;
- the ability to label containers filled with refrigerated food products without increasing the temperature of the contents by more than 1° F.;
- the ability to handle label rolls up to 16.5" in diameter, which is up to 40% more than prior machines;
- the ability to label containers with curved panels and or tapered panels;
- precise flame treating technologies to provide the most consistent label application environment;
- digital display of gas and air flow rates for repeatable flamer settings;
- electronic monitoring of gas and air mixture to insure that only properly flamed containers are labeled;
- the availability of various burner systems for a full range of plastics and wall thickness;
- flame monitors on every burner head;
- a servo motor based drive system for the tooling and label feed is which increases label placement accuracy and can reduce label spacing up to 50% or more on the web;
- label placement accuracy of +/−1/32" or better via servo motor control;
- faster changeovers. Many changeover elements are a simple "recipe change", average change-over time is 20 minutes compared to 8.5 hours for prior machines;
- the ability to handle an increased label size for a given panel size;
- the ability to label contoured panels with no distortion;
- minimal tooling per container and simplified changeover which speeds job changes;
- an operator control panel which pivots so it can be accessed from either side of the machine;
- the ability to handle containers with "pour spouts";
- fully automatic operation requiring an operator only for re-supply, e.g. label roll changes;
- feed screws which regulate container flow through the machine;
- the capability of decorating up to 500+ containers per minute depending upon container size and shape.

Figures 5A, 5B:
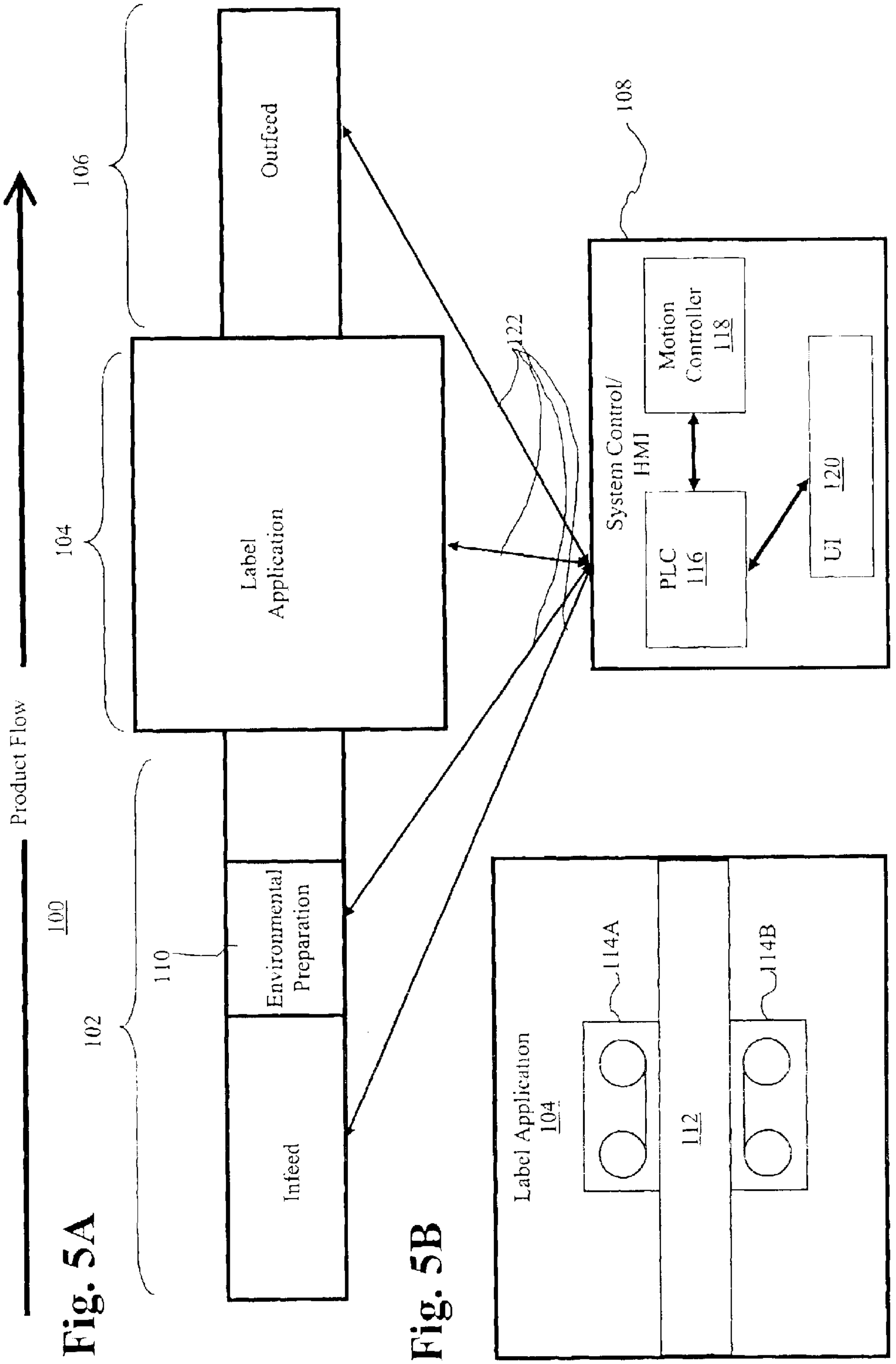
FIG. 5A depicts a block diagram of a heat transfer label machine according to one embodiment.
FIG. 5B depicts a more detailed block diagram of the label application section of the heat transfer label machine of FIG. 5.

Referring now to the figures, FIG. 5A shows a block diagram of a heat transfer label machine 100 according to one embodiment. The machine 100 includes an in-feed section 102, a label application section 104, an out-feed section 106 and a system control and human machine interface 108. The in-feed section 102 further includes an environmental preparation station 110, which will be described in greater detail below.

Articles to be labeled are received by the in-feed section 102 where they are aligned, oriented, paced and spaced for proper labeling. The in-feed section 102 may receive articles for labeling from other manufacturing or packaging equipment. The in-feed section 102 is the interface between this other equipment and the label application section 104. The in-feed section 102 further acts as a buffer between the supply of articles to be labeled and the label application section 104 so as to supply articles at the most efficient rate for labeling and not overload the label application section 104 equipment. In one embodiment, the in-feed section 102 further includes an environmental preparation station 110 which decontaminates each of the articles and otherwise prepares the surface of each of the articles for application of the label.

Further details of the in-feed section 102, the label application section 104, and the out-feed section 106 are discussed in detail below in relation to the various figures.

The system control and human machine interface 108 is coupled with the various components which make up the machine 100, as will be described in more detail below. Herein, the phrase "coupled with" is defined to mean directly connected to or indirectly connected through one or more intermediate components. Such intermediate components may include both mechanical, hardware and software based components as appropriate.

The system control and human machine interface 108 comprises control logic including a programmable logic controller 116 and motion controller 118 and a user interface ("U1") 120. It will be appreciated that the functionality of one or more of these components described herein may be integrated within/performed by a single component. The programmable logic controller 116 and motion controller 118 receive input from various sensors (see FIG. 28), e.g. motion sensors, position indicators, etc., located throughout the machine as well as input from the user interface 120 and generates outputs to appropriately control the various components of the machine 100 to apply labels to articles as directed by the operator. The programmable logic controller 116 provides output to the user interface 120 to allow the operator to observe the operation of the machine 100 and make necessary adjustments. The programmable logic controller 116 and motion controller 118 generally facilitate automated operation and failure detection. In one embodiment, the system control and human machine interface 108 comprises a SLC 5/05 Programmable Logic Controller ("PLC") 116, manufactured by Allen Bradley, a division of Rockwell Automation Corp., located in Milwaukee, Wis.

The system control and human machine interface 108 is coupled with the machine 100 using a network 122. In one embodiment, the network 122 is a Profibus network, an open network solution promulgated by PROFIBUS International, located in Karlsruhe, Germany, and the PLC 116 further includes a Profibus compatible interface card which facilitates communication between the PLC 116 and the inputs/outputs of the machine 100 over a Profibus network 122. The Profibus interface driver comes with the interface card and is downloaded into the card as directed by the manufacturer. On the machine 100 side, a Turck BL20 input/output interface, manufactured by Turck, Inc., located in Minneapolis, Minn., interfaces the various I/O components of the machine 100 with the Profibus network 122. This I/O interface includes proprietary software which must be configured according to the manufacturers specification to facilitate communications. It will be appreciated that any suitable industrial networking scheme may be used with the disclosed embodiments to interface the system control and human machine interface 108 with the machine 100.

An exemplary configuration of the PLC, according to embodiment, is shown in Appendix A. In addition, the system control and human machine interface 108 further comprises a Model #224 motion controller 118 manufactured by Trio Motion Technology, LLC, located in Pittsburgh, Pa. The motion controller is used to control the various servo motors, described in detail below, under control of the PLC 116. An exemplary program configuration for use with the Motion Controller, according to one embodiment, is shown in Appendix B. It will be appreciated that any appropriate user interface 120 may be used with the disclosed embodiments, such as a touch sensitive display panel compatible with the programmable logic controller and motion controller, and appropriately constructed for operation in a manufacturing environment. In one embodiment, the user interface 120 includes a model HM1900 10 inch graphic touch screen interface panel manufactured by Maple Systems, Inc., located in Everett, Wash. Further the user interface 120 includes at least one panel of hard-wired selector switches and push-button used to control particular machine 100 functions as will be appreciated by one of ordinary skill in the art. It will further be appreciated that alternate input devices may be used and that the functionality of the hard-wired selector switches and push buttons may be incorporated into the touch panel interface. The user interface 120 includes various graphical screens for operator input. The screens implement virtual pushbuttons, selector switches and data entry fields. The user interface 120 include software code which generates the displays and links the functionality to the PLC's 116 database for operator input. The software which drives the user interface 120 is proprietary and is purchased separately from the manufacturer of the user interface. A file containing all the screens and related links to the PLC's database is downloaded to the user interface 120 in order to get it running and communicating to the PLC 116. It will be appreciated that the screen designs are implementation dependent and that all suitable screen designs which implement the functionality described herein are contemplated.

The system control and human machine interface 108, according to one embodiment, is generally capable of performing the following functions, which are described in more detail below:

- provides for general operator input/control of machine performance;
- initiates and maintains machine operation after reconfiguration for new containers, after re-supplying the machine with containers and/or labels, as well as after recovery after jams or other error conditions;
- detect jams and other error conditions and initiate appropriate recovery actions, including alerting the operator and/or initiating automated recovery mechanisms;
- monitors and reports operating parameters and general machine performance and statistics;
- monitors maintenance requirements;
- manages component synchronization among the various movable mechanical elements of the machine 100 via position sensors and/or servo motor feedback and maintains optimal or operator-set operating speed;
- monitors environmental parameters and adjusts machine 100 operation accordingly;
- monitors operator activities and performance, ensures proper labels are loaded for the article being labeled, ensures that front labels match back labels; and
- automates configuration changes for new article configurations, including automatically homing motorized configurable components to the proper position appropriate for the container, and stores multiple configuration settings (a.k.a. "recipes") for various article configurations which can be easily recalled, modified or appended to.

Appendix A shows an exemplary program configuration for the PLC described above. This code is written in a proprietary ladder logic language for device manufactured by Allen Bradley. The manufacturer also provides proprietary software development tools to develop and load the describe configuration on the PLC 116. The PLC 116 code can be viewed as the master or supervisor controller over all other electrical devices. Its job is to process all input data and then pass command instructions off to the motion controller and/or other devices. Input data consists of discrete data from sensors and contact relay closures, analog data from process transducers and lastly, operator input data via the human machine interface and via hard-wired selector switches and pushbuttons.

The PLC 116 code contains the software structure that enables the machine to be run in various modes of operation, such as Manual Mode, Auto Mode and System Initializing, etc. For example, during System Initializing the PLC will instruct the motion controller to initialize the lower tooling conveyor and platens. Once the motion controller has completed this task it informs the PLC 116, at this point the PLC 116 then instructs the motion controller to initialize the upper tooling conveyor and the web modules. In this manner the machine becomes initialized. This initialized state is required before the operator can request the machine to run in auto, therefore it is solely the PLC that enables the machine to transition from manual, initialized and into auto modes. The PLC handles various other functions such as dynamic phasing in the same manner.

Appendix B shows exemplary program configuration files for the motion controller 118. The PLC 116 generally directs and supervises the motion controller 118 to perform certain functions related to machine operation. The motion controller 118 then properly actuates the servo motors to execute those functions, e.g. cam actions or coordinated movements. The PLC 116 also initiates automated operation which the motion controller 118 implements. The motion controller 118 also utilizes a proprietary programming architecture. The manufacturer of the motion controller 118 provides the software development tools to develop and load the software onto the motion controller 118. The software for the motion controller 118 is set up using a familiar PC windows operating system folder concept. When a project is created, a folder is automatically created which then will contain all of the basic program files created for use within that project. In the case of the disclosed embodiments, there is a single folder called "machine__41". This single folder which is viewed as a single project application within the Trio software, can be downloaded to the MC224 controller 118 in its entirety. There is no need to individually download the single files one at a time to the controller 118 (although that can be done if desired). In particular, Appendix B include the following program files which are part of the machine__41 configuration:

MAIN.bas—this file is used to control manual and automatic modes for the lower tooling conveyor 112B with integrated platens 1414, upper tooling conveyor 112B and the in-feed screw 1004. This code also directs automatic operation to all other files for Auto Start and Auto Clearout functions;

PDP__COMM.bas—this file is a communication program file for the Profibus Network. Its function is to simply serve as software device driver for the Profibus Interface on the MC224 controller. Data is passed to and from the PLC 116 to the motion controller 118 via this file. The bulk of this program file was created by Trio for their Profibus Interface;

SERVO__RESET.bas—this file is used to enables manual software reset of all servo axes;

STARTUP.bas—this file is used to start MAIN, PDP__COMM, WM1__MAIN and WM2__MAIN program files at power up;

WM1__DANCER.bas—this file contains the software commands for the dancer 1428 control logic that adjusts the speed of the supply 1404 and waste 1506 rolls to maintain dancer 1428 position (web tension) for the first web module 114A;

WM1__MAIN.bas—this file contains the software commands that enables manual and automatic modes for the metering roller 1504, supply roll 1404, and waste roll 1506 for the first web module 114A;

WM1 __MROLL.bas—this file contains the software commands that cause the metering roller 1504 to accelerate to the match constant velocity of the container and then decelerate as not to feed out more than 1 label pitch per 1 container pitch for the metering roller 1504 of the first web module 114A;

WM1__REGIST.bas—this file contains the software commands for holding label registration for the first web module 114A. This produces corrections to the metering roller 1504 to maintain the position of the label centered on the article being labeled. This program takes into account any drift that could be caused in the web dynamics (web slip etc.) The correction occurs during the gap portion between the copy areas on adjacent articles;

WM2__DANCER.bas—identical to WM1__DANCER.bas except used for the second web module 114B.

WM2__MAIN.bas—identical to WM1__MAIN.bas except used for the second web module 114B.

WM2__MROLL.bas—identical to WM1__MROLL.bas except used for the second web module 114B.

WM2__REGIST.bas—identical to WM1__REGIST.bas except used for the second web module 114B.

platen curve.txt—this file contains a cam profile, e.g. a list of data points which represent angular movements of a motor shaft, i.e. absolute positions along the curve of a cam. This file is used to control the platen movement. When loaded in the motion controller, this data permits the motion controller to emulate the shape and action of a mechanical cam using motor shaft movements. In one embodiment, the machine 10 may be placed in a "learn" mode and the platen moved along the contour of a test article. As the article is moved conveyed along the platen, movements of the platen are recorded to generate the cam profile data points. This data is then stored and used to cause the platen to repeat the recorded motion.

Note, that the above program configuration is designed to operate on a machine that utilizes a metering roller to compensate for web velocity errors as opposed to a shuttle mechanism, described in more detail below.

As will be described below, the major mechanical elements of the machine 100 feature dedicated servo motors. In one embodiment, these servo motors, identified below, include model PMA4 or model PMA5 servo motors, manufactured by Pacific Scientific, Inc., located in Rockford, Ill. Each servo motor includes configurable control logic for configuration and tuning of the particular motor, described below. It will be appreciated that the servo motors of the disclosed embodiments must be configured as directed by their manufacturer prior to use. Further, in one embodiment, each servo motor includes a servo motor amplifier which receives commands from the motion controller 118 as to particular movements of the motor and, in response to those commands, provides appropriate power to the motor to perform the commanded function. In one embodiment, the servo motor amplifier includes a model S60600-NA amplifier for the PMA4 servo motors (discussed below) and model S61000-NA amplifier for the PMA5 servo motors (discussed below), both manufactured by Kollmorgen, a division of Danaher Motion, Inc, located in Washington, D.C. Each amplifier includes a separate program configuration file that is downloaded to the amplifier and which contains specifics on servo motor configuration and servo motor tuning, as mentioned above. This file is proprietary to and provided by the amplifier manufacturer.

FIG. 5B shows a more detailed block diagram of the label application section 104 of the heat transfer label machine of FIG. 5. The label application section 104 includes a conveyor assembly 112 and web modules 114A, 114B located on either side of the conveyor assembly 112. The conveyor assembly 112 receives the articles to be labeled from the in-feed section 102 after they have left the environmental preparation station 110. The conveyor assembly 112 stages each of the articles in a constrained environment and conveys them past the web modules 114A, 114B. As the article passes the web modules 114A, 114B, the web modules 114A, 114B apply labels to the front and back sides of the article substantially simultaneously. The conveyor assembly 112 then discharges the labeled article to the out feed section 106. It will be appreciated that the machine 100 may only have a single web module 114A, 114B or that only one of the two available web modules 114A, 114B may be in use in the situation where the articles are to be labeled only on one side.

Figure 6:
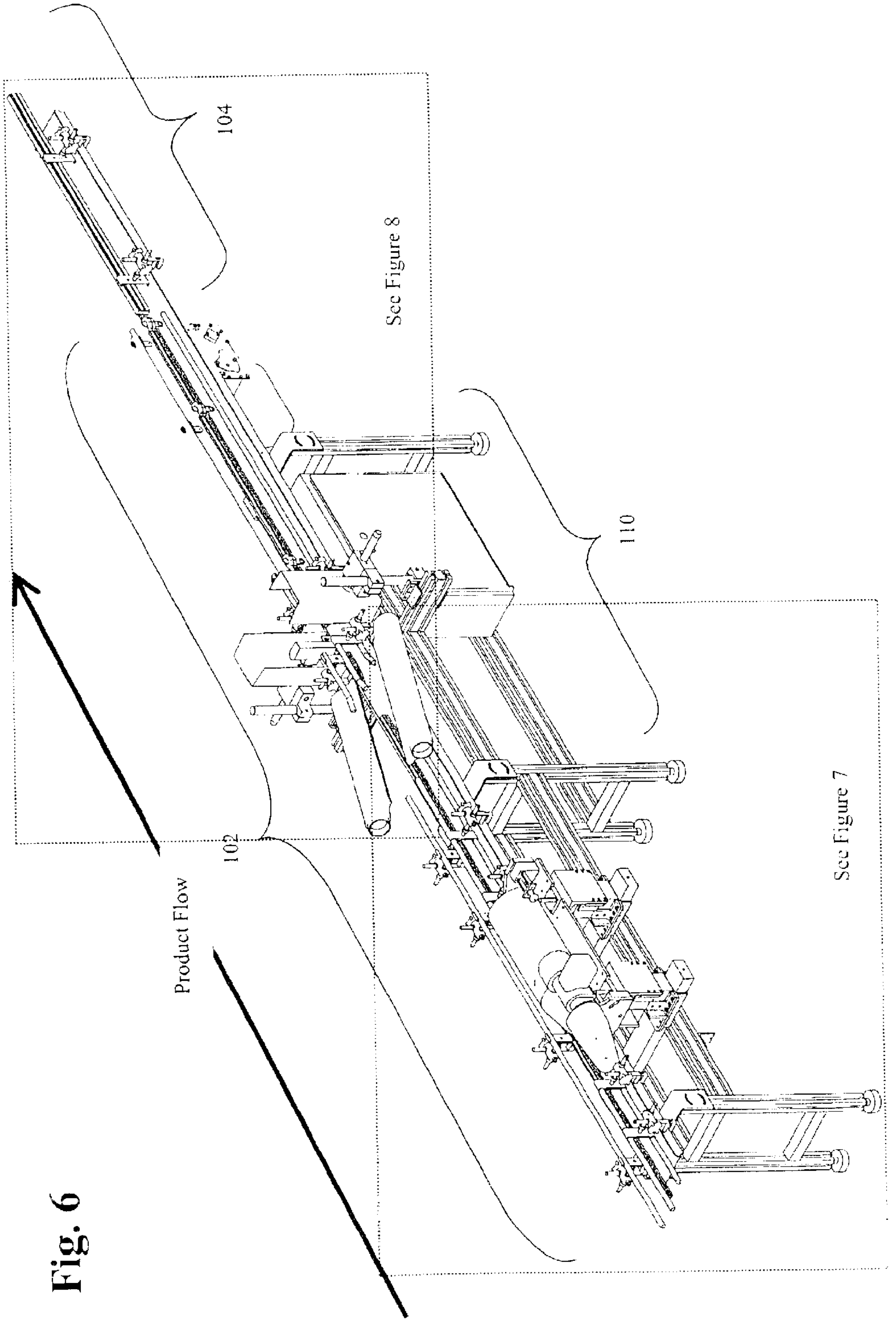
FIG. 6 depicts a perspective view of one embodiment of the in-feed section of the heat transfer label machine of FIG. 5A.
Figure 7:
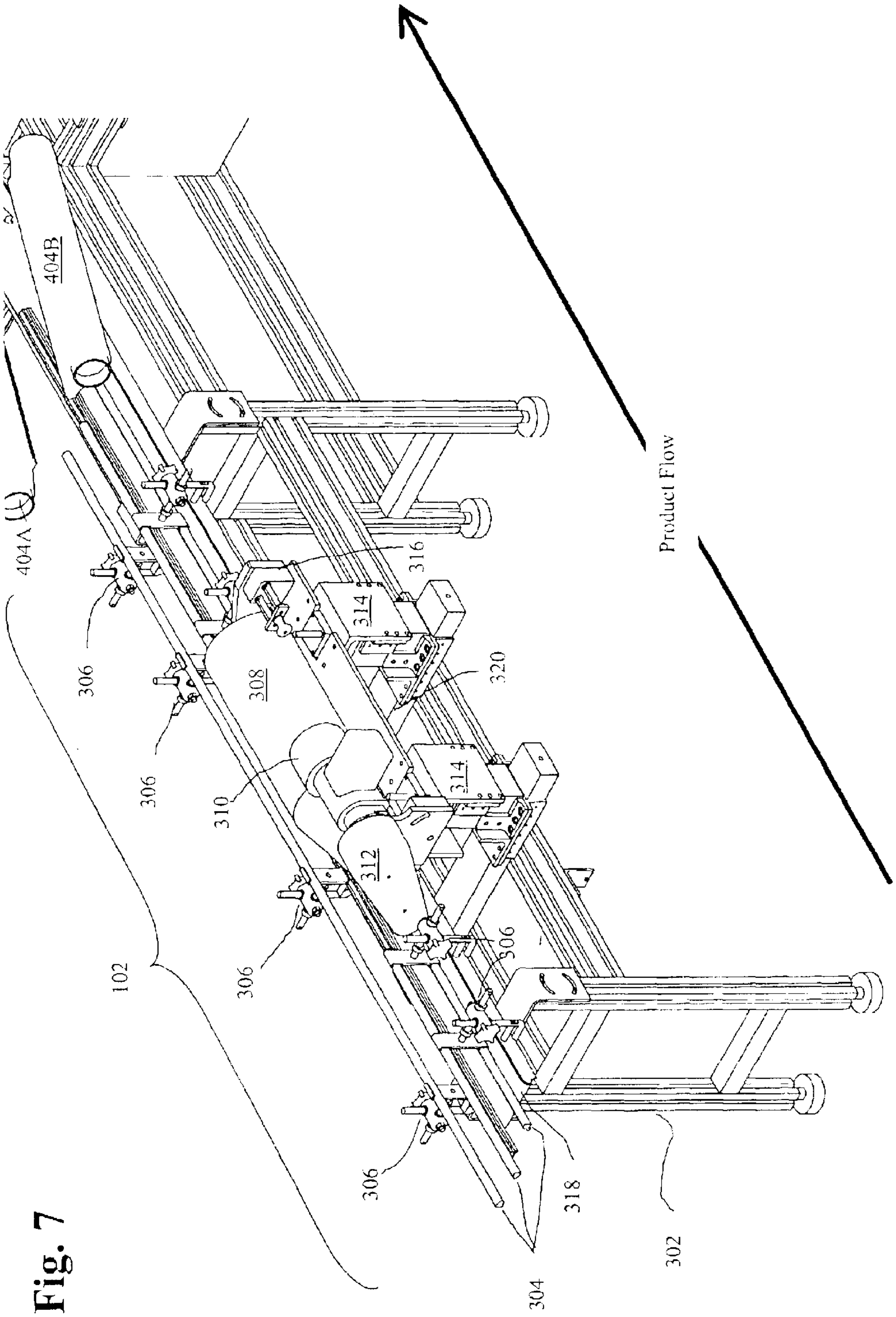
FIG. 7 depicts a more detailed perspective view of a first portion of the in-feed section of FIG. 6.
Figure 8:
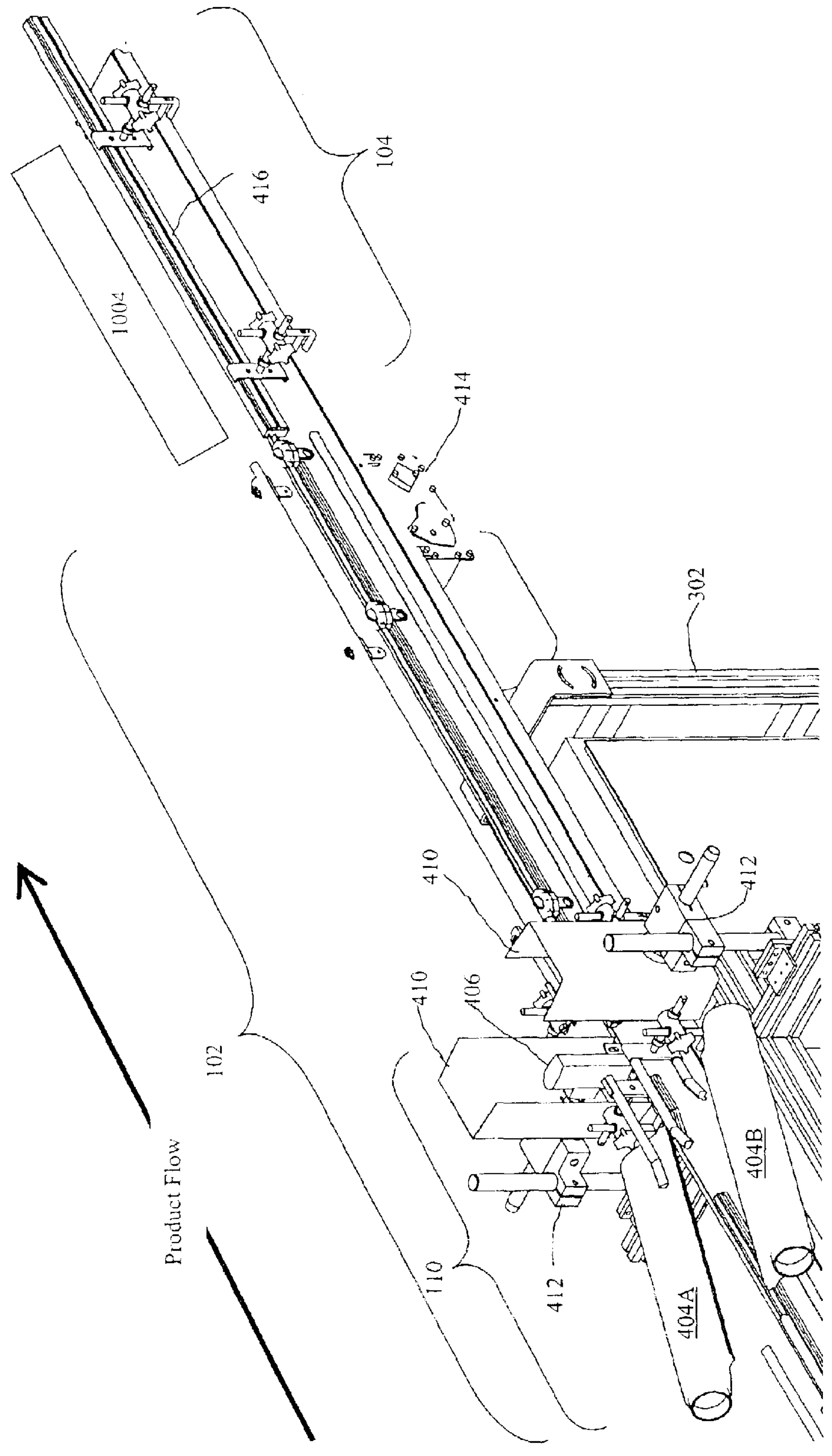
FIG. 8 depicts a more detailed perspective view of a second portion of the in-feed section of FIG. 6.
Figure 9:
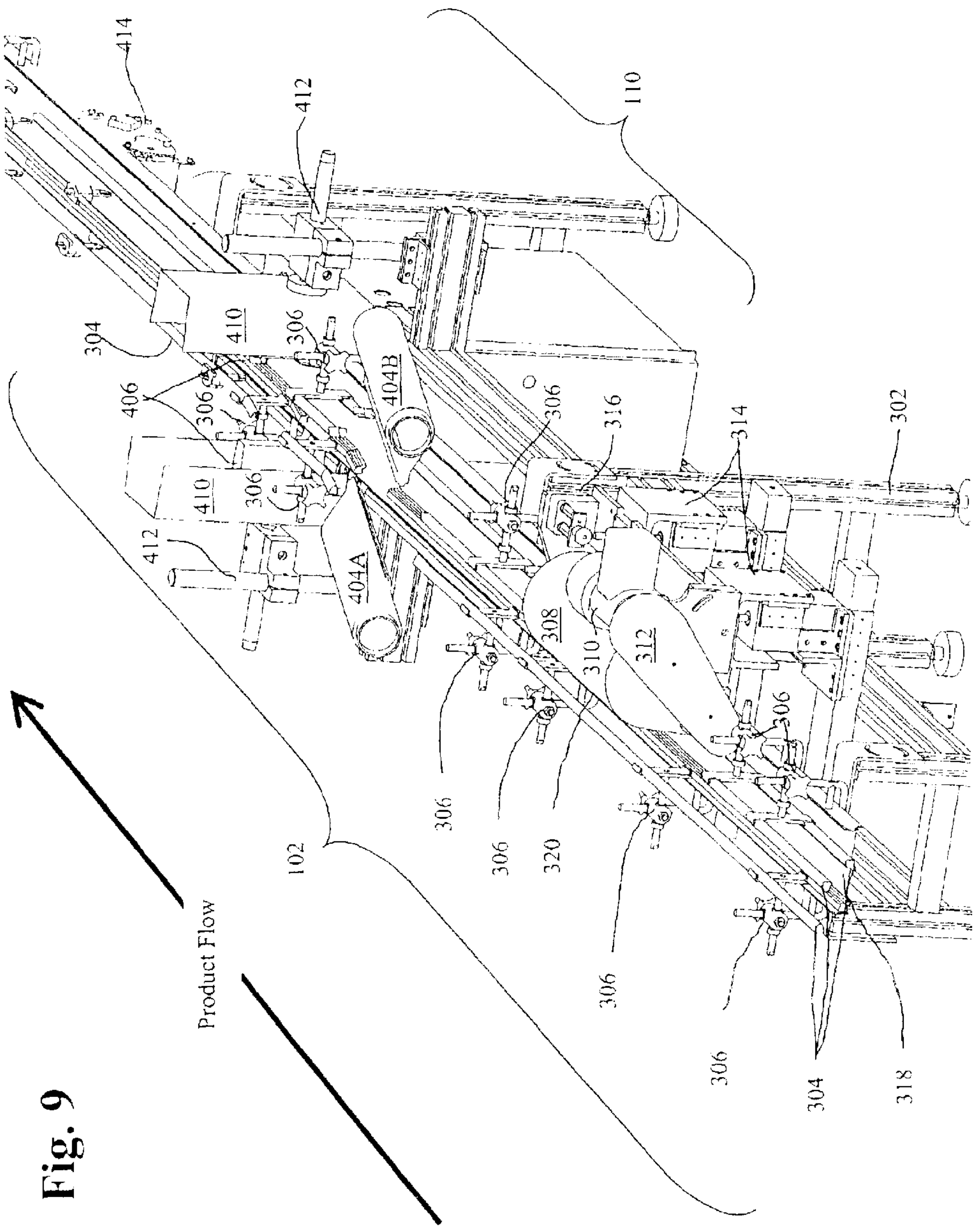
FIG. 9 depicts a second perspective view of a portion of the in-feed section of FIG. 6.

FIG. 6 shows a perspective view of one embodiment of the in-feed section 102 of the heat transfer label machine 100 of FIG. 5A. The components of the in-feed section 102 are shown in more detail in FIGS. 7–12. In particular, FIG. 7 shows a more detailed perspective view of a first portion of the in-feed section 102 of FIG. 6. The in-feed section 102, as shown in this figure, includes a support structure 302, guide rails 304, guide rail clamps 306, conveyor 318 and gating screw assembly 320. FIG. 8 shows a more detailed perspective view of a second portion of the in-feed section 102 of FIG. 6. The in-feed section 102, as shown in this figure, includes the environmental preparation station 110, conveyor motor 414 and bead rail 416. FIG. 9 shows a second perspective view of a portion of the in-feed section 102 of FIG. 6.

The support structure 302 provides a framework upon which the machine 100 components are mounted. The support structure 302 provides leveling feet which allow the overalls framework to be leveled relative to the location of the machine 100. Further, the support structure provides multiple mounting positions to which the various machine 100 components are attached.

The guide rails 304 constrain the articles along the conveyor 318 and keep the articles flowing in a straight line through the in-feed section 102. At the beginning of the in-feed section 102, the guide rails 304 may tapered to facilitate easier delivery of the articles to the in-feed section 102. There are four guide rails 304: two on either side of the conveyor 318, with each pair arranged in a vertical arrangement to provide lateral support on both sides of the article with a minimal of material. It will be appreciated that the guide rails 304 may be replaced with bars, walls or other suitable mechanical elements to constrain the articles along the conveyor 318. The guide rails 304 are positioned based on the configuration of the articles being labeled, i.e. tall article may require the guide rails 304 be set to a higher position to prevent the articles from tipping over, wide or narrow articles may require appropriate horizontal adjustment of the guide rails 304 to provide adequate support and prevent binding the movement of the articles along the conveyor 318.

Figure 12:
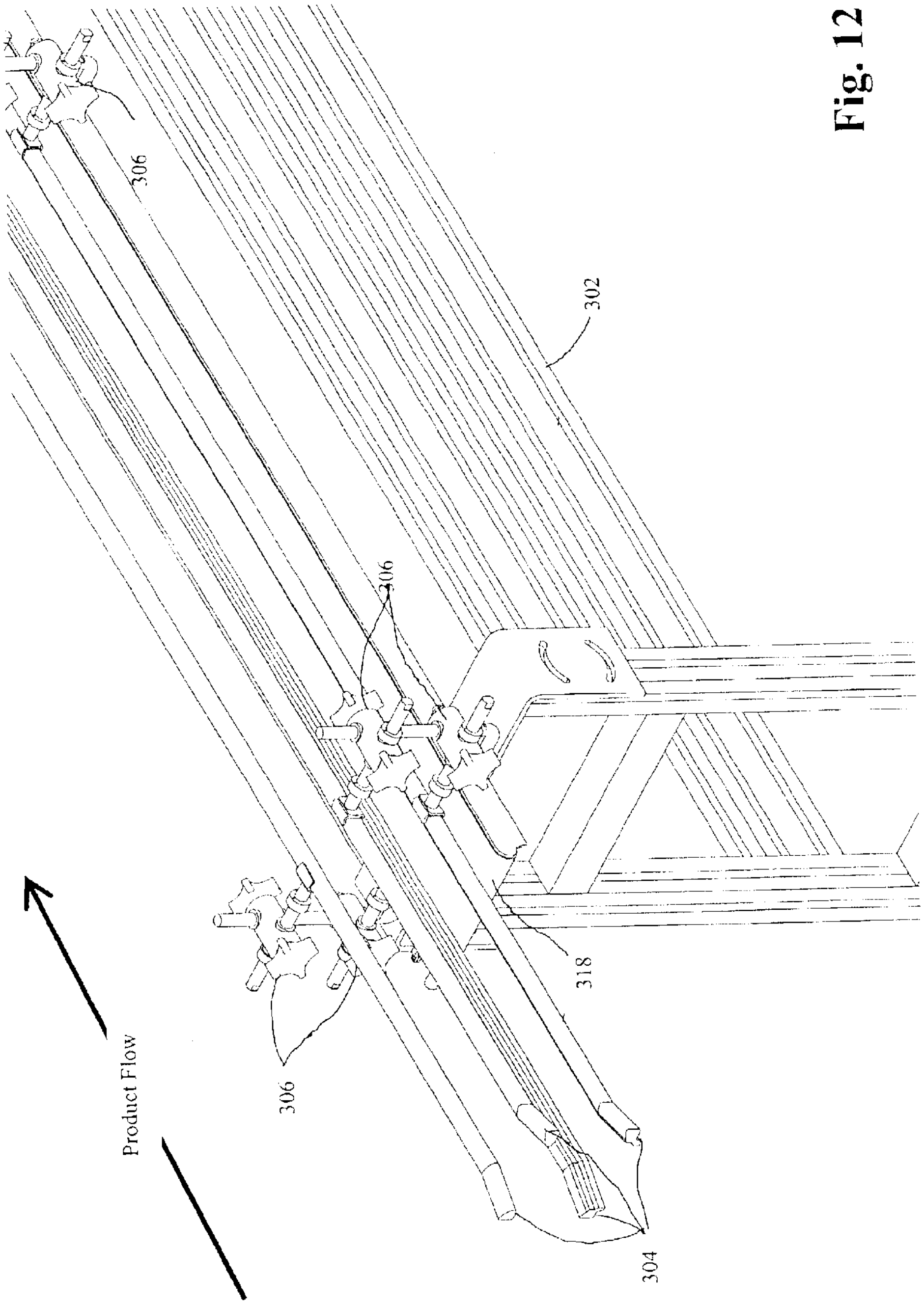
FIG. 12 depicts a more detailed perspective view of a portion of the guide-rails and guide-rail adjustment mechanism, according to one embodiment, of the in-feed section of FIG. 6.

The guide rails 304 are mounted to the support structure 302 by a series of guide rail clamps 306, shown in more detail in FIG. 12. Each clamp 306 holds both guide rails 304 of the particular pair. It will be appreciated that the number of clamps 306 to mount the guide rails 304, as well as their spacing, is implementation dependent and depends on the rigidity of the material which makes up the guide rails 304 as well as the degree of support the guide rails 304 require to perform their function. In one embodiment, the left hand pair of guide rails 304 between the beginning of the in-feed section 102 and the environmental preparation station 110 are supported by four clamps 306 while the remaining sections of guide rail 304 pairs are supported by a minimum of two clamps 306.

In addition to fixedly mounting the guide rails 304 to the support structure 302, the guide rail clamps 306 permit adjustment of the guide rails to conform to particular article configurations. Each of the guide rail clamps 306 features a hand-operated mechanism, such as a thumb-wheel and nut arrangement, a dual thumb-wheel arrangement, a hand-crank or lever, which, when actuated, loosens or tightens the clamp 306 with respect to a mounting post fixedly attached to the support structure 302, obviating the need for tools to move the guide rails 304. When loosened, the clamps 306 permit adjustment of the guide rail 304 position. In one embodiment, the guide rail clamps 306 feature an adjustment mechanism which adjusts both guide rails 304 of the pair of guide rails 304 substantially simultaneously. In an alternate embodiment, each guide rail clamp 306 features a separate adjustment mechanism for each guide rail 304 of the pair of guide rails 304. In one embodiment, adjustment is only permitted along a horizontal axis, while the vertical position remains fixed (set at the time the machine is installed). In an alternate embodiment, adjustment is permitted along both the horizontal and vertical axes. In this embodiment, separate mechanisms may be provided to permit independent adjustment of one axis without disturbing the other axis. Further, in one embodiment, the guide rail clamps 306 provide stops or stepped positions (not shown) which are set for particular article configurations to allow the operator to easily move the guide rails 304 for the particular articles being labeled. In an alternate embodiment, the guide rails clamps 306 permit unimpeded movement of the guide rails 304. In yet another embodiment, the guide rails clamps 306 feature stops of stepped positions as well as the ability to allow unimpeded movement for the purpose of fine tuning the guide rail 304 position and/or initially setting the stops or stepped position.

In one embodiment, each guide rail clamp 306 features its own adjustment mechanism for tightening and loosening the clamp 306, and each must be tightened and loosened accordingly to adjust the entire guide rail 304. In an alternate embodiment, each of the guide rail clamps 306, or a portion thereof, are connected with a single mechanism, such as a lever, which actuates the connected clamps 306 substantially simultaneously, thereby allowing to the operator to loosen or tighten all of the clamps 306 for a particular guide rail 304, or pair of guide rails 304, substantially simultaneously.

The conveyor 318 conveys each of the articles, as constrained by the guide rails 304, to the gating screw assembly 320, through the environmental preparation station and to the in-feed screw 1004 of the label application section 104. The conveyor 318 is driven by the conveyor motor 414. The speed of the conveyor 318 is controlled by the system control and human machine interface 108 and is appropriately matched to the speed of the other components of the machine 100. In one embodiment, the conveyor motor 414 is a model VWDM3538 Washdown Duty Gear Motor with a model GR0209B037 5:1 gearbox both manufactured by Baldor Electric Company, Fort Smith, Ark.

Figure 10:
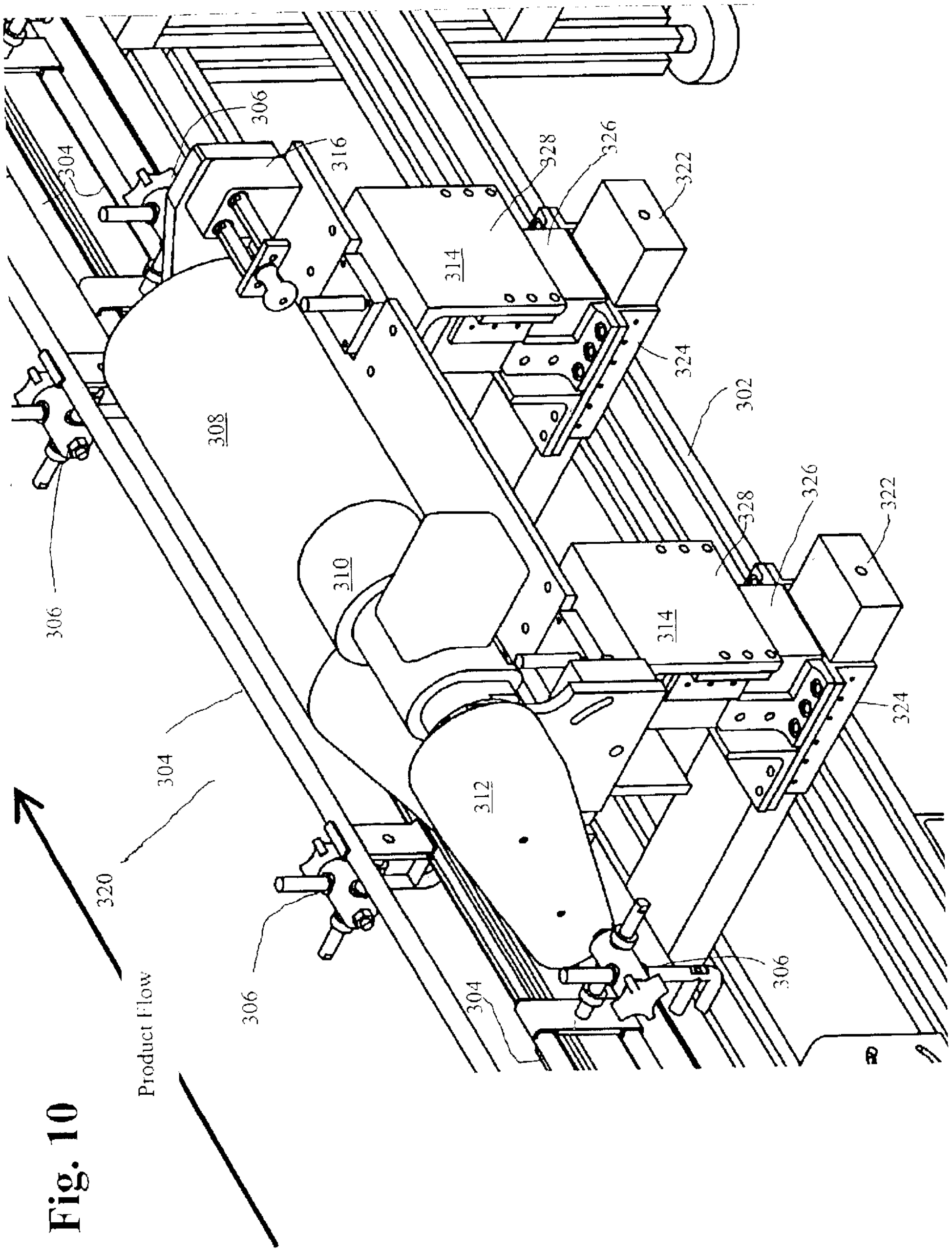
FIG. 10 depicts a more detailed perspective view of one embodiment of the gating screw assembly of the in-feed section of FIG. 6.

FIG. 10 shows a more detailed perspective view of one embodiment of the gating screw assembly 320 of the in-feed section 102 of FIGS. 6 and 7. The gating screw assembly 320 includes a screw 308, a motor 310, a transmission 312 and a carriage/chassis 314. The motor 310 comprises an alternating current motor having a variable frequency drive which drives the rotation of the screw 308 via the transmission 312. In an alternate embodiment, the motor 310 comprises a servo motor. In one embodiment, the motor 310 includes a model VLHF05/T0541-B AC motor manufactured by VL Motion Systems, Inc., located in Oakville, Ontario, Canada. In one embodiment, the transmission 312 includes a belt and pulley arrangement, not shown, to transfer the motive force of the motor 310 to the screw 308. It will be appreciated that other types of transmissions 312 may be used including a direct drive or gear based transmission. In one embodiment, using the system control and human machine interface 108, which is coupled with, and controls, the motor 310, the screw 308 may be automatically rotated to a home position when initiating, restarting or recovering operation of the machine. In this embodiment, the screw 308 includes a mechanical feature which is detected by a sensor (see FIG. 28), such as a magnetic or mechanical switch or proximity sensor, coupled with the system control and human machine interface 108. Sensing the mechanical feature of the screw 308 permits the system control and human machine interface to learn the position of the screw 308 and control the motor 310 appropriately to rotate the screw 308 to the desired position.

The screw 308 features threads (not shown) which, as the screw rotates, engages the articles from the conveyor 318 between opposing threads, and drives the articles forward along the conveyor 318. The screw 308 threads are not shown in the figure, however one of ordinary skill in the art would appreciate that the size, shape and pitch of the screw threads are dependent upon the configuration of the article to be labeled and the desired spacing to be imparted between articles as they are conveyed on the conveyor 318. The screw 308 threads are spaced so as to allow only one article between any two opposing threads along the length of the screw 308. In such a manner, as the screw 308 rotates, it paces and spaces the articles at a pre-determined rate and distance, based on the rotational velocity of the screw 308 and thread pitch. As the articles are delivered to the machine 100 by other unconnected machinery or by hand, such flow control is necessary to stabilize the input of articles and establish a consistent quantity/rate of articles according to the set machine cycle, e.g. 200 articles per minute. This further allows other mechanical elements of the machine 100 to operate properly. For example, adequate spacing between the articles is important to allow electronic eye sensors (See FIG. 28), mounted on the machine 100 and coupled with the system control and human machine interface 108, to detect motion and ensure that the articles are moving through the machine properly. Further, the screw 308 establishes a stable and properly spaced flow of articles through the environmental preparation station, preventing bunching-up of the articles which may impede the ability to decontaminate them.

As can be seen, the screw 308 is configured, e.g. diameter, thread pitch, etc., for a particular article. Further, the screw 308 must be positioned properly with respect to the conveyor 318 to properly engage the articles as described. In one embodiment, the screw 308 is designed to be interchangeable, as described below, to allow it to be swapped out depending on the configuration of the articles to be labeled. In an alternate embodiment, the screw 308 features an adjustable diameter and/or thread pitch, obviating the need to swap it out during changeovers.

The screw 308, motor 310 and transmission 312 are all mounted on a chassis 314 which permits movement/adjustment of the screw 308, motor 310 and transmission 312 as a single unit. This eliminates the need to adjust the motor 310 and transmission separately when adjusting the screw 308 position. The chassis 314 includes front and rear horizontal rails 322, front and rear horizontal sliders 324, front and rear vertical rails 326 and front and rear vertical sliders 328.

The screw assembly 320 is essentially mounted to the front and rear vertical sliders 328 which slide along the front and rear vertical rails 326, respectively. The front and rear vertical rails 326 are supported by the front and rear horizontal sliders 324, respectively, which sit on the front and rear horizontal rails 322 respectively, which are fixedly attached to the support structure 302. The horizontal rail 322 and horizontal slider 324 arrangement permits horizontal movement of the screw assembly 320 with respect to the conveyor 318 while the vertical rail 326 and vertical slider 328 arrangement permits vertical movement of the screw assembly 320. In this way, the screw 308 may be adjusted along either or both of the vertical and horizontal axes. Hand operated adjustment mechanisms, such as a hand wheel, hand crank or lever, not shown in the figure, are provided, which allow the screw assembly 320 to be adjusted as described or locked in position. In one embodiment, separate hand operated adjustment mechanisms are provided for the horizontal and vertical adjustments. Stops or stepped positions may be provided to aid positioning for specific article configurations, along with the ability to fine tune or modify the stop or stepped positions. In an alternate embodiment, horizontal and/or vertical movement is mechanically assisted, such as by a hand crank and gear assembly or motor. In motorized embodiments, the system control and human machine interface 108 may be coupled with the motor and with screw assembly position sensors to automatically home the screw assembly 320 to the correct position for various article configurations.

Further, the screw 308 is designed so as not to require a through shaft or drive shaft running through the length of the screw 308. In one embodiment, the screw 308 features bearings on either end which mate with mounting points on the chassis 314. One mounting point engages the transmission 312 while the other mounting point engages a releasable mechanism which holds the screw 308 in place. A release lever 316 is provided with disengages the release mechanism thereby allowing the screw 308 to be removed without having to remove a through shaft and without the need for tools. This reduces changeover time for the screw 308 from 20 minutes to under 5 minutes. As the releasable mechanism is separate from the horizontal and vertical adjustment mechanisms, the screw 308 may be changed without affecting the screw 308 position relative to the conveyor 318. This further speeds changeovers by eliminating unnecessary adjustments.

Figure 11:
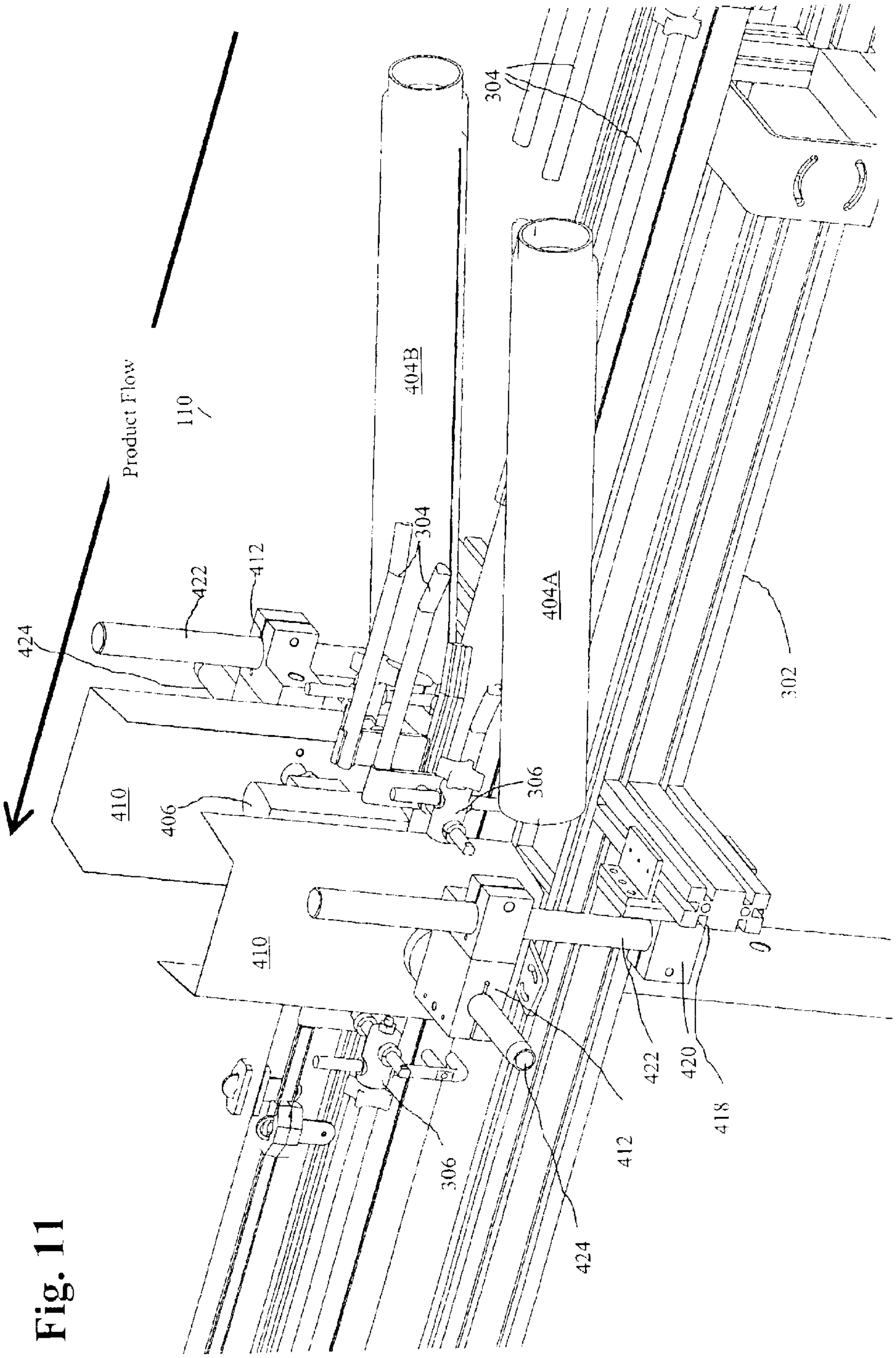
FIG. 11 depicts a more detailed perspective view of one embodiment of the environmental preparation system of the in-feed section of FIG. 6.

Returning to FIGS. 6–9, after the article leaves the gating screw assembly 320, it is conveyed through the environmental preparation station 110. FIG. 11 shows a more detailed perspective view of one embodiment of the environmental preparation station 110 of the in-feed section 102 of FIG. 6. The environmental preparation station 110 includes air knives 404A, 404B and flame burners 406 (left flame burner not shown). As was described above, the environmental preparation station 110 removes condensation or other contamination from the articles and oxidizes the article surface prior to labeling to ensure proper label application and adhesion. Such preparation is important where the machine 100 is operating in an uncontrolled environment, especially with articles that are susceptible to contamination, such as chilled articles which are susceptible to forming condensation on their surface in non-refrigerated environments. In one embodiment, the environmental preparation station 110 is designed to handle articles chilled to 32–40° F. in an environment having a temperature of 70° F. and a relative humidity of 50%.

As the articles move along the conveyor 318 from the gating screw 308, they encounter air knives 404A, 404B mounted on either side of the conveyor 318. The air knives 404A, 404B create a curtain of high velocity air which blows or sweeps contamination from the surface of the articles as they pass through. In one embodiment, the air knives 404A, 404B include the model 12852-20-.055 Gap 24 inch air knife coupled with a model 19150 10 horsepower blower motor and model 122170-190 blower motor pulley for regulating the blower motor speed, all manufactured by Sonic Air Systems, located in Brea, Calif. The air knives 404A, 404B are angled such that the top of the article encounters the air curtain first, with the air curtain sweeping down the article as the article moves through. It will be appreciated that other orientations of the air knives 404A, 404B may be used to optimally sweep contamination off of an away from the articles and to prevent the contamination from contaminating the components of the machine 100. Further, air knives 404A, 404B which are designed to create specific air flow patterns may also be used.

High velocity air is supplied from the room to the air knives 404A, 404B by a compressor/blower, not shown, via hoses, not shown, coupled between the compressor and the air knives 404A, 404B. Because the compressor warms the air during compression, the air knives 404A, 404B also help to increase the article's surface temperature which may also aid the labeling process. In one embodiment, the air is delivered with a velocity of 25–30,000 feet per minute and a temperature of 115–120° F. Note however that the disclosed embodiments maintain only brief contact with the warm air generated by the air knives 404A, 404B by moving the articles through the air curtain at a rate of 200–250 articles per minute to achieve the necessary decontamination and surface warming and avoid raising the temperature of the article contents. The minimum rate at which articles must move through the machine 100 to avoid excessive contact with treatment areas which may damage the article or applied label depends on the type of article being labeled, e.g. plastic or glass, and the type of label being applied, e.g. based on the label composition, but in one embodiment, the minimum rate is approximately 50 articles per minute. It will be appreciated that the rate at which articles are moved through the machine is implementation dependent and that the air knives' 404A, 404B air flow velocity and/or temperature may be increased or decreased based on the rate and resultant change in contact time with the air curtain, to maintain the desired effects. For example, heaters could be provided to further increase the air or article surface temperature. In one embodiment, ionized air is blown on to the articles to remove dust, debris or other contaminants.

When labeling empty or otherwise light weight articles, the air knives 404A, 404B may be turned off or the air flow/velocity reduced so as not to impede movement of the articles along the conveyor 318. Weight sensors may be provided to detect the article weight and allow the system control and human machine interface 108 to adjust the air flow/velocity accordingly.

After the articles pass through the air curtain created by the air knives 404A, 404B, they are conveyed by flame burners 406 located on either side of the conveyor (both burners not shown) to oxidize the surface of the article in preparation for labeling. In one embodiment, the flame burners 406 include model 007-845 6" brass single ribbon adjustable burner units manufactured by Flynn Burner Corp., located in New Rochelle, N.Y. Oxidation significantly improves label adhesion. The articles need only have brief contact with the flame from the burners 406 to adequately oxidize the surface. Note that the disclosed embodiments maintain only brief contact with the burners 406 by moving the articles through the flame generated by the burners 406 at a rate of 200–250 articles per minute to achieve the necessary oxidation of the surface and avoid raising the temperature of the article contents. The minimum rate at which articles must move through the machine 100 to avoid excessive contact with treatment areas which may damage the article or applied label depends on the type of article being labeled, e.g. plastic or glass, and the type of label being applied, e.g. based on the label composition, but in one embodiment, the minimum rate is approximately 50 articles per minute. It will be appreciated that, for different labeling rates, alternate methods may be used to ensure that the articles receive appropriate contact with the flame burners 406, such as accelerating the article through the flame burners 406 but otherwise moving the articles through the machine at a slower rate. The flame burners 406 burn a gas air mixture at a temperature of approximately 1300° F. The flame burners 406 are located within hoods 410 which shield the flame burners 406 for safety. Further, the flame burners 406 are located at a sufficient distance on the conveyor from the air knives 404A, 404B such that the air flow/air vortex created by the knives 404A, 404B does not disturb or otherwise disrupt the flame created by the burners 406. In one embodiment, the flame burners are set 18 inches from the near end of the air knives 404A, 404B.

The flame burners 406 and hoods 410 are mounted to adjustment mechanisms which permit the flame burner 406 position and orientation to be adjusted with respect to the conveyor 318 and the articles being conveyed. The adjustment mechanism allows adjustment along both the vertical and horizontal axes as well as adjustment of the angle of the burner 406 face relative to the conveyor. The burners 406 are mounted to horizontal shafts 424 which are coupled with vertical shafts 422 by an adjustable couplings 412. the vertical shafts 422 are coupled with horizontal rails 418 by adjustable couplings 420. The horizontal rails 418 are fixedly attached to the support structure 302.

The adjustable couplings 412, 420 feature manually actuated mechanisms (not shown) to allow movement of the burner and lock the position in place. Such manually actuated mechanisms may include thumb wheels, hand cranks or levers. Each adjustable coupling 412, 420 may be independently actuated to permit independent adjustment along each of the vertical and horizontal axes as well as the angle. Adjustable coupling 412 along with horizontal shaft 424 permit pivoting of the burner 406 in a vertical plane as well as adjustment of the horizontal position of the burner 406. Adjustable couplings 412 and 420, in combinations with the vertical shaft 422, permit adjustment of the burner 406 angle in a horizontal plane as well as adjustment of the burner 406 height. Adjustable coupling 420 in combination with horizontal rail 418 permits adjustment of the horizontal position of the burner 406. Each of the adjustable couplings 412, 402, shafts 422, 424 and horizontal rail 418, may feature stops or stepped positions configured for particular article configurations which allow an operator to easily move the burners 406 to handle different articles. In one embodiment, each of the adjustable couplings 412, 402, shafts 422, 424 and horizontal rail 418 permit fine tuning of the position and/or adjustment or modification to the stops or stepped positions. In yet another embodiment, one or more of the axes of movement may be motorized and coupled with the system control and human machine interface 108 to provide automated configuration of the burner 406 position.

Referring back to FIGS. 6–9, after the articles pass by the flame burners 406, they are conveyed to the in-feed screw 1004 of the label application section 104. The in-feed screw 1004 of the label application section 104 features a low friction bead rail 416 to prevent rotation of the articles as they are conveyed along.

The label application section 104 features an additional set of air knives (not shown), similar to the air knives 404A, 404B of the in-feed section 102, located just before the point of label application, i.e. the platens 1414 and transfer rollers 1416 of the web modules 114A, 114B of the label application section 104 of the machine 100. In one embodiment, the second set of air knives include the model 12556-06-.055 6 inch air knife coupled with a model 19150 10 horsepower blower motor and model 122170-190 blower motor pulley for regulating the blower motor speed, all manufactured by Sonic Air Systems, located in Brea, California. In an alternate embodiment, the second set of air knives is not present. The second set of air knives are located after the in-feed screw 1004 and as close to the point of label application, i.e. the transfer roller 1416, as possible, but not too close so as to disrupt operation of the label transfer mechanisms with the air vortex created by the air knives. In this embodiment, the air knives are located approximately 12 inches from the transfer roller 1416. These additional air knives (not shown) are identical to the air knives 404A, 404B located in the environmental preparation station 110 and are used to ensure that condensation has not reformed or contamination has not been re-deposited on the articles prior to labeling after they pass by the flame burners 406. It will be appreciated that the provision of additional environmental preparation stages is dependent upon the implementation of the machine 100 and the environment in which the machine 100 is located. These secondary air knives also impart addition heat (created by the compression of air) to the article surface/label panel which enhances transfer of the decoration from the web to the article and adhesion. The additional heat results in only about a 1–2° F. rise in surface temperature to achieve these benefits. In one embodiment, the air is delivered with a velocity of 15–20,000 feet per minute and a temperature of 115–120° F. Alternatively, a flame burner could be used instead of or in addition to the air knives to impart the necessary heat to the article surface. Note however that the disclosed embodiments maintain only brief contact with the warm air generated by the secondary air knives by moving the articles through the air curtain at a rate of 200–250 articles per minute to achieve the necessary decontamination and surface warming and avoid raising the temperature of the article contents. The minimum rate at which articles must move through the machine 100 to avoid excessive contact with treatment areas which may damage the article or applied label depends on the type of article being labeled, e.g. plastic or glass, and the type of label being applied, e.g. based on the label composition, but in one embodiment, the minimum rate is approximately 50 articles per minute. It will be appreciated that the rate at which articles are moved through the machine is implementation dependent and that the air knives' air flow velocity and/or temperature may be increased or decreased based on the rate and resultant change in contact time with the air curtain, to maintain the desired effects. For example, heaters could be provided to further increase the air or article surface temperature. In one embodiment, ionized air is blown on to the articles to remove dust, debris or other contaminants.

After the article has been conveyed through the environmental preparation assembly, ibis conveyed to the in-feed screw 1004 of the label application section 104. In one embodiment, the guide rails 304 along this section of the in-feed section 102/label application section 104 utilize a "bead" rail to facilitate movement of heavier filled articles without imparting rotation on those article which would misalign them for entry to the label application section 104. Note that the distance between the environmental preparation station 110 and the in-feed screw 1004 of the label application section 104 is implementation dependent and must be set so that the articles do not get re-contaminated prior to having the labels applied. As mentioned above, in one embodiment, the label application section 104 features a second set of air knives (not shown) similar to those used in the environmental preparation station to blow off any additional contamination, e.g. condensation, which may have formed or otherwise been deposited on the article between the flame burners 406 of the environmental preparation station 110 and the in-feed screw 1004 of the label application section, as well as impart heat to the surface of the article, as discussed above. These air knives may be coupled with environmental sensors, such as temperature and/or humidity sensors which sense ambient environmental conditions, via the system control and human machine interface 108 to operate only when necessitated by environmental conditions.

Figure 13:
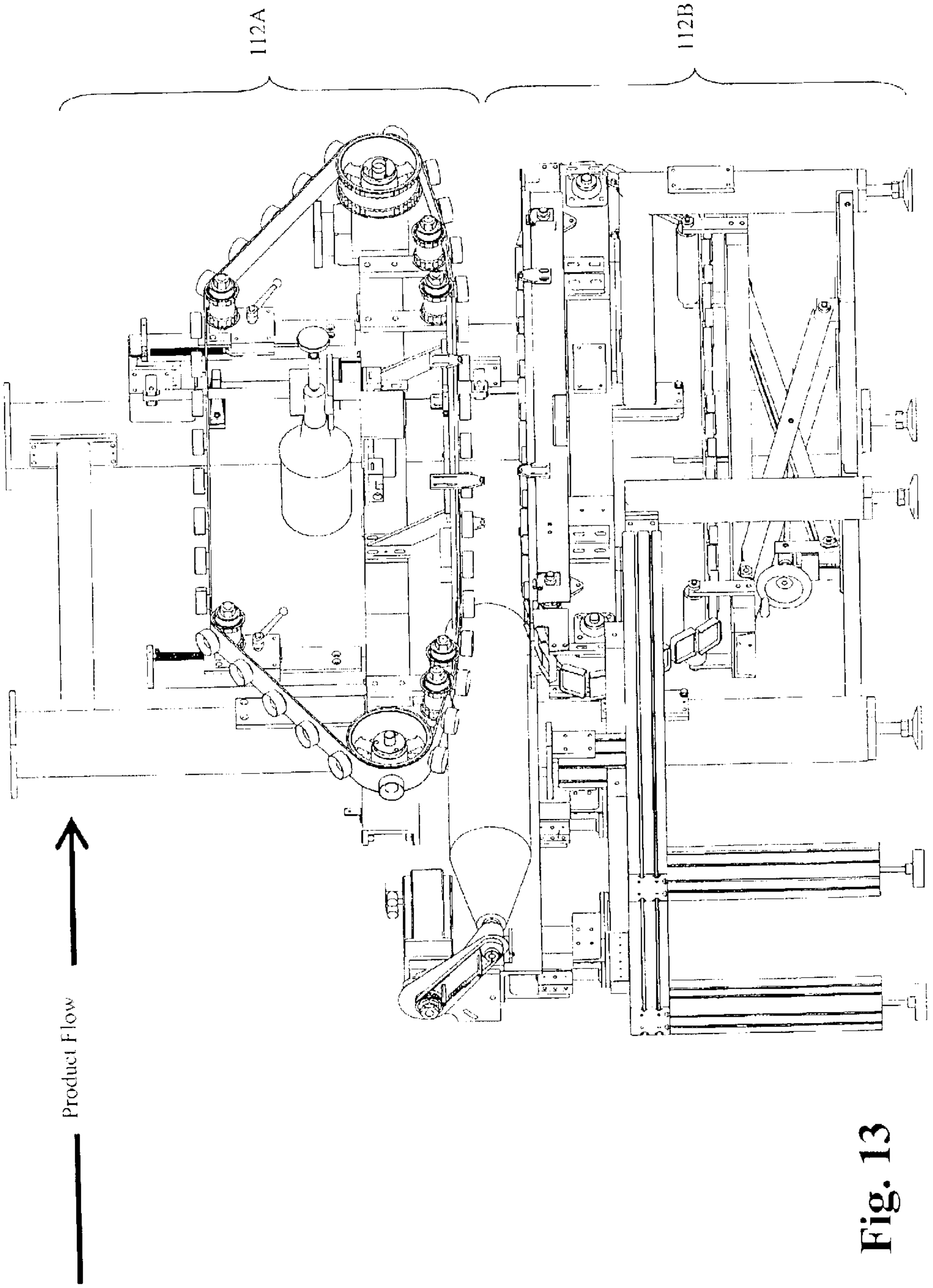
FIG. 13 depicts a perspective view of one embodiment of the conveyor assembly of the label application section, also referred to as the center section, of the heat transfer label machine of FIG. 5B.

FIG. 13 shows a perspective view of one embodiment of the conveyor assembly 112 of the label application section 104, also referred to as the center section, of the heat transfer label machine 100 of FIG. 5B. The conveyor assembly 1112 constrains and positions each of the articles for application of the labels by the web modules 114A, 114B. The conveyor assembly 112 is shown in more detail in FIGS. 14–17.

Figure 14:
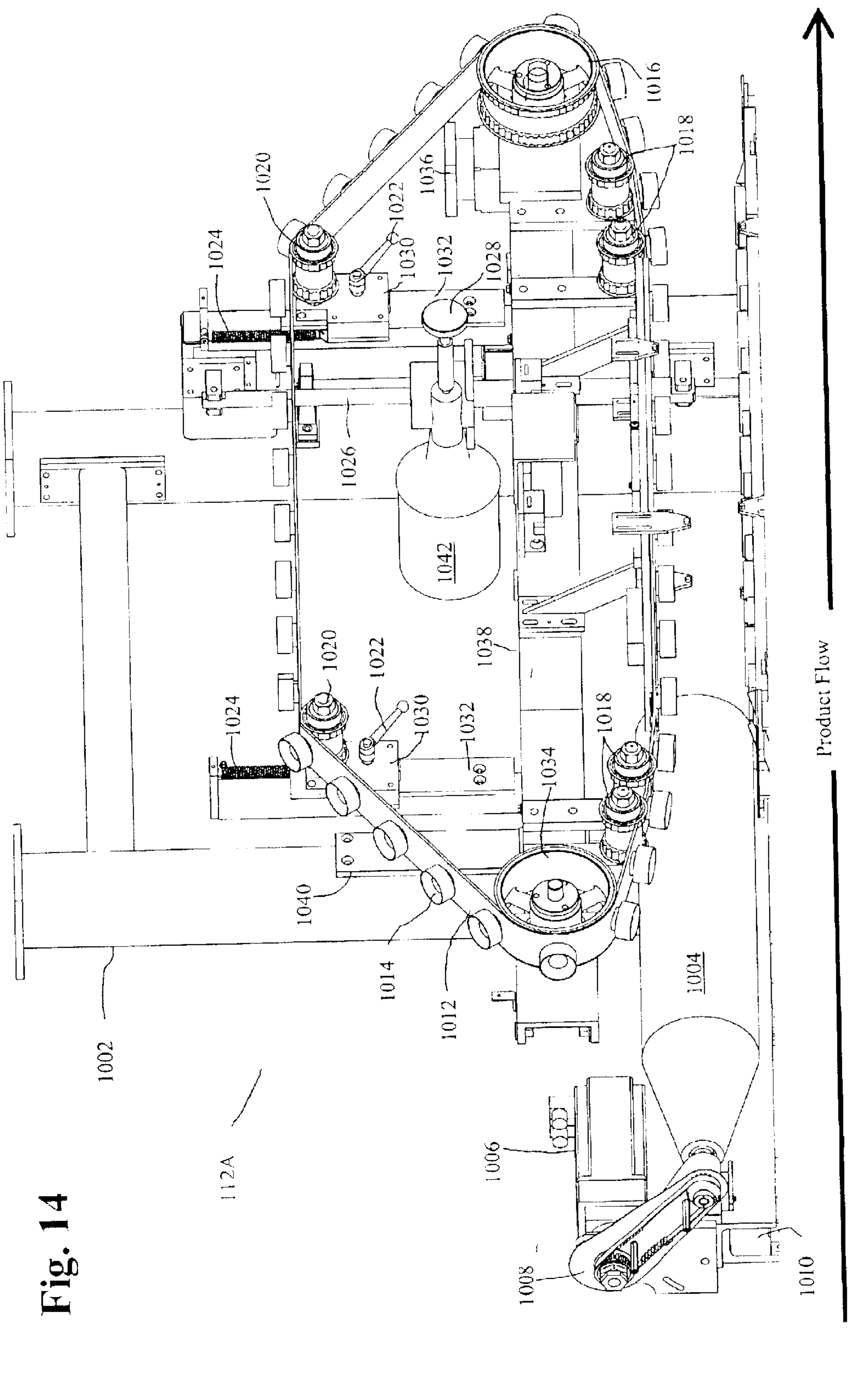
FIG. 14 depicts a more detailed perspective view of the upper conveyor assembly of FIG. 13.

FIG. 14 shows a more detailed perspective view of a portion of the conveyor assembly 112, and in particular, the upper conveyor assembly 112A of FIG. 13. The conveyor assembly 112 includes an in-feed screw 1004, an upper conveyor assembly 112A and a lower conveyor assembly 112B, shown in more detail in FIG. 15, mounted on a support structure 1002. The in-feed screw 1004 is mounted on a chassis 1010 and includes a motor 1006 which drives the in-feed screw 1004 via a transmission 1008. The in-feed screw 1004 assembly is identical to the gating screw assembly 320 described above and includes all of the adjustability features described, except that the drive motor 1006 is a servo motor instead of an AC motor for more precise control. For more detail about the in-feed screw 1004 assembly, refer to the discussion above related to the gating screw assembly 320. While the motor 1006 is shown driving the screw 1004 via a belt and pulley based transmission 1008, it will be appreciated that other types of transmissions 1008 may be used including a direct drive or gear based transmission. The in-feed screw 1004 performs a similar function as that of the gating screw 308, paces and spaces the articles so that they may be properly engaged by the neck cups/nozzles 1014 and heel cups 1104 of the upper and lower conveyors 112A, 112B, as will be described below. In on embodiment, the in-feed screw 1004 drive motor 1006 comprises a model PMA4 servo motor manufactured by Pacific Scientific, Inc., located in Rockford, Ill.

The upper conveyor 112A receives and constrains the top portion of the article as the article is positioned for label application. The upper conveyor 112A features a conveyor belt 1012 which is mounted on pulleys 1016, 1018, 1020 and 1034. The pulleys 1016, 1018, 1020 and 1034 are all mounted to an adjustable frame 1038 which is turn mounted on rails 1040 which are fixedly attached to the support structure 1002. The conveyor belt 1012 is continuously driven in the direction of product flow by the drive pulley 1016 which is connected with a servo motor 1036 by a transmission (not shown). A servo motor 1036 is power control system that converts a small mechanical motion into one requiring much greater power and may include a negative feedback system. In one embodiment, the servo motor 1036 includes a model PMA4 servo motor, manufactured by Pacific Scientific, Inc., located in Rockford, Ill. The transmission may be any one of a pulley/belt, gear or direct drive transmission system. The remaining pulleys 1018, 1020 and 1030 keep the conveyor belt 1012 aligned and under proper tension. The conveyor belt 1012 includes neck cups nozzles 1014 which engage the neck of the articles as they are fed forward by the in-feed screw 1004. Once engaged, the neck cups/nozzles 1014 serve to constrain the upper portion of the article as it is conveyed to the web modules 114A, 114B as described. Note that idler pulley 1018 aid in engaging spouted articles in the neck cups/nozzles 1014.

In an embodiment of the machine 100 designed to label empty articles, the upper conveyor 112A may features a system to blow air into the articles through the neck cups/nozzles 1014 of the conveyor belt for the purpose of providing lateral support to the article during the label application process. Such as system is known in the art and described above. For filled articles, such as system is not needed as the product within the article provides the requisite lateral support. In one embodiment, an air support system is provided but is capable of being disabled when the machine 100 is labeling filled articles.

The upper conveyor 112A further features a height adjustment mechanism which permits the height of the conveyor belt 1012 to be adjusted relative to the rest of the machine 100, without affecting the belt 1012 tension or alignment, so as to properly engage the articles or to allow the operator to move the upper conveyer 112A out of the way for maintenance or to change the screw 1004. As was described above, the conveyor belt 1012 is mounted on pulleys 1016, 1018, 1020 and 1034. The pulleys 1016, 1018, 1020 and 1034, as well as the servo motor 1036 are all mounted to an adjustable frame 1038 which is mounted on rails 1040. The rails 1040 are fixedly attached to the support structure 1002 and permit the adjustable frame to move up and down. The adjustment mechanism further includes an AC motor 1042 fixedly attached to the support structure 1002 coupled with a jack screw 1026 (threads not shown) fixedly mounted to the adjustable frame 1038. In one embodiment, the AC motor 1042 includes a model FM2002-12808 (FCCM-1802-12B) Worm Gear Actuator Assembly including a C-Face mounting with ¾ horse power brake motor, manufactured by Duff-Norton, located in Charlotte, N.C., a division of Columbus Mckinnon Corporation, located in Amherst, N.Y. Actuation of the AC motor 1042 is transmitted to the jack screw via a gear transmission and causes the adjustable frame 1038 to move up or down depending on the direction of rotation of the AC motor 1042. Further, a hand wheel 1028 is provided to allow the operator to manually fine tune the height adjustment. The hand wheel 1028 is directly connected to the drive shaft of the AC motor 1042 and, therefore, adjusts the height of the adjustable frame 1038 by the same mechanism. In one embodiment it requires 24 turns of the motor 1042 or hand wheel 1028 to move the adjustable frame one inch. A measurement scale or other operator feedback device may be provided on the machine to indicate the current height to the operator and aid the height adjustment. In an alternate embodiment, a precision motor 1042 such as a servo motor may be used which can automatically fine tune the position. This height adjustment mechanism alleviates the need for the operator to manually move the upper conveyor assembly 112A, which may be considerably heavy.

Figure 28:
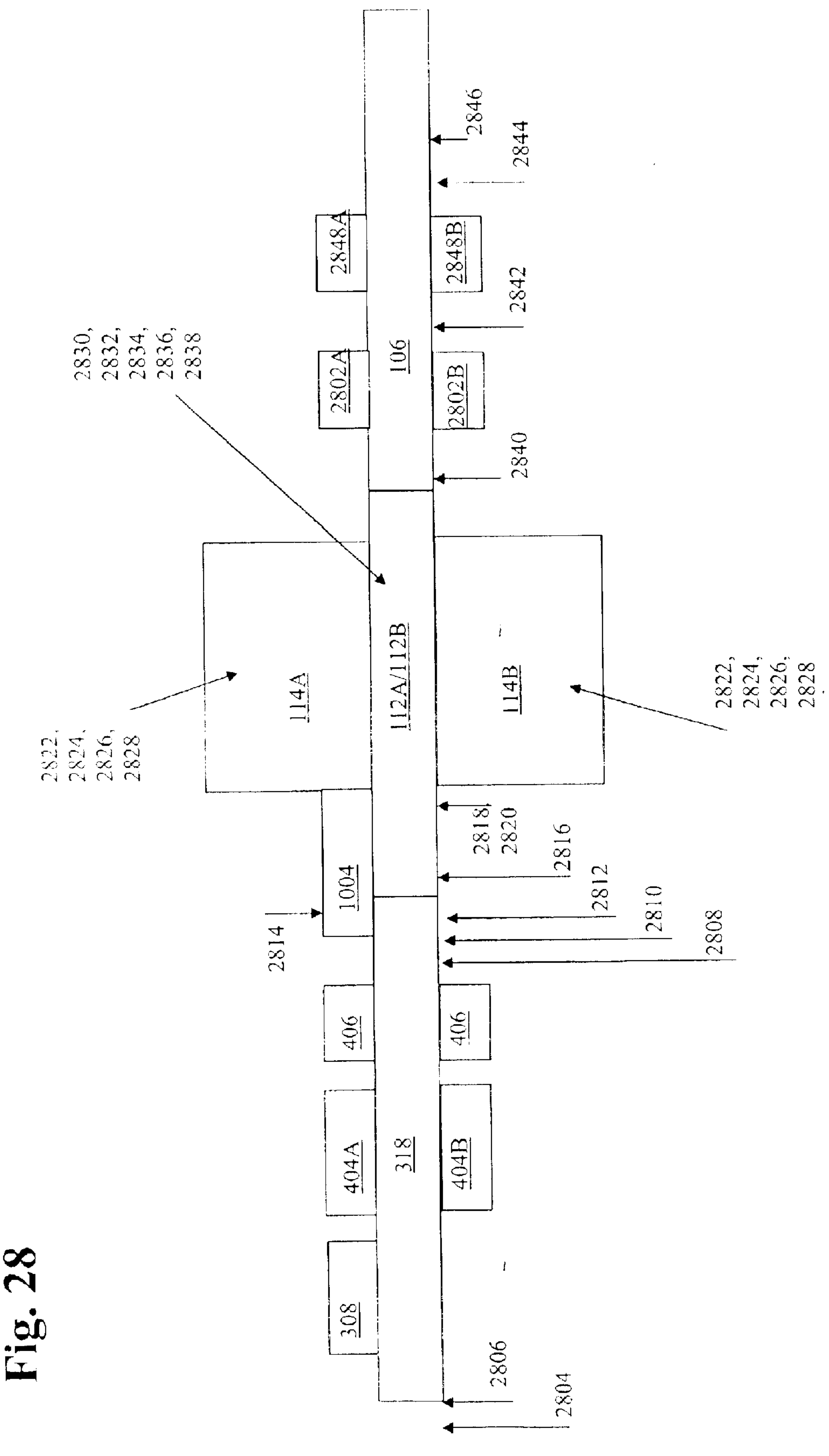
FIG. 28 shows a block diagram depicting the various sensors of the heat transfer labeling machine of FIG. 5A.

Referring to FIG. 28, in one embodiment, the adjustment mechanism features position sensors 2830, 2832, 2834 to determine the position of the upper conveyor 112A, thus permitting the system control and human machine interface 108 to control the lift AC motor 1042 and automate the adjustment process. The sensors include a limit sensor 2830, a first position sensor 2832 and a second position sensor 2834. The limit sensor determines when the upper conveyor 112A is moved to far up or down. The first and second position sensors 2832 and 2834 are configured to detect when the upper conveyor 112A is in the proper position for two different article configurations, thereby allowing a quick change-over of the machine 100 between those article configurations. In one embodiment, the sensors 2830, 2832, 2834 each include Ni-3-EG08-AP6X-H1341 Inductive proximity sensors, manufactured by Turck, Inc., located in Minneapolis, Minn. The position sensors 2832, 2834 each sense the position of an adjustable stop (not shown) which can be set for a particular article configuration.

Referring back to FIG. 14, as the neck cups/nozzles 1014 of the conveyor belt 1012 are article specific, changeovers to different articles may necessitate changing the conveyor belt 1012 to a belt 1012 with different neck cup/nozzle 1014 configuration. The upper conveyor 112A features a quick change feature which allows the belt 1012 to be changed out quickly, e.g. in 3–4 minutes versus 3–4 hours for prior machines. As can be seen in the Figures, all of the pulleys 1016, 1018, 1020, 1034 are mounted in a cantilever fashion, i.e. mounted to the adjustable frame 1038 on only one side. This permits the belt 1012 to be easily removed form the open side. Idler pulleys 1020 are mounted on movable slides 1030 which move on rails 1032 which are fixedly attached to the adjustable frame 1038. Actuation of the release mechanism 1022 on each slide 1030 allows the slide 1030 to move down, thereby loosening the belt 1012 and allowing it to be removed. Springs 1024 coupled with the slides 1030 counter-balance the loading so that the slides 1030 do not slide down the rails 1032 to fast or otherwise in a dangerous fashion. Once the new belt 1012 is installed, the operator pushes the slides 1030 back up the rails 1032, aided by the springs 1024, to achieve the desired tension and locks them in position with the release mechanisms 1022. While the disclosed mechanism combines the ability to remove the belt 1012 with the ability to adjust the belt 1012 tension, it will be appreciated that separate mechanisms for releasing the belt 1012 and adjusting the belt tension may be provided.

Figure 15:
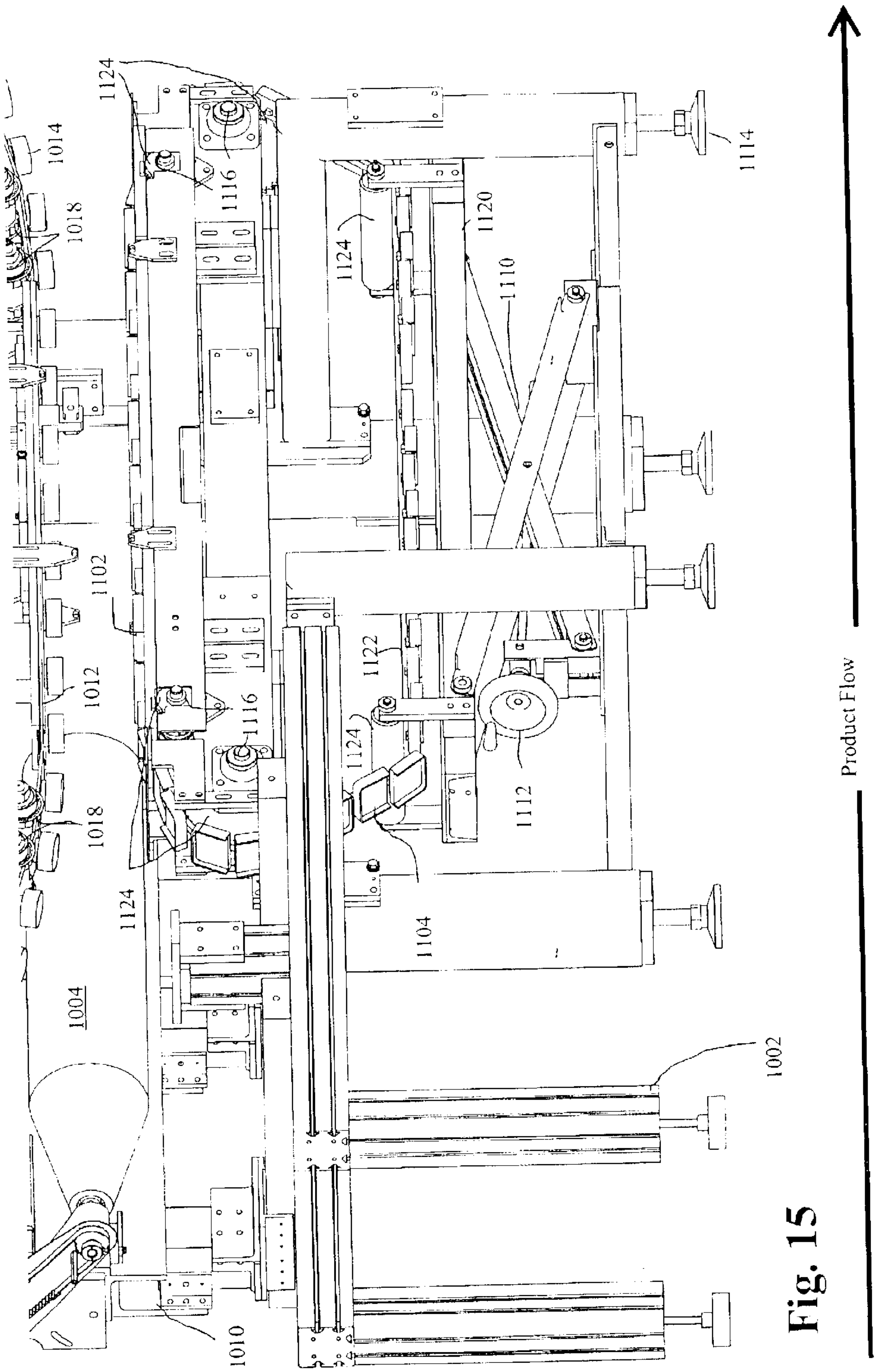
FIG. 15 depicts a more detailed perspective view of the lower conveyor assembly of FIG. 13.

FIG. 15 shows a more detailed perspective view of the lower conveyor assembly 112B of FIG. 13. The lower conveyor assembly 112B includes a conveyor belt 1122 mounted on pulleys 1124 which are mounted on an adjustable frame 1120. the conveyor belt is driven by a servo motor 1118, shown in FIG. 17, via one of the pulleys 1124. In one embodiment, the servo motor 1118 includes a model PMA4 servo motor, manufactured by Pacific Scientific, Inc., located in Rockford, Ill. The conveyor belt 1122 includes two parallel chains to which several heel cups 1104 are attached. As the conveyor belt 1122 moves, the heel cups 1104 engage the bottom of the articles as they are pushed forward by the in-feed screw 1004 and constrain the bottom portion of the articles as they are moved past the web modules 114A, 114B for label application.

The lower conveyor assembly 112B features a belt 1122 tension adjustment feature which allows the tension of the conveyor belt 1122 to be adjusted. The adjustable frame 1120 is mounted on a hand operated scissor lift mechanism 1110 which has a hand crank 1112. The scissor life mechanism 1110 is fixedly attached to the support structure 1002. Actuation of the hand crank 1112 causes the scissor lift mechanism 1110 to move up or down thereby increasing or reducing the tension of the conveyor belt 1122.

The lower conveyor assembly 112B height is adjusted relative to the rest of the machine 100, and, in particular, the in-feed screw 1004 using the leveling feet 1114 of the support structure 1002.

For changeovers to different article configurations, an operator need only uncouple one portion of the conveyor belt 1122 and remove the belt 1122 from the frame 1120. The new belt 1122 is then threaded in around the pulleys 1124 and the ends coupled together. In one embodiment, the lower conveyor belt 1122 may be uncoupled with only the use of a small screwdriver or needle nose pliers, which is the only tool required for the entire change-over process. In an alternate embodiment, the lower conveyor belt 1122 may be uncoupled without the use of tools.

To support various article configurations, the pulleys 1124 feature outboard bushings 1116 which allow additional pulleys, not shown, to be mounted on the outside of the adjustable frame 1120. this permits a wider conveyor belt 1122 with outboard chains that support wider heel cups to be utilized, thereby allowing for wider articles to be labeled.

Figure 16:
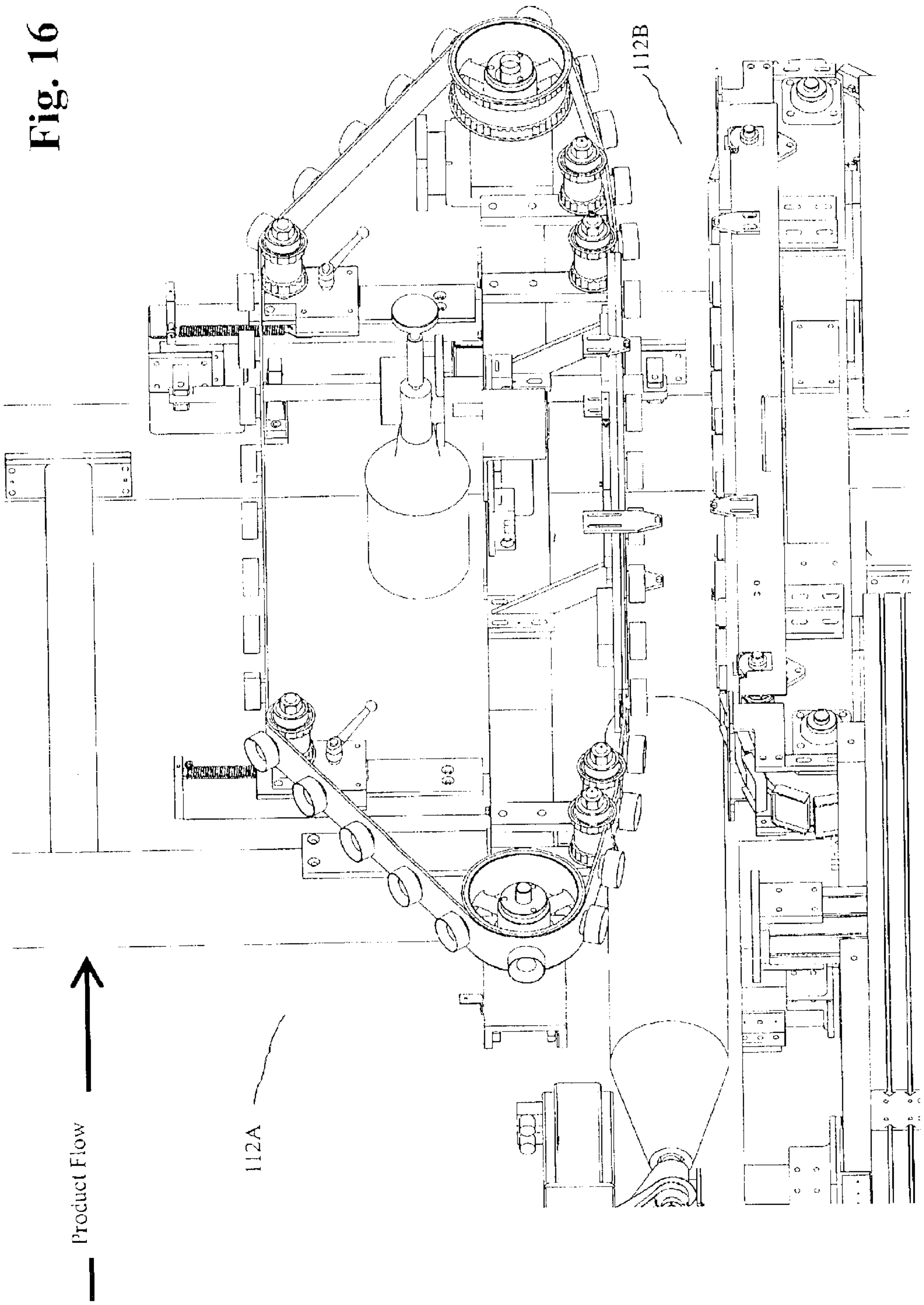
FIG. 16 depicts an alternate more detailed perspective view of the upper conveyor assembly of FIG. 13.
Figure 17:
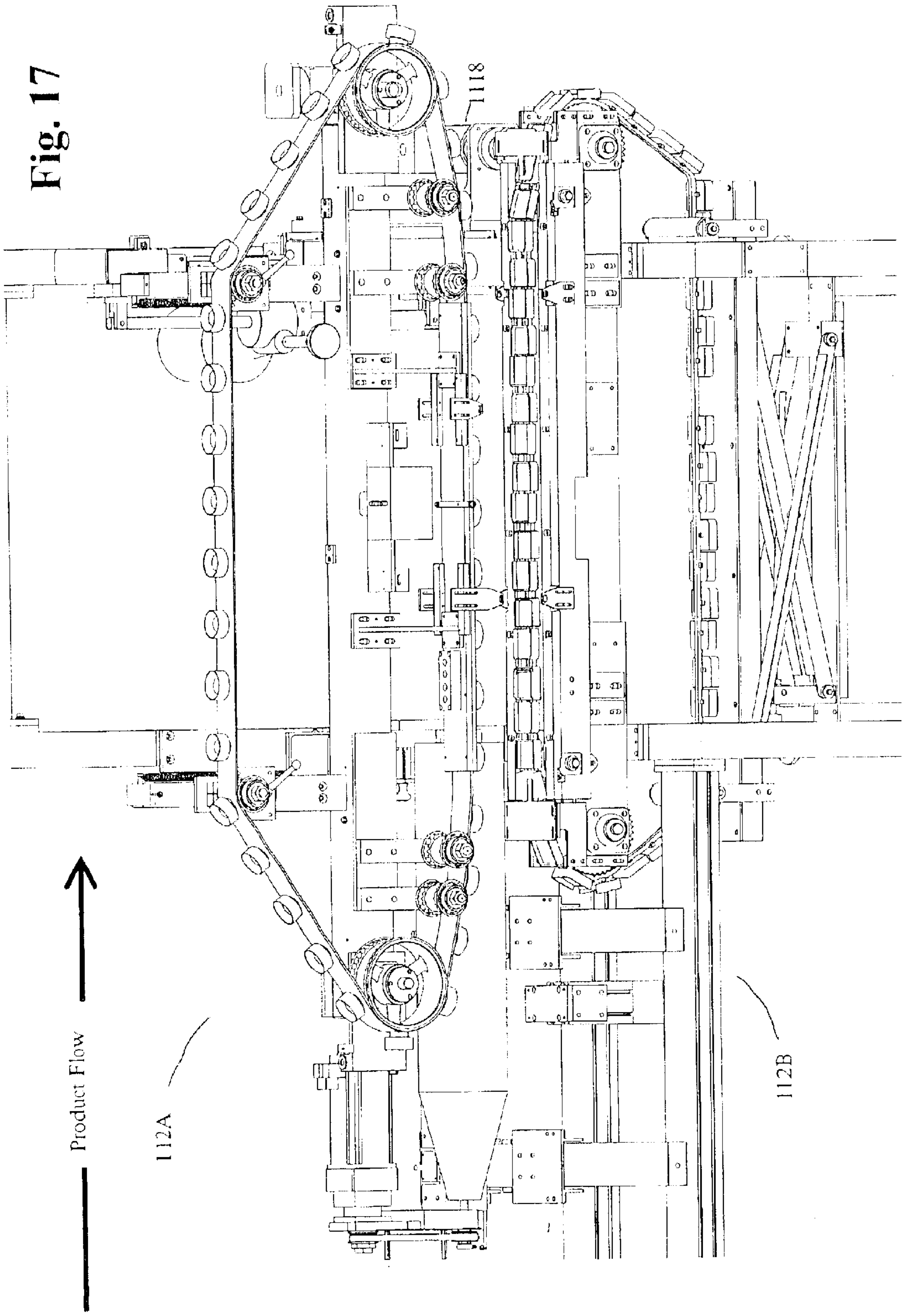
FIG. 17 depicts an alternate more detailed perspective view of the conveyor assembly of FIG. 13.

FIG. 16 shows an alternate more detailed perspective view of the upper conveyor assembly 112A of FIG. 13. FIG. 17 shows an alternate more detailed perspective view of the conveyor assembly 1112 of FIG. 13, showing the servo motor 1118 which drives the lower conveyor 112B.

The conveyor assembly 112 discharges the labeled articles to an out-feed conveyor, not shown, which conveys the articles to additional manufacturing or packaging steps. The out-feed conveyor is similar to the in-feed conveyor 318 and is driven by an AC motor. In one embodiment, the out-feed conveyor motor includes a model VWDM3538 Washdown Duty Gear Motor with a model GR0209B037 5:1 gearbox both manufactured by Baldor Electric Company, Fort Smith, Ark. Further processing of the labeled articles may be performed while they are conveyed on the out-feed conveyor. For example, a post labeling flame burner may be provided which is similar to the flame burner 406 of the environmental preparation station 110. In one embodiment, multiple post-labeling flame burners are provided. The post labeling flame burner is used to re-flow residual wax on the label and transform a frosty appearance into a glossy or matte appearance of the label (dependent on type of wax utilized in the heat transfer substrate). The post-labeling flame burner also ensures that optimum label adhesion is achieved by ensuring that the label adhesive is set. In one embodiment with one or more post labeling flame burners, the articles pass through this flame burner at a rate between 200–250 articles per minute to achieve the desired effects. This rate may be adjusted independent of the overall machine 100 labeling rate depending on conditions, such as the amount of residual wax and/or environmental conditions. The minimum rate at which articles must move through the machine 100 to avoid excessive contact with treatment areas which may damage the article or applied label depends on the type of article being labeled, e.g. plastic or glass, and the type of label being applied, e.g. based on the label composition, but in one embodiment, the minimum rate is approximately 50 articles per minute.

Figure 18:
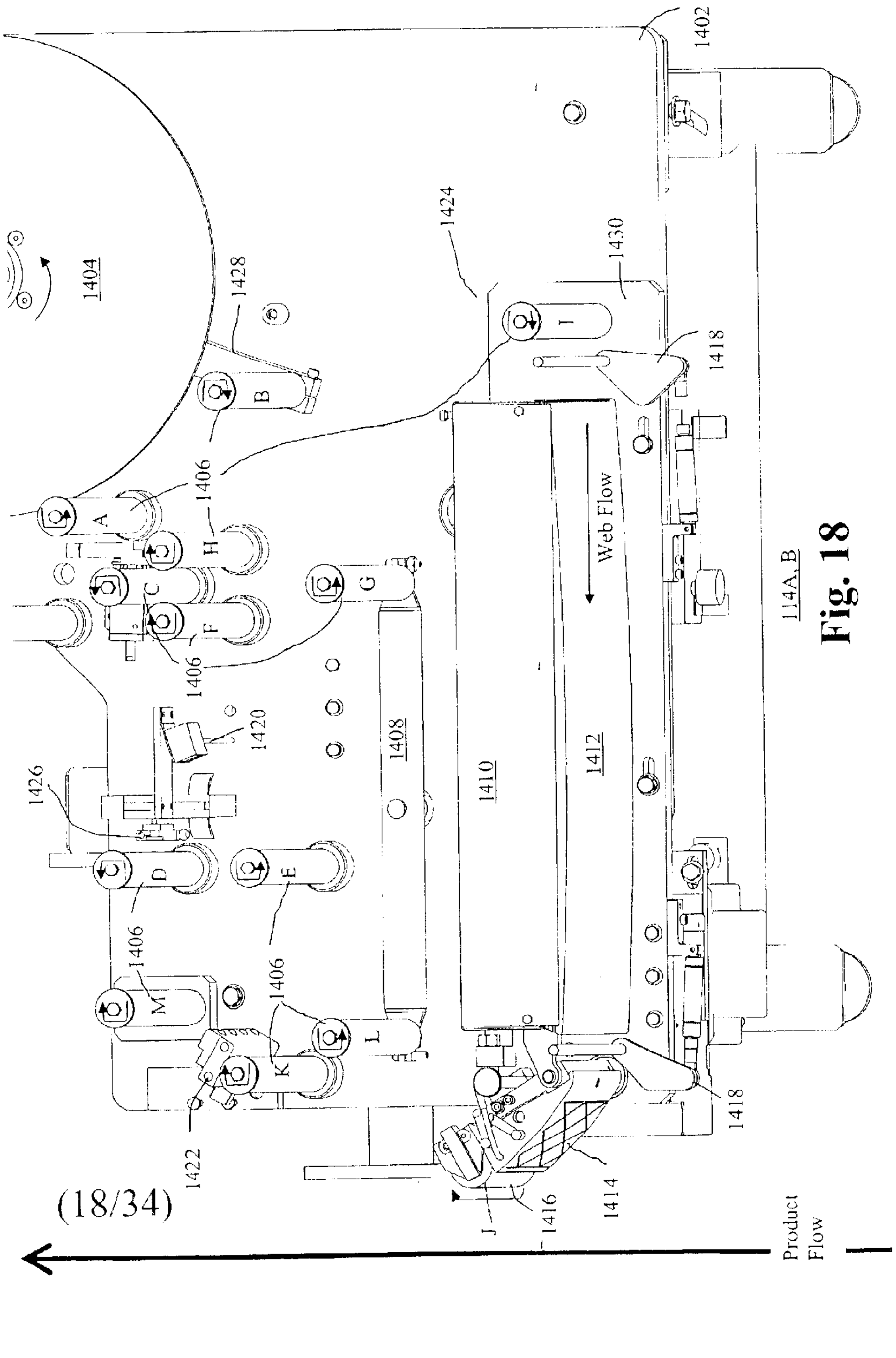
FIG. 18 depicts a top perspective view of one embodiment of the label application assembly of FIG. 5B.

FIG. 18 shows a top perspective view of one embodiment of the web module assembly 114A, 114B of FIG. 5B. The web module assemblies 114A, 114B are mirror images of each other but otherwise identical and are mounted on either side of the conveyor assembly 112 and applies the heat transfer labels to the articles as they are conveyed by the web module assemblies 114A, 114B. The web module assembly 114A, 114B includes a supply disk 1404, guide rollers 1406A-1 and 1406 K–M, an adjustable pre-heat and platen assembly 1424, a shuttle 1408, a registration mark scanner 1426 and a bar code scanner 1420, all mounted on a tooling table 1402. The web modules assembly 114A, 114B further includes a metering roller 1504 and a waste disk 1506, both shown in FIG. 19, also mounted on the tooling table 1402. The web module assembly 114A, 114B is designed to provide a label ready for transfer to the article to the transfer roller 1416 of the adjustable pre-heat and platen assembly 1424 at the precise moment that the article is conveyed by the transfer roller 1416 by the conveyor 112.

The supply disk 1404 holds the label supply reel, not shown, which supplies the web containing the labels. The web is the medium upon which the labels are printed and from which they are transferred to the articles. The supply disk 1404 spins in a counter-clockwise direction as shown and feeds the web into the network of guide rollers 1406. The web is routed around guide roller 1406A and then to guide rollers 1406B, 1406C and 1406D. Guide roller 1406B is mounted on a movable dancer 1428 which is connected to an encoder, now shown. The encoder reports the position of the dancer 1428 to the system control and human machine interface 1108. The dancer 1428 is connected with an air cylinder which is used to control the position of the dancer 1428 to adjust tension of the web. Between guide rollers 1406C and 1406D is a registration mark scanner 1426 which senses registration marks printed on the web between the labels. These marks permit the system control and human machine interface 108 to detect and control the label timing. The registration mark scanner 1426 is height adjustable to account for different width web's as well as different vertical placements of the registration marks on the web. The web is then routed from guide roller 1406D to guide roller 1406E and past the bar code scanner 1420. The bar code scanner 1420 reads bar coded information printed on the web. Such information may include the label type or some other identifier. This information from both web module assemblies 114A, 114B permits the system control and human machine interface 108 to determine if the proper front and back labels are being applied to the articles. As the bar code scanner 1420 is capable of scanning a wide area, it is typically not necessary to adjust the scanner 1420 position for different label webs. The web is then routed from guide roller 1406E to guide roller 1406F and then to guide roller 1406G which is mounted on the shuttle 1408. As will be explained below, the pivoting action of the shuttle 1408 compensates for velocity errors in the speed of the web introduced by the movement of the transfer roller 1416. The web is then routed from guide roller 1406G around guide roller 14061 and in front of the pre-heat plate 1412 of the adjustable pre-heat and platen assembly. The web is the routed around the platen 1414 and the transfer roller 1416 and then to guide roller 1406K and then to guide roller 1406L which is also mounted on the shuttle 1408. From guide roller 406L, the web is route to guide rollers 1406M and then to the metering roller 1504 and waste take up reel mounted on the waste disk 1506.

As will be described below, the supply reel 1404, shuttle 1408 platen 1414 including the transfer roller 1416, the metering roller and the waste disk are all powered by their own servo motors. All of the servo motors are coordinated by the system control and human machine interface 108 with the rest of the machine 100. In one embodiment, these servo motors, identified below, include model PMA5 servo motors, manufactured by Pacific Scientific, Inc., located in Rockford, Ill.

The adjustable pre-heat and platen assembly 1424 includes guide roller 14061, web lift-off mechanism 1418, pre-heater 1410 and pre-heat plate 1412, platen 1414 and transfer roller 1416 all mounted on a movable plate 1430 which is movably mounted on the tooling table 1402. In addition, the platen 1414 servo motor 1508 and transmission 1524 is also mounted to the movable plate 1430. The lift-off mechanism 1418 is a hydraulically powered cam actuated mechanism which lifts the web off of the pre-heat plate when the machine is idle. This prevents waste of materials. The pre-heater 1410 and pre-heat plate prepare the label adhesive for application by warming up the web as it passes over the pre-heat plate 1412. In one embodiment, the pre-heat plate 1412 temperature is approximately 200–250° F. The platen

1414 heats up the wax component of the label for transfer to the article. In one embodiment, the platen 1414 temperature is approximately 300–350° F. The transfer roller 1416 is the actual point of contact with the article and applies the label to the article as the article is conveyed by. The platen 1414 and transfer roller 1416 are mounted together on a pivoting access which is driven by a servo motor so as to follow the contour of the article as it passes by. This movement is controlled and adjusted by the system control and human machine interface 108 allowing automatic adjustment for article configurations with slightly differing contours without having manually reconfigure the adjustable pre-heat and platen assembly 1424. The platen 1414 and transfer roller 1416 assembly 2200 is shown in more detail in FIGS. 20–22.

The movable plate 1430 permits the horizontal adjustment of the platen 1414 and transfer roller 1416 position without having to move the tooling table 1402, which would be much more difficult. An adjustment mechanism is provided which allows the movable plate 1430 to be moved or locked in place. This allows adjustments for article configurations having different widths, increasing the variety of articles that can be labeled.

In an alternate embodiment, the platen 1414 and transfer roller 1416 are arranged in a straight line parallel to the direction of the flow of articles to be labeled. Instead of pivoting about a single axis, the platen 1414 and transfer roller 1416 move in a linear fashion towards and away from the article to follow the article's contour. This permits labeling of articles with a smaller radius, circular of severe oval shape. Such movement of the platen 1414 would introduce greater variations in the web velocity, and therefore may be combined with the linear shuttle 1408 described below for improved velocity error compensation.

The shuttle 1408 is actuated by a servo motor 1526 and pivots about a center point. The shuttle 1408 performs three major functions: matches the label/web velocity at the point of transfer to the article speed; compensates for movement of the platen 1414; and compensates for velocity errors introduced by the transfer roller 1416. Compensation for platen 1414 movement and transfer roller 1416 velocity errors is important for contoured articles. The shuttle assembly 2300 is shown in more detail in FIG. 23.

In one embodiment of the machine 100, no shuttle 1408, or associated servo motor 1526, etc. is provided. In this embodiment, velocity errors are corrected by the metering roller 1504 described below. Under control of the servo motor 1518 as controlled by the motion controller of the system control and human machine interface 108, the metering roller 1504 varies it rate of rotation and rotational direction to compensate for web velocity errors. The motion controller program configuration provided in Appendix B is designed to be utilized with such an embodiment. It will be appreciated that, in an embodiment without a shuttle, the web path is appropriately adjusted.

In an alternate embodiment, the shuttle 1408 moves in a linear fashion instead of pivoting, to compensate for web velocity errors. Linear travel allows for faster accelerations in the web velocity. A linear shuttle 1408 may be combined with the linear platen 1414 and transfer roller 1416 described above. A linear shuttle 1408 would also allow for shorter label repeats, i.e. less space between labels on the web, thereby reducing waste and increasing efficiency.

The metering roller 1504 is designed to move one label's worth of web material on each machine cycle to keep everything synchronized. The metering roller 1504 can also be used to correct velocity errors. In an alternate embodiment, the metering roller 1504 performs the functionality of the shuttle 1408 by varying its rotational velocity thereby eliminating the need for the shuttle 1408 and simplifying the web path. It will be appreciated that the need for the shuttle 1408 and/or the ability to utilize the metering roller 1504 to correct velocity errors in the web, is dependent upon the implementation and degree of contour present in the articles to be labeled.

Figure 19:
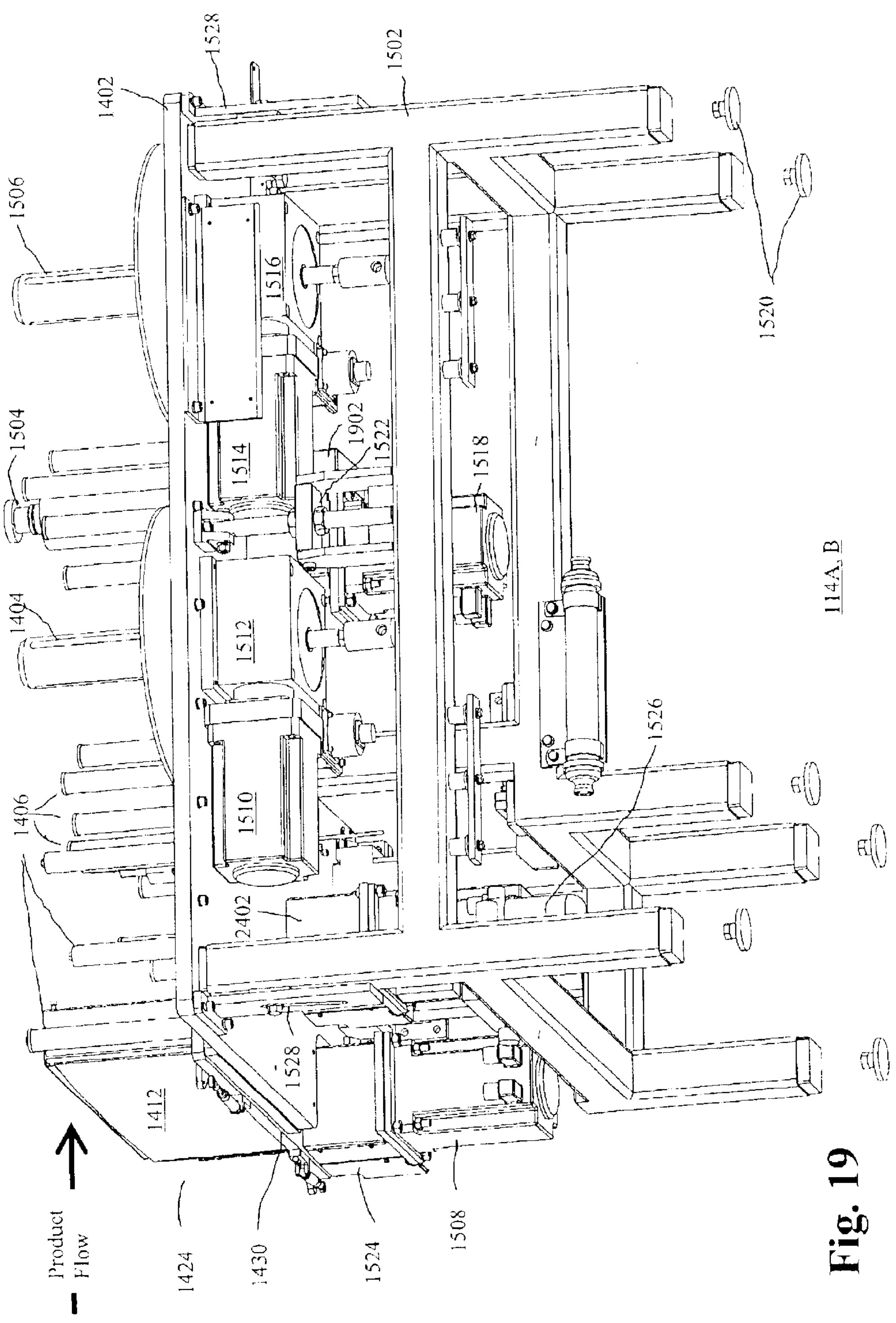
FIG. 19 depicts a bottom perspective view of the web module assembly of FIG. 18.

FIG. 19 shows a bottom perspective view of the web module assembly 114A, 114B of FIG. 18, showing the underside support structure 1502. Shown in the figure are the adjustable pre-heat and platen assembly 1424, the platen servo motor 1508 and transmission 1524, the shuttle servo motor 1526 and transmission 2402, the supply disk 1404, supply disk servo motor 1510 and transmission 1512, the metering roller 1504, metering roller servo motor 1518 and transmission 1902, the waste disk 1506, waste disk servo motor 1514 and transmission 1516, angling brackets 1528 and angle mechanism 1522.

The angle mechanism 1522 permits the tooling table 1402 to be tilted without having to adjust the support structure 1502 or the leveling feet 1520. The side of the tooling table 1402 is mounted to the support structure 1502 using angle brackets 1528 which permit the table 1402 to tilt. The angle mechanism 1522 includes a threaded post mounted to the tooling table 1402 threaded through a bracket which is mounted to the support structure 1502. Nuts on the bracket may be adjusted to tilt the tooling table 1402 up or down. Tilting the tooling table 1402 allows for labeling of tapered articles. In one embodiment, the tooling table 1402 may be tilted up to 6 degrees out of level.

The tooling plate 1402 includes a single plate in which bearing cartridges are mounted for the various rotating parts. Prior tooling plates utilized two plates with bearing sandwiched between the plates, making maintenance and adjustments difficult.

Figure 20:
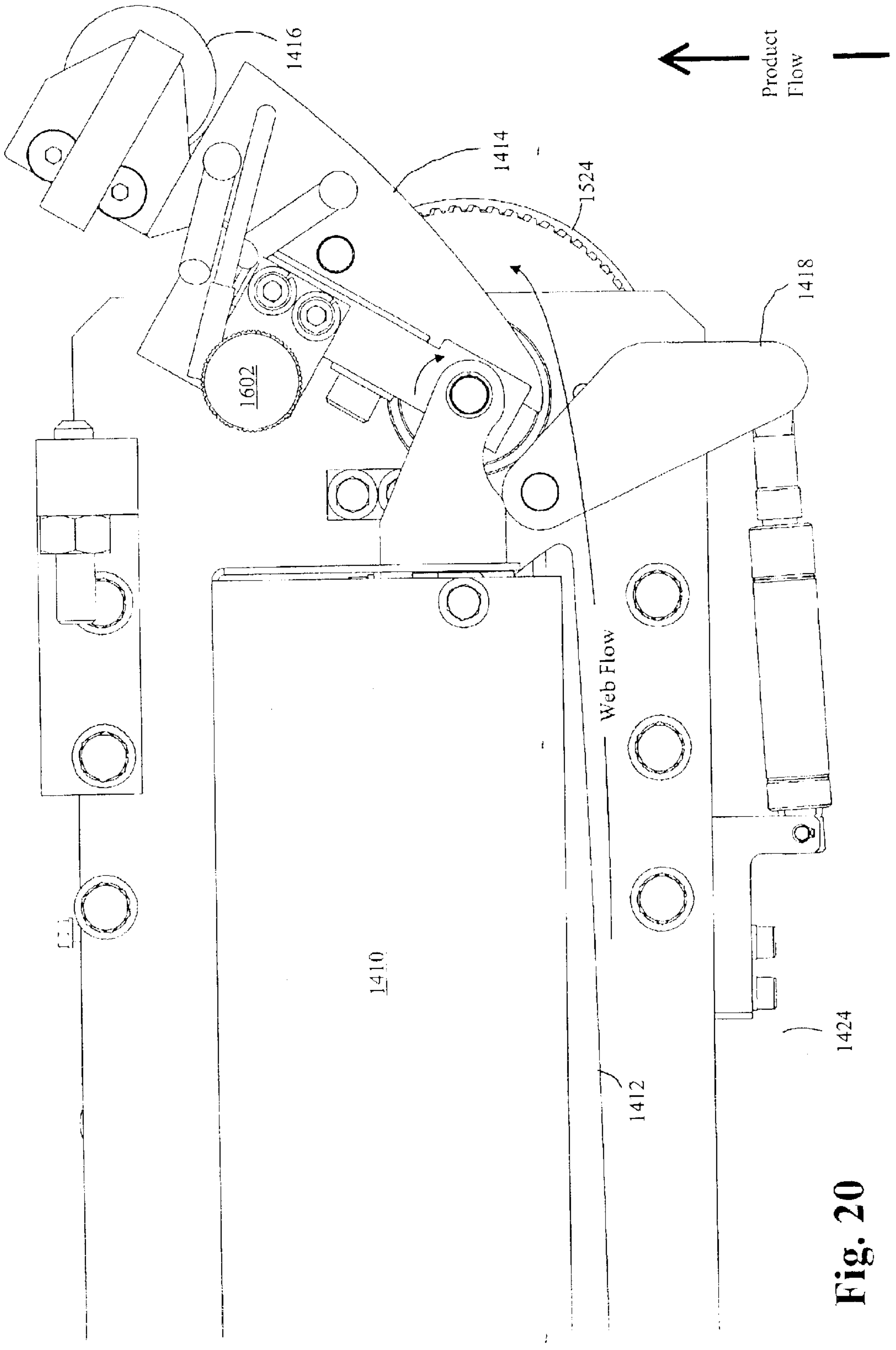
FIG. 20 depicts a more detailed top view of a portion of the web module assembly of FIG. 18.
Figure 21:
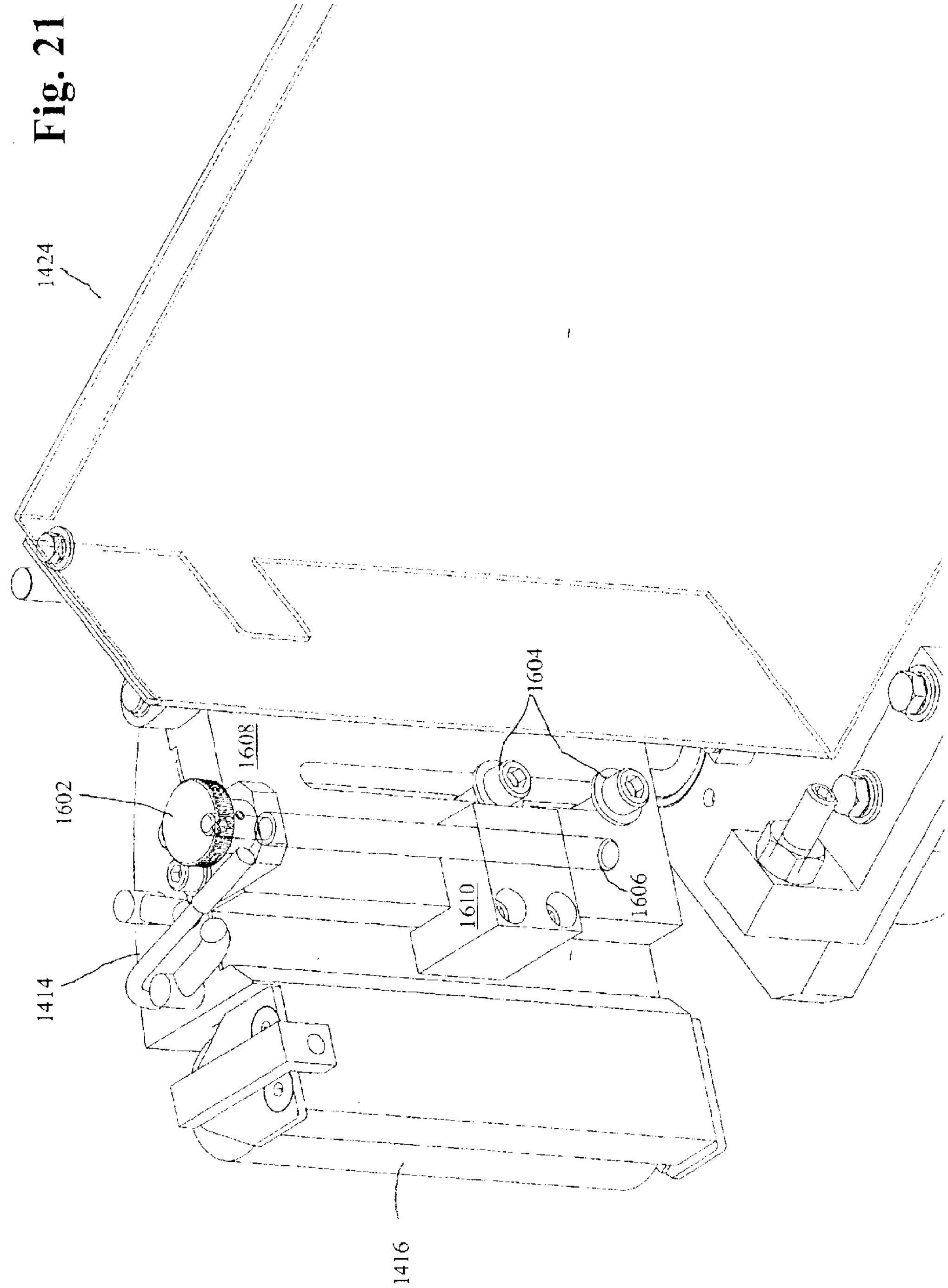
FIG. 21 depicts a more detailed perspective view of the platen assembly of the label application assembly of FIG. 18.

FIGS. 20 and 21 show more detailed views of the adjustable preheat and platen assembly 1424 of the web module assembly 114A, 114B of FIG. 18. The platen 1414 and transfer roller 1416 assembly includes a height adjustment mechanism including a height adjustment knob 1602, threaded screw 1606, backing plate 1608, mounting block 1610 and locking nuts 1604. The platen 1414 is mounted to the adjustable pre-heat and platen assembly 1424 by the locking nuts 1604 and the mounting block 1610 which is threaded around the threaded screw 1606. With the locking nuts loosened, the height adjustment knob 1602 can be turned, turning the threaded screw 1606 and thereby adjusting the height of the platen 1414 and transfer roller 1416. This is useful for fine tuning the height of the platen and transfer roller without having to adjust the support structure 1502 of the web module assembly 114A, 114B.

Figure 22:
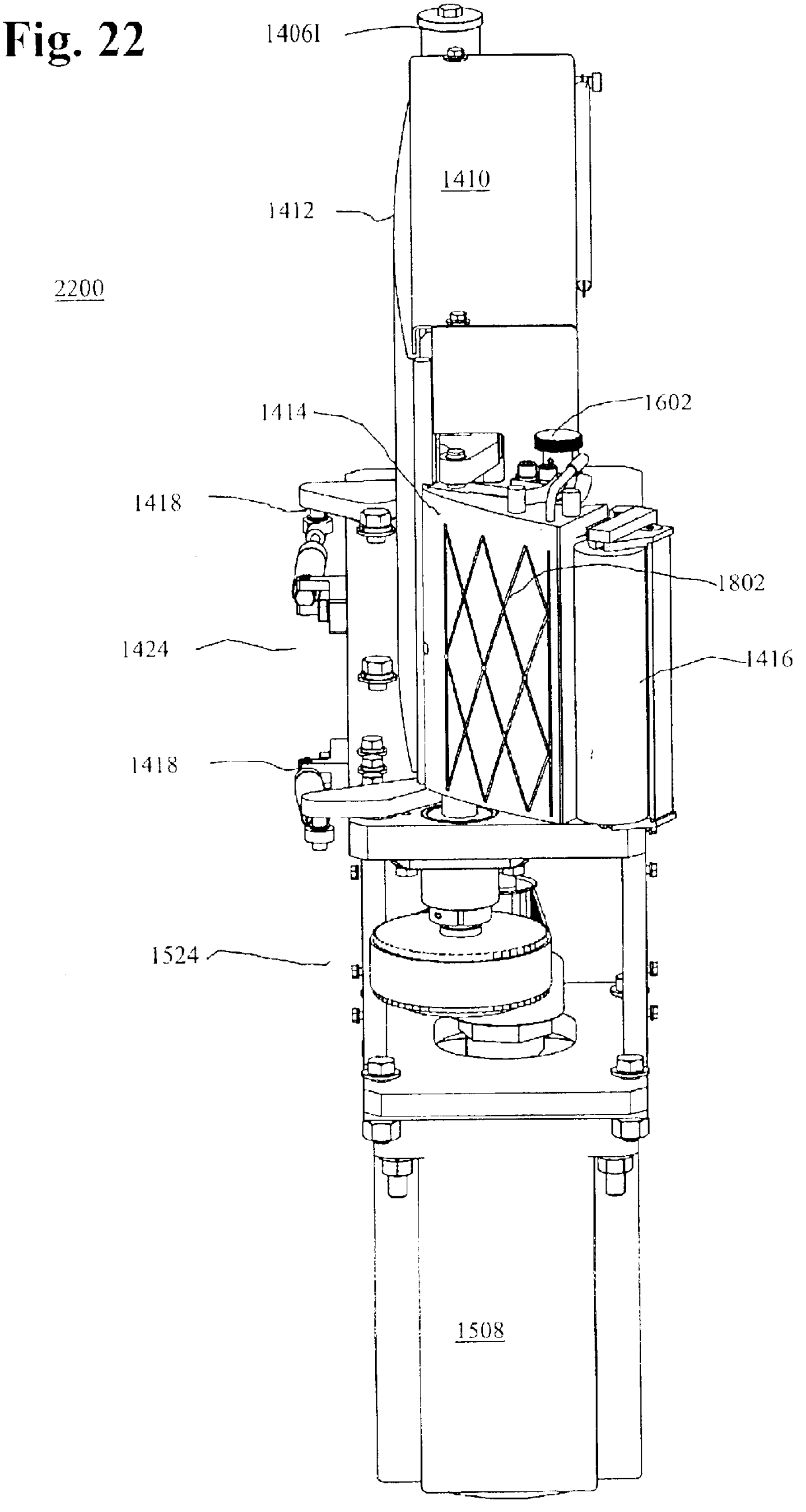
FIG. 22 depicts an alternate more detailed perspective view of the platen assembly of the label application assembly of FIG. 18.

FIG. 22 shows an alternate more detailed perspective view of the platen assembly 2200 of the web module assembly 114A, 114B of FIG. 18. The figure shows the servo motor 1508 and transmission 1524 which connects the servo motor 1508 with the platen 1414 to cause it to pivot. In one embodiment, the transmission 1524 includes a belt and pulley arrangement. It will be appreciated that other transmission mechanisms may be used including direct drive or gear based transmissions. The platen 1414 further features vacuum grooves 1802 which are coupled with a vacuum source, not shown. These grooves 1802 suck the web close to the platen to ensure proper heating of the web.

Figure 23:
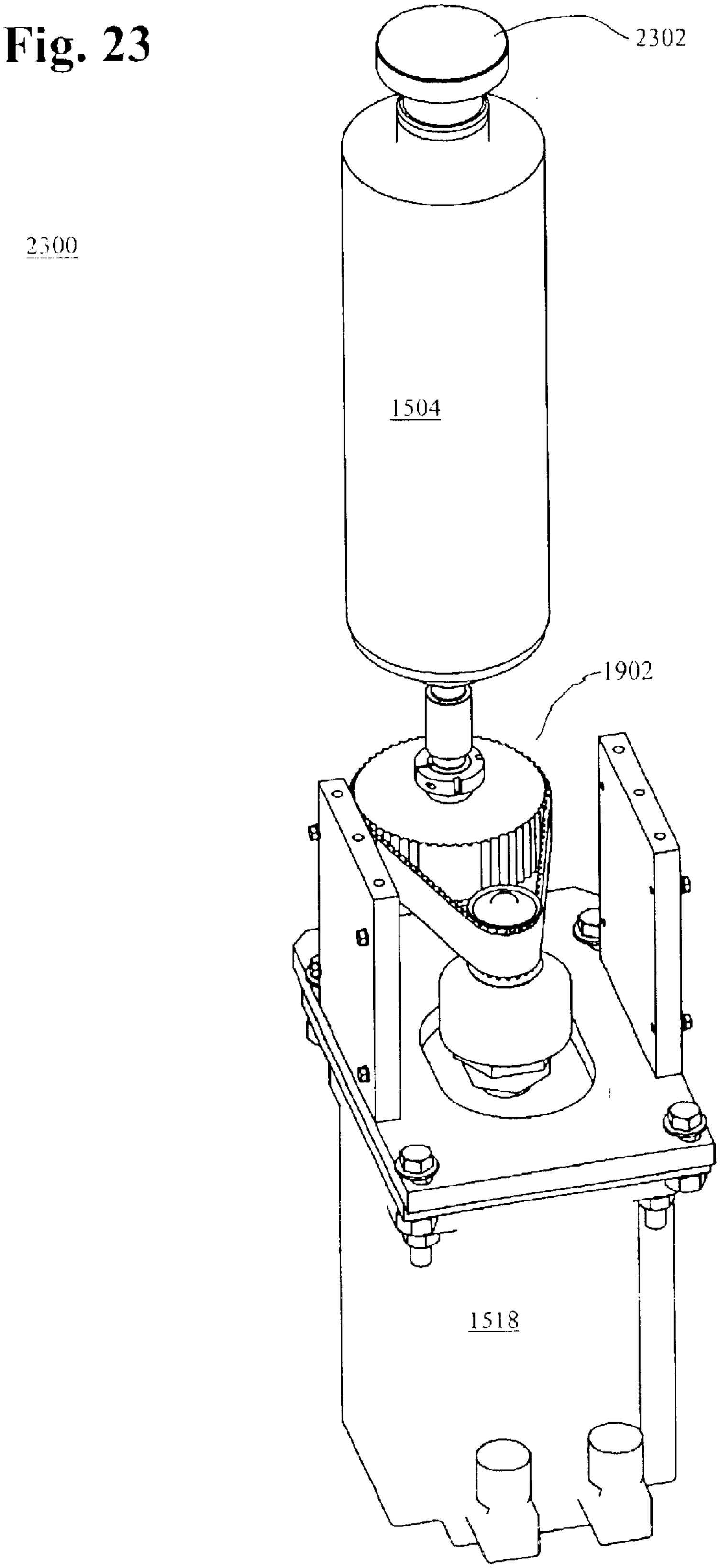
FIG. 23 depicts a more detailed perspective view of the metering roller of the label application assembly of FIG. 18.

FIG. 23 shows a more detailed perspective view of the metering roller assembly 2300 of the web module assembly 114A, 114B of FIG. 18.

The figure shows the servo motor 1518 and transmission 1902 which connects the servo motor 1518 with the metering roller 1504 to cause it to rotate. Further, the metering roller 1504 features a locking knob 2302, the release of which allows the metering roller 1504 to freely rotate from the servo motor 1518 to allow for adjusting the web as described below. In the locked position, the locking knob 2302 locks the rotation of the metering roller 1504 to the servo motor 1518 via the transmission 1902. In one embodiment, the transmission 1902 includes a belt and pulley arrangement. It will be appreciated that other transmission mechanisms may be used including direct drive or gear based transmissions.

Figure 24:
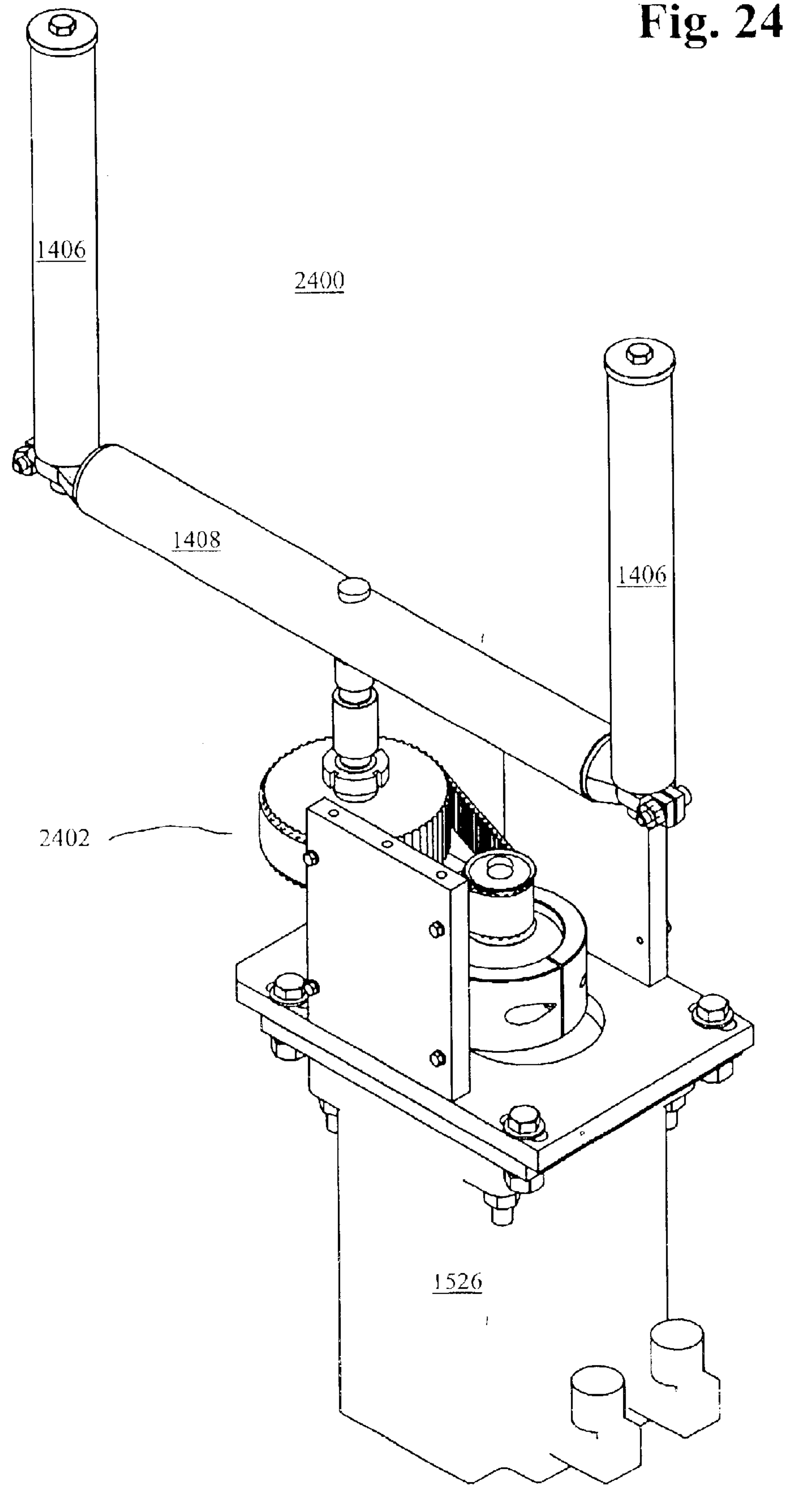
FIG. 24 depicts a more detailed perspective view of the shuttle assembly of the label application assembly of FIG. 18.

FIG. 24 shows a more detailed perspective view of the shuttle assembly 2400 of the web module assembly 114A, 114B of FIG. 18.

The figure shows the servo motor 1526 and transmission 2402 which connects the servo motor 1526 with the shuttle 1408 to cause it to pivot. In one embodiment, the transmission 2402 includes a belt and pulley arrangement. It will be appreciated that other transmission mechanisms may be used including direct drive or gear based transmissions.

Figure 25:
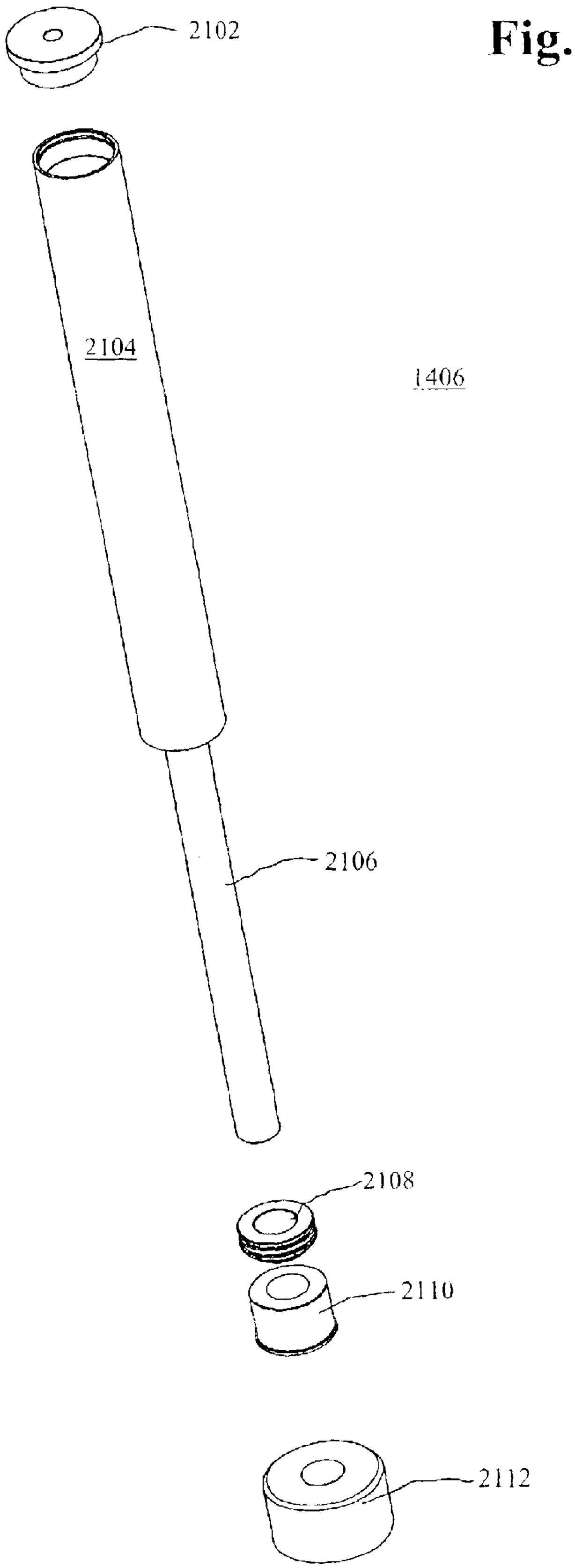
FIG. 25 depicts an exploded perspective view of the guide rollers used in the label application assembly of FIG. 18.
Figure 26:
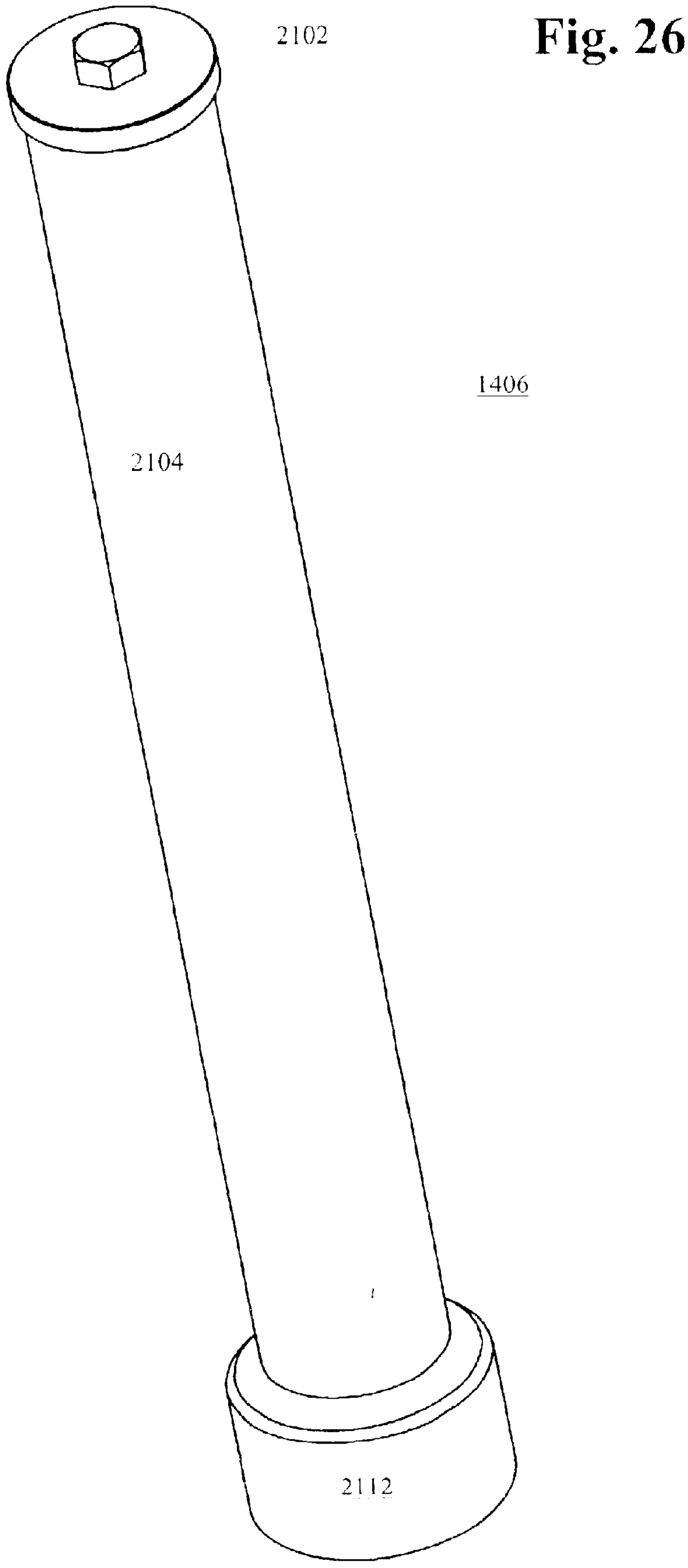
FIG. 26 depicts an assembled perspective view of the guide roller of FIG. 25.
Figure 27A:
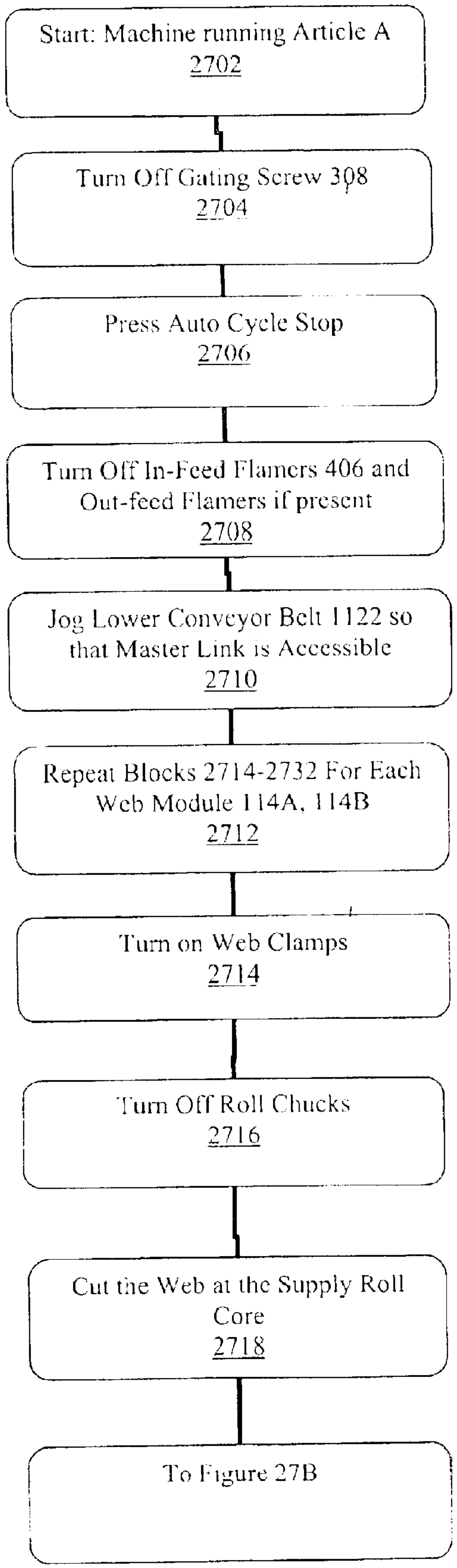
FIGS. 27A–27G depicts a flow chart showing a method of configuring the heat transfer label machine of FIG. 5A to label a particular package configuration according to one embodiment.
Figure 27B:
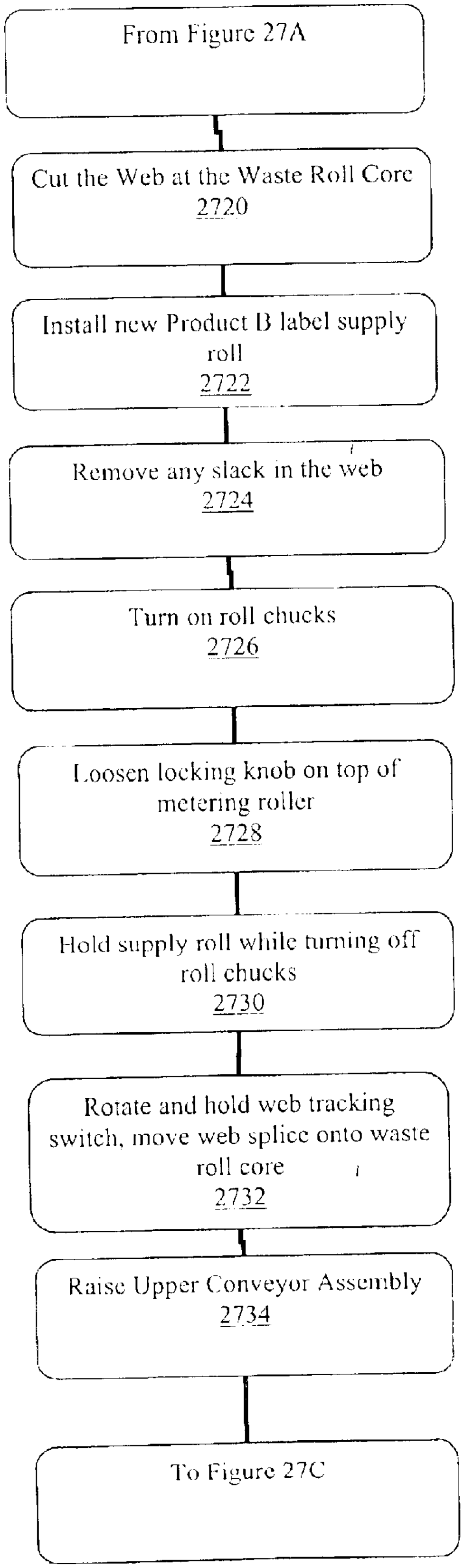
Figure 27C:
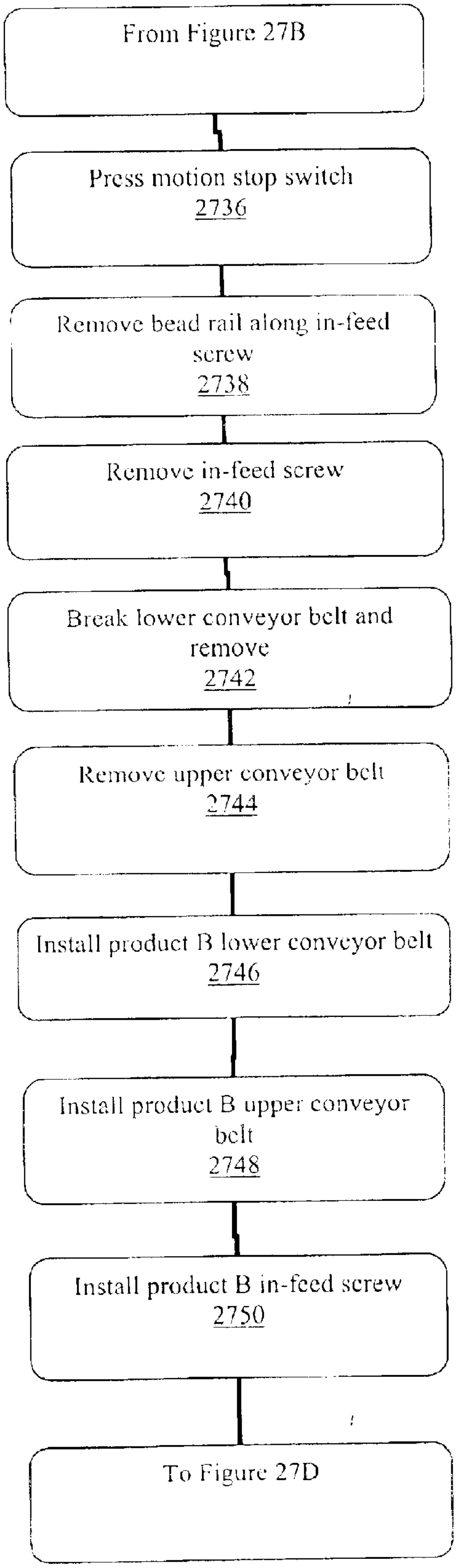
Figure 27D:
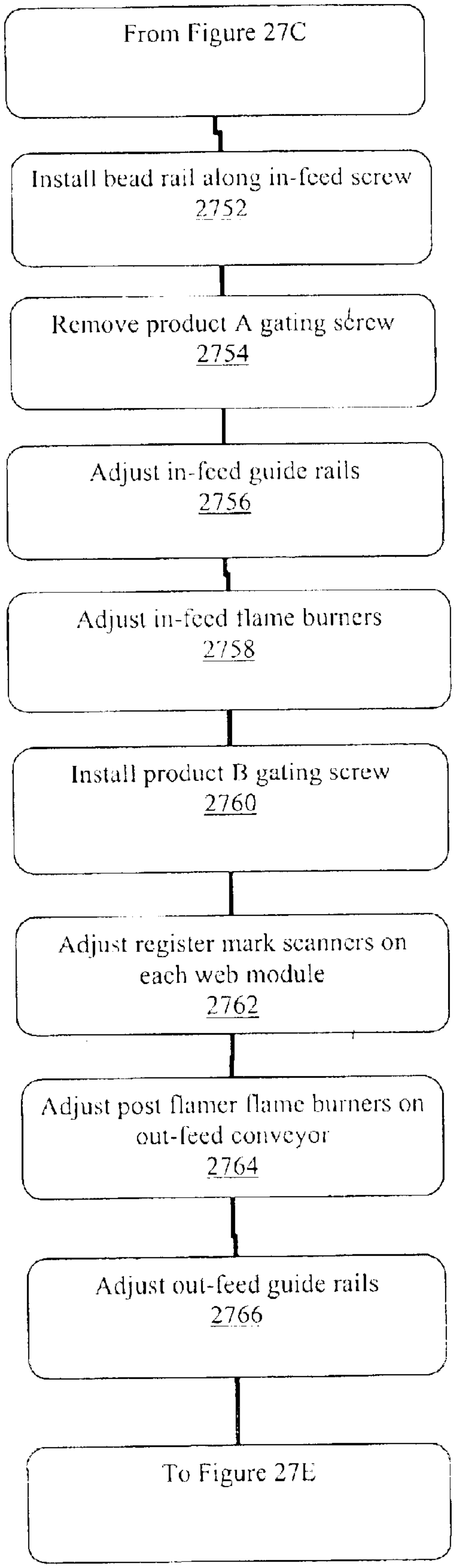
Figure 27E:
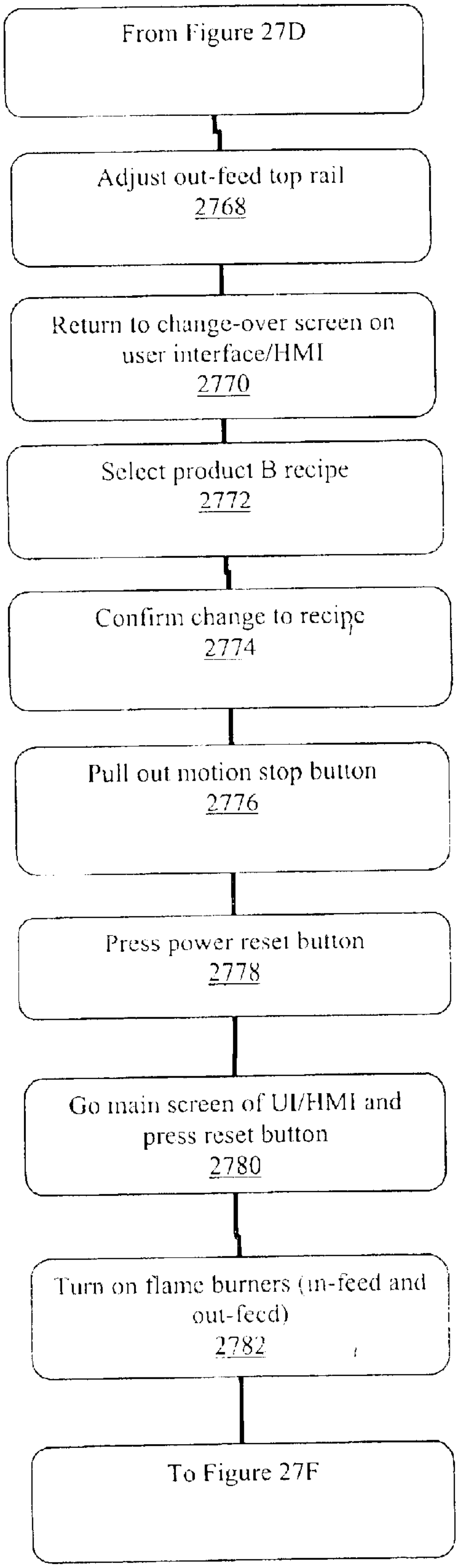
Figure 27F:
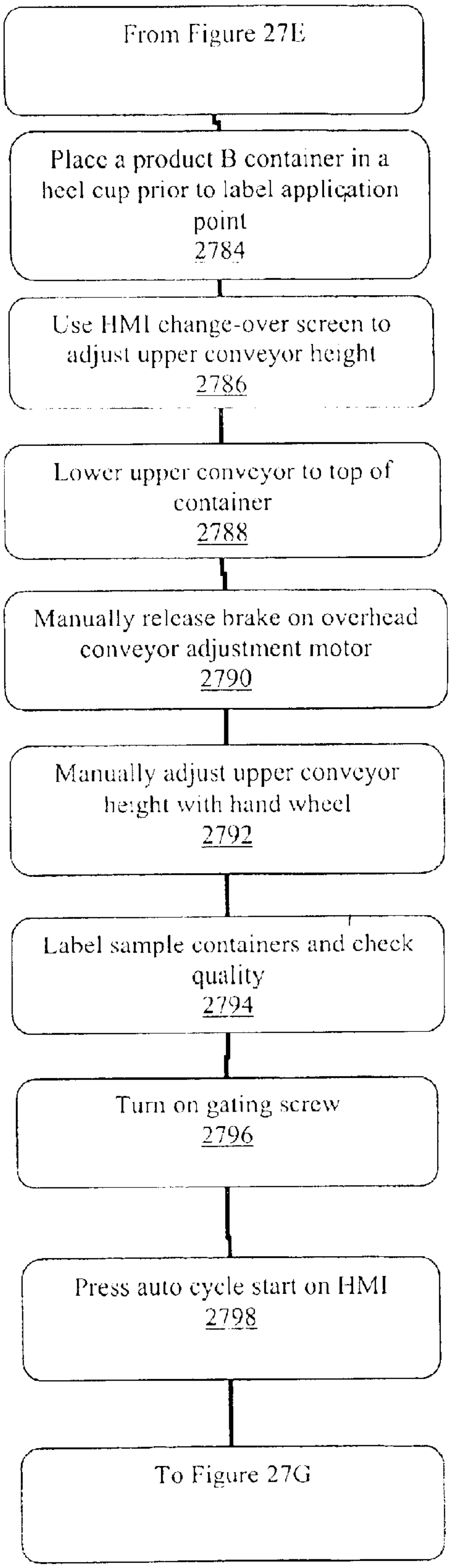
Figure 27G:
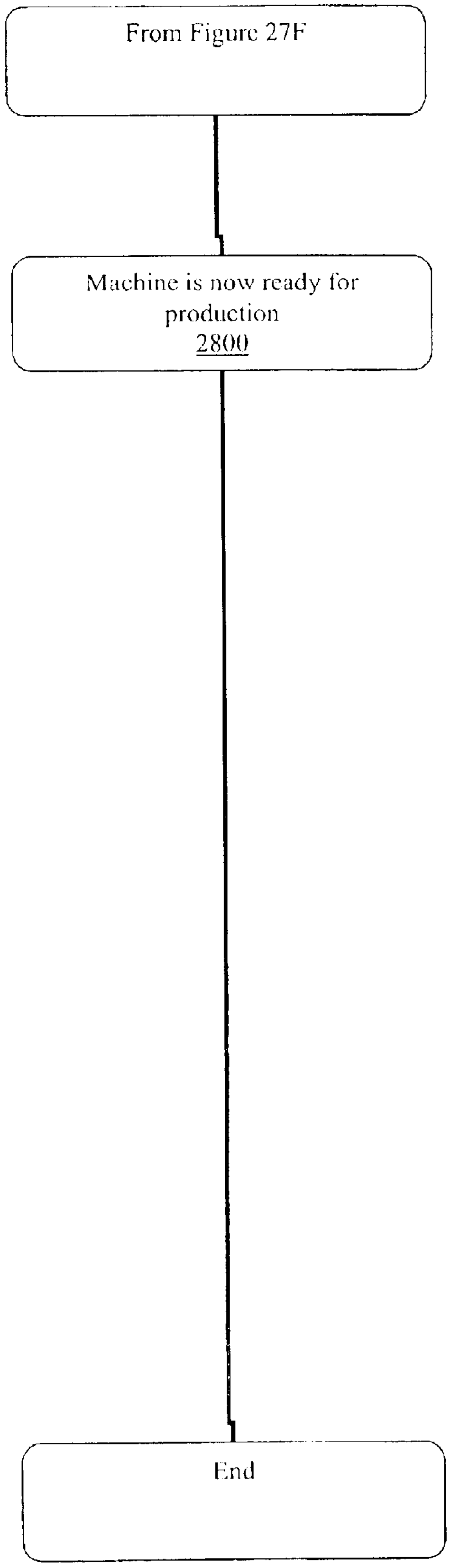

FIG. 25 shows an exploded perspective view of the guide rollers 1406 used in the web module assembly 114A, 114B of FIG. 18. The guide roller 1406 includes an top cap 2101, roller 2104, shaft 2106, labyrinth seal 2108, bearing 2110 and bottom cap 2112. The guide roller 1406 is designed with an enclosed bearing sealed from the environment by the labyrinth seal. This prevents contaminants from entering the bearings and increasing their friction. This is important in uncontrolled environments, such as a non-refrigerated area where filled and chilled articles are being labeled and the machine may be exposed to excessive moisture. FIG. 26 shows an assembled perspective view of the guide roller 1406 of FIG. 25.

FIGS. 27A–G shows a flow chart showing an exemplary method of re-configuring the heat transfer label machine of FIG. 5A to label a particular article configuration according to one embodiment.

Beginning with the machine running article configuration A and changing over to article configuration B (Block 2702) (it will be appreciated that one or more of the following actions may not need to be performed depending upon the differences between the two article configurations):

1. Using the system control and human machine interface 108, turn gating screw 308 switch (not shown) to OFF position. Allow residual product A configuration articles, in process, to complete and machine 100 will cycle stop (Block 2704);
2. Press the Auto Cycle Stop push button on control panel of the system control and human machine interface 108 (Block 2706);
3. Turn OFF in-feed flamers 406 and out-reed flamers (if present) (Block 2708);
4. Jog the machine 100 center section 104 from main menu of user interface of the system control and human machine interface 108 to actuate the lower conveyor 112B and move the heel cup 1104 chain, i.e. lower conveyor belt 1122 master link (not shown) to an accessible location on heel cup chain return slide (not shown) (Block 2710);

Blocks 1 through 4 may be performed in approximately 3 minutes;

5. For each web module 114A, 114B (Block 2712):
   a. Turn ON web clamps which clamp web in place to guide rollers 1406 using the system control and human machine interface 108 (Block 2714);
   b: Turn OFF roll chucks which lock the web supply rolls in place on the supply and waste discs 1404, 1506 (Block 2716);
   c. Cut the web at the supply roll core. Remove Product A label supply roll (Block 2718);
   d. Cut the web at the waste roll core. Leave enough material to wrap once around an empty core. Remove Product A waste roll. Install an empty core and attach the web to the core with tape (Block 2720);
   e. Install the new Product B label supply roll on the supply roll disc 1404. Tape the new web to the tail of the old web (Block 2722);
   f. Remove any slack in web by rotating the supply and waste roll cores (Block 2724);
   g. Turn ON the roll chucks using the system control and human machine interface 108 to lock the rolls to the discs 1404, 1506 (Block 2726);
   h. Loosen the locking knob 2302 on the top of the metering roller 1504 (Block 2728);
   i. Hold the supply roll while turning the roll chucks OFF. Allow the dancer 1428 to drop gently to its travel limit. The waste roll chuck will release about five seconds after the supply roll. Hold waste roll and allow its dancer (not shown) to move gently to its travel limit (Block 2730);
   j. Rotate and hold web tracking switch in 'FWD' position on the system control and human machine interface 108. Move web until the splice at the supply roll has moved onto the waste roll core, re-tighten the metering roller locking knob (Block 2732);

Block 5 may be performed in approximately 2 minutes per web module;

6. Go to "Changeover" screen on the system control and human machine interface 108. Select "UT Conveyor Height Adjust". Raise the upper conveyor assembly 112A to the upper travel limit (Block 2734);
7. Press the motion stop switch on the system control and human machine interface 108 (Block 2736);
8. Remove the bead rail 416 along the in-feed screw 1004 using hand knobs/hand actuated clamps located on the bead rail 416 mounting brackets and set aside (Block 2738);
9. Remove the in-feed screw 1004 for Product A by actuating the in-feed screw release mechanism (see FIG. 7 with reference to release lever 316) (Block 2740);
10. Break the heel-cup/lower conveyor 1122 belt (chain) at the master link. Remove the heel cup chain/lower conveyor belt 1122 for Product A (This may require a small screw driver or needle nose pliers) (Block 2742);
11. Remove the nozzle belt/upper conveyor belt 1012 by actuating release mechanism 1022 for Product A (Block 2744);

Blocks 6 through 11 may be performed in approximately 3 minutes;

12. Install the heel cup chain/lower conveyor belt 1122 for Product B by threading the belt 1122 through the framework 1120 and around pulleys 1116 and 1124. Connect the ends of the lower conveyor belt 1122 at the master link (This may require a small screw driver or needle nose pliers) (Block 2746);
13. Install the nozzle/upper conveyor belt 1012 for Product B by placing it around pulleys 1016, 1018, 1020 and 1034, pushing slides 1030 up and locking the release mechanism 1022 (Block 2748);
14. Install the in-feed screw for Product B and lock it in place with the release lever (see FIG. 7, release lever 316) (Block 2750);

15. Install the bead rail 416 along the in-feed screw (Block 2752);

Blocks 12 through 15 may be performed in approximately 3 minutes;

16. Remove the gating screw 308 for Product A utilizing release lever 316 (Block 2754);
17. Adjust the in-feed guide rails 304 to their position for Product B by loosening all of the guide rail clamps 306 and moving them from along the support from the first stop to the second stop. In this embodiment, each of the clamps 306 is provided with two stops/stepped positions, one for product configuration A and the other for product configuration B. In this case, each rail 304 is moved from the first position to the second position (Block 2756);
18. Adjust the pre-flamer flame burners 406 to their position for Product B. In this embodiment, each of the burners 406 is mounted on an adjustable mounting 412, 418, 420, 422, 424 provided with two stops/stepped positions, one for product configuration A and the other for product configuration B. In this case, each flamer 406 is moved from the first position to the second position (Block 2758);
19. Install the gating screw 308 for Product B by placing it in the assembly 320 and actuating the release lever 316 to lock the screw 308 in place (Block 2760);

Blocks 16 through 19 may be performed in approximately 2 minutes;

20. Adjust the register mark scanners 1426 on the web module tooling tables 1402 to the stop position for Product B (Block 2762) which accounts for differing web heights and differing vertical positions of the registration marks printed on the web. Note that the bar code scanner 1420 is typically capable of scanning a wide enough area to detect bar codes located in various vertical positions and therefore does not need to be adjusted;
21. Adjust the post-flamers on the out-feed conveyor (not shown) to their position for Product B. They are configured in the same manner as he in-feed flamers 406 (Block 2764);
22. Adjust the out-feed guide rails to their position for Product B. They are configured in the same manner as the in-feed guide rails 304 (Block 2766);
23. Adjust the out-feed top rail vertically to the position for Product B (Block 2768). The out-feed top rail guides the articles on the out-feed conveyor at the top of the article and away from the labeled area so as not to damage or other wise mar the newly applied label, eliminating the need for guide rails 304 similar to those used on the in-feed section 102. This is not an issue on the in-feed conveyor as the articles have not yet been labeled;

Blocks 20 through 23 may be performed in approximately 2 minutes;

24. Return to "Changeover" screen on the system control and human machine interface 108 (Block 2770);
25. Select the proper product on the Recipe selector switch. As noted above "recipes" are stored configuration data for all of the electronically configurable portions of the machine 100 (Block 2772);
26. Press the Change Recipe pushbutton and OK on the pop-up confirmation window. The selected product will appear in the upper right corner of the system control and human machine interface 108 display (Block 2774);
27. Pull out the motion stop pushbutton on the system control and human machine interface 108 (Block 2776);
28. Press amber power reset button on the system control and human machine interface 108 (Block 2778);
29. Go to the "Main" screen of the system control and human machine interface 108 and press the reset button (Block 2780);
30. Turn ON the flamers using the system control and human machine interface 108 (Block 2782);
31. Place a product B container in a heel cup 1104 just prior to the label application point (Block 2784);
32. Go to the "Changeover" screen on the system control and human machine interface 108 and select "UT Conveyor Height Adjust" (Block 2786);
33. Press the move to position button to lower the overhead tooling section 112A toward the top of the container for product B (Block 2788);
34. Manually release the brake on the overhead height adjusting motor (not shown) (Block 2790);
35. Use the hand wheel 1028 on the right side of the machine 100 to fine tune the vertical height of the overhead tooling section 112A with product B (Block 2792);

Blocks 24 through 35 may be performed in approximately 2 minutes;

36. Label a few containers to check quality and adhesion of the label (Block 2794);
37. Turn ON the gating screw 308 at the system control and human machine interface 108 (Block 2796);
38. Press Auto Cycle Start on the system control and human machine interface 108 (Block 2798);
39. Machine 100 is now ready for production (Block 2800);

Blocks 36 through 39 may be performed in approximately 3 minutes;

Total performance time is approximately 25 minutes.

As can be seen, the above process is much simpler and less time consuming the change-over processes for prior heat transfer labeling machines. In addition, the only tool which may be necessary for the above change-over is a small screw driver or needle nose pliers to aid in un-hooking the lower conveyor belt 1122 master link. Otherwise the change-over process may be substantially completed without tools.

FIG. 28 shows a block diagram depicting the various sensors of the heat transfer labeling machine 100 of FIG. 5A. Just prior to the in-feed section 102 are backlog sensors 2804 and 2806 which detect whether there are articles to be labeled from the up-stream manufacturing equipment or too many articles backed up and waiting to be labeled. The sensors 2804 and 2806 are optical sensors which detect the interruption of a beam of light by articles to be labeled. If the high backlog sensor 2804 is triggered, the up-stream manufacturing equipment is notified too slow the feed of articles to the machine 100. This avoid a potentially damaging influx of articles which exceed the machine 100's capacity. If the low backlog sensor 2806 is tripped, this indicates the presence of articles to be labeled such that the gating screw 308 may operate to bring in those articles. If the sensor 2806 is not tripped, then there are no articles to label and the gating screw is appropriately disengaged. In one embodiment, the high and low backlog sensors 2804, 2806 each include a T18SP6LPQ T18 Series Retro-reflective Sensor and corresponding BRT-42D retro-reflective target mounted opposite the sensor, manufactured by Banner Engineering Inc., located in Minneapolis, Minn.

To prevent articles from being burned, a movement sensor 2808 is provided which looks through the flame generated by the flame burners 406. If an article stops or other wise gets stuck between the burners 406 more than momentarily (determined based on the rate at which the machine 100 is operating), the sensor 2808 will cause the machine 100 and burners 406 to shut down to avoid a fire or other damage. In one embodiment, the sensor 2808 is an optical sensor and includes a SM312FQD mini-beam beam glass fiber optic sensor and 1AT23S glass fiber light-pipe manufactured by Banner Engineering Inc., located in Minneapolis, Minn., located across from each other along the in-feed conveyor 318 and opposing each other diagonally through the flame burners 406 so as to be able to see if an article is stopped within the burner 406 area.

After the in-feed flame burners 406, along the conveyor 318 are located high and low limit sensors 2810 and 2812. These limit sensors 2810, 2812 are optical sensors and are used to detect backlogs at the in-feed screw 1004 of the label application section 104. The low limit sensor 2810 indicates that articles are present for in-feed to the label application section 104. The high limit sensor 2812 indicates a backlog of articles to the label application section 104 and triggers the gating screw to shut off when such a backlog exists. In one embodiment the sensors 2810 and 2812 ach include a T18SP6LPQ T18 Series Retro-reflective Sensor and corresponding BRT-42D retro-reflective target mounted opposite the sensor, manufactured by Banner Engineering Inc., located in Minneapolis, Minn.

The in-feed screw 1004 features a homing/proximity sensor 2814 which detects a homing mark located on the screw 1004 so that the system control and human machine interface 108 can determine and set the screw 1004 position. In one embodiment, the homing mark includes a protruding stainless steel screw (not shown) and the sensor 2814 includes an Ni-3-EG08-AP6X-H1341 Inductive proximity sensor manufactured by Turck, Inc., located in Minneapolis, Minn.

The in-feed section 102 conveyor belt 318 also features a movement sensor 2816 which detects whether or not the belt 318 is moving. This sensor 2816 operates independent of the motor 414 which drives the conveyor belt 318 so as to detect if the belt 318 gets stuck even if the motor 414 appears to be operating correctly. This prevents the belt 318 from stopping and trapping articles within the burners 406. The sensor 2816 is a proximity sensor and operates by sensing rotation of a keyed gap (not shown) in the conveyor roller shaft. In one embodiment, the sensor 2816 includes a Bi-1-EH04-AP6X-V331 Inductive Sensor manufactured by Turck, Inc., located in Minneapolis, Minn.

After the in-feed screw 1004 of the label application section 104, there are optical sensors 2818, 2820 which detect whether articles moving along have tipped over. Top sensors 2818 watch for the top of the article to pass by while bottom sensors 2820 watch for the bottom of the article to pass by. The logic which is coupled with these sensors (part of the PLC 116 configuration described above and in Appendix A) detects when the sensors 2818, 2820 are triggered inconsistently with the configuration of the articles known to be moving through the machine 100. If a tipped bottle is detected, the operator is appropriately notified. In one embodiment, the sensors 2818, 2820 each include a SM312FQD mini-beam glass fiber optic sensor and 1AT23S and 1ATR.753S glass fiber light-pipes manufactured by Banner Engineering Inc., located in Minneapolis, Minn., located across from each other, with the top sensor 2818 arranged to sense the passing of the tops of the article and the bottom sensor 2820 arranged to sense the passing of the bottom of the article.

Each of the web modules 114A, 114B features web lift off return sensors 2822, registration mark sensors 2824 (referred to as 1426 in FIG. 18), and dancer encoders 2826 and 2828 for the unwind reel 1404 dancer 1428 and the rewind reel 1506 dancer (not shown). The web lift off return sensors 2822 are coupled with the web lift-off mechanism 1418 and sense the position of the web lift-off mechanism 1418. In one embodiment, the web lift-off return sensors 2822 include Ni-3-EG08-AP6X-H1341 Inductive proximity sensors for each articulated arm of the web lift-off mechanism 1418, manufactured by Turck, Inc., located in Minneapolis, Minn. The registration mark sensor 2824/1426 is described above with reference to FIG. 18. In one embodiment, this sensor 2824/1426 includes a R55FVQ Color Mark glass fiber optic sensor and BA1.53SMTA glass fiber light-pipe manufactured by Banner Engineering Inc., located in Minneapolis, Minn. The dancer encoders 2826, 2828 report the positions of their associated dancers. In one embodiment, the dancer encoders 2826, 2828 include DC25F-B 1V2ME 90 degree Dura-Coder, manufactured by Advanced Micro Controls, Inc., located in Terryville, Conn.

Descriptions of the proximity sensors 2830, 2832, 2834 which sense movement and position of the upper conveyor assembly 112A are described above with reference to FIG. 14.

Both the upper conveyor belt 1012 and lower conveyor belt 1122 of the upper and lower conveyor assemblies 112A, 112B feature homing sensors 2836, 2838 for detecting the position of the belts 1012, 1122 and allowing the system control and human machine interface 108 to automatically align/home the belts 1012, 1122 when initiating machine 100 operation. In one embodiment, the sensors 2836, 2838 each include a SM312FQD mini-beam glass fiber optic sensor and 1AT23S glass fiber light-pipe manufactured by Banner Engineering Inc., located in Minneapolis, Minn. The sensor 2836 for the lower conveyor belt 1122 is arranged so as to sense the position of gaps between consecutive-heel cups 1104. The sensor 2838 for the upper conveyor belt 1012 is arranged so as to sense the position of the neck cups/nozzles 1014.

The out-feed section 106 conveyor features a similar sensor arrangement as the in-feed section 102. In particular, the out-feed section 106 includes a belt movement sensor 2840, article flow sensors 2842, 2844 and an out-feed high backlog sensor 2846. The belt movement sensor 2840 performs the identical function as the sensor 2816 for the in-feed conveyor belt 318 and is described above. The out-feed high backlog sensor 2846 is similar to the in-feed backlog sensors 2804, 2806 but detects when down stream manufacturing equipment is not removing articles from the out feed conveyor quickly enough. If a backlog is detected, the sensor 2846 will turn off the out-feed post-labeling burners 2802A, 2802B and 2848A, 2848B to prevent damaging articles which may get stuck between the post-labeling burners. This sensor 2846 is also described above with reference to sensors 2804, 2806. As noted above, there may be more than one set of out-feed post-labeling flame burners 2802A, 2802B, 2848A, 2848B. For each set of burners 2802A, 2802B, 2848A, 2848B, article flow sensors 2842, 2846 are provided to ensure that articles do not get stuck in the burners 2802A, 2802B, 2848A, 2848B. These sensors 2842, 2846 are identical to the sensor 2808 for the in-feed burner 406 and are describe above.

All of the sensors described above are coupled with the PLC 116, as described above. All of the logic which manages these sensors and responds to their outputs is part of the PLC 116 configuration described above and in Appendix A.

Various other sensors may also be present on the machine 100 such as sensors which detect open access panels and disable the machine 100 for safety. While specific types of sensors have been disclosed with respect to specific functions, it will be appreciated that other suitable sensors may be substituted for those disclosed, e.g. mechanically actuated sensors may be substituted for optically actuated sensors. It will be appreciated that additional sensors may also be provided depending on the implementation of the machine 100 and that one or more of the functions performed by the above sensors may be combined into a single sensor.

It will be appreciated that suitable mechanical dimensions and tolerances for given implementation of the disclosed embodiments may be chosen depending on the design requirements and the capabilities and limitations of the particular materials and manufacturing processes used for the implementation as well as the performance requirements of the specific embodiment.

In summary, the disclosed embodiments provide the following advantages:

1. All of the major movable mechanical elements of the machine 100 are powered by dedicated servo motors which eliminates the complicated and inaccurate power distribution system of prior decorating machines:

Conveyor 318 is powered by AC motor 414;

Gating Screw 308 is powered by AC motor 310;

In-feed Screw 1004 is powered by servo motor 1006;

Upper conveyor 112A is powered by servo motor 1036;

Upper conveyor 112A height is adjusted by AC motor 1042;

Lower conveyor 112B is powered by servo motor 1118

Web Supply Disk 1404 is power by servo motor 1510;

Platen/Transfer Roller 1414,1416 is powered by servo motor 1528;

Shuttle 1408 is powered by servo motor 1526;

Metering roller 1504 is powered by servo motor 1518; and

Web Waste Disk 1506 is powered by servo motor 1514;

This permits more accurate power delivery and more accurate label placement as described herein.

2. Gating and In-Feed Screw Support Structure.

The structure packages the drive motor with the screw together so that is easily adjusted horizontally and vertically without alteration of the power transmission from the motor to the screw.

In addition, using a dedicated servomotor reduces the drive train to one belt and pulleys, allowing far more accurate control of rotational speed and position. The prior art drive system was comprised of numerous power transmission components that added uncertainty to the actual position of the screw.

Further, the servo motor is capable of automatically homing to a feature located on the screw-shaft. This improves accuracy and reliability and eliminates the need to rotate the screw by hand to position it, for which accuracy suffered and was largely dependent on the skill of the operator.

The support structure can be adapted to provide a timing screw on both sides of the in-feed conveyor to further improve feed reliability and increase the range of bottle shapes the machine can handle.

The screw implementation eliminates the through drive-shaft of prior screws, which necessitated removing the drive-shaft in order to remove and change out the screw, a cumbersome and slow process. Without the through shaft, the screw according to the disclosed embodiments provides a simple lever latch for releasing and locking the screw in place. Changeover time is reduced from 20 minutes to a minute.

3. Environmental Cleaning of Product Package.

Air Knives are provided to remove condensation/moisture which makes possible label application to a container with moisture on the surface, such as condensation from a chilled product in the container.

Further, by using ionized air, dust & static buildup may also be removed, thereby cleaning the container surface so that labeling can be successful contaminated environments.

In addition, the air flowing into the knife is warm from compression and contact with the blower. This heat may be used for raising the container temperature and ensuring successful heat transfer.

4. Conveyors

The in-feed system and conveyors utilize a rail structure which allows for quick changeovers. The rail supports now utilize clamps operated with thumbscrews eliminating the need for tools to make adjustments.

5. Flaming System

The flaming system utilizes a single electrode to increase reliability. The current flows from the electrode ground, the burner head in one embodiment. The current flow is not affected by flow velocity and is more reliably directed to ground. Using a single electrode eliminates passing current between multiple electrodes in the flame path wherein the velocity of the combustion gasses may prevent the proper flow of current. Further multiple electrodes frequently resulted in arcing to grounded surfaces which disturbed the proper flow of current and made flame sensing could become very unreliable.

The flaming system also features a quick lock adjustment for quick changeovers which permits use of hand operated knobs/wheels to move the flamer position along axis individually. Prior flamers were positioned using tools and making them difficult to adjust with precision by hand. Further, movement of the prior flamer in all axes controlled by a single adjustment making it difficult to precisely position the flamer.

In one embodiment, a single flaming system is provided to oxidize the container prior to label application. In an alternate embodiment, an additional post-flaming system having one or more burners, is provided which is used to create a glossy or matte finish on the label after application (dependent on type of wax utilized in the heat transfer substrate). In this embodiment, the articles may pass through the flaming system at a rate between 200–250 articles to properly re-flow the residual wax on the label and obtain the desired effects.

6. Central Frame

The central frame features an H frame configuration with knees which permit custom upper & lower conveyor frames to be used which increases the versatility of the design.

7. Upper Conveyor

The upper conveyor features a cantilever design which allows for quick changeovers. The cantilever arrangement wherein the conveyor's pulleys are attached to the support frame/structure on only one side permits easy access to the tooling parts for removing or reconfiguring the conveyor. Prior art frames used an enclosed structure without easy access to changeover of container specific tooling parts.

The in-feed end of the upper conveyor permits use of spouted bottles.

The upper conveyor features a longer manifold with more ports and longer effective distance which permits wider range of bottle sizes/volumes to be used when labeling empty containers which require inflation for stability.

The vertical travel adjustment of the upper conveyor is "motor assisted" with a manual fine tuning control. Prior manually operated adjustment mechanism had very limited range and no feedback as to position. A measurement scale is provided in the frame position feedback. In an alternate embodiment, the adjustment mechanism features electronic sensing of position and precise motor driven control of position. Further, automated homing may be provided wherein correct positions for several products could be stored for automated changeover.

The upper conveyor is operated by a dedicated servo motor which provides increased precision. Prior upper conveyors were driven through various gears belts and transmissions tied back to one or two drive motors shared with the rest of the machine. The dedicated servo motor further provides independent control of the upper conveyor reducing drive position and velocity errors. Using an independent drive also allows for handling products which require different velocities between the upper and lower conveyors. Further, combined with the dedicate servo motor for the lower conveyor described below, the upper and lower conveyors may be automatically homed to one another and phased to the rest of the machine using sensors to detect correct positioning of the tooling. This eliminates the need of the operator to manually phase the upper conveyor to the lower conveyor and to the rest of the machine.

In addition, servo based upper tooling with sensor for homing may also be used to measure center distances of container necks and automatically set the machine parameters based on the measurement. This sensing may also be used to verify that the correct tooling is installed, properly configured and working properly when operating or when changing over to a different container. Prior machines provided no mechanism for the machine to determine correct tooling center distances.

Servo motors further provide more accurate measure of torque via the motor current which allows accurate and early detection of jams in the machine. In prior systems, jam protection was provided via a torque-sensing device on the main drive shaft to the tooling section of the machine. This device was erratic in determining torque overloads and releasing the drive.

The upper conveyor also features a size and shape which can be customized to accommodate unusual package sizes and designs.

8. Lower Conveyor

Similar to the upper conveyor, the lower conveyor features a dedicated servo motor for precision, automated homing of position, the capability to automatically measure the heel cup center distance, and sensing jams.

In addition, the size and shape of the lower conveyor may be customized to accommodate unusual package sizes and designs, as described above. The lower conveyor features mountings which are accessible both internally and externally to the frame allowing conveyor belts to be supported by pulleys mounted on the inside or on the outside of the frame. This removes the width limitation on the conveyor belt and allows for a wider range of containers to be used.

9. Web Modules

The web modules feature a label feed mechanism which is driven by a dedicated servo motor for precision positioning. Prior systems "pushed" web material toward the point of label application while the waste take up spindle maintained web tension. Fluctuations in tension, in the prior systems, resulted in label position variation on the containers as well as image distortion. The web modules of the disclosed machine "pull" the web material after label application. The dedicated servo motor closely controls web velocity and position while web tension is regulated at the supply spindle, thereby improving label registration accuracy on the container by more than 50%.

In addition, the web modules feature a Label Shuttle which is also driven by a dedicated servo motor for precise speed matching of the web with the container. The servo motor provides flexibility to handle speed matching without hardware changes. Shuttle changeover from one container to another is as simple as pushing a button to alter the software control of the shuttle servo motor. The servo motor further permits a wider range of shuttle travel allowing smaller label repeats which reduces label costs. Prior machines used a shuttle which included a machined cam, specially designed for each container to be labeled, to regulate the shuttle movement. Changeovers required that this cam be changed to one appropriate for the new container configuration.

In an alternate embodiment, the Label Shuttle moves in a linear fashion to remove web velocity errors, allowing for greater control range and shorter repeats versus the arcing motion of the disclosed shuttle. Driven by a servo motor system, a shuttle having a linear motion can accommodate a much larger range of label web repeats.

The web modules also feature a Platen driven by a dedicated servo motor to permit labeling oval containers with greater contour than possible with prior machines. Prior machines utilized a machined cam, specially designed for each container to be labeled, to regulate the prior art platen movement. This cam, combined with a pivoting platen, was very limited in the variety and severity of ovals that could be followed. The dedicated servo motor for controlling the platen eliminates restrictions caused by the prior art cam and makes changeovers from one container to another is as simple as pushing a button to change the software controlling the servo motor.

In an alternate embodiment, the platen travels in a linear fashion with respect to the containers being labeled thereby allowing for a greater contour range and higher labeling speed over the disclosed pivoting arrangement. A variety of linear actuators could be employed to impart this type of motion.

The platen further features a vertical adjustment control which allows height adjustment of the platen by itself leaving critical frame positioning undisturbed. In addition, the platen is removable for quick-changeovers without disturbing the alignment and position of the supporting structure.

The platen is mounted on an adjustable preheat & platen assembly which allows for accommodation of a wider range of package sizes. This allows the preheat and platen assembly to move relative to the module frame thereby increasing flexibility and removing the need to change critical web module frame positioning.

Dedicated servo motors for the label feed mechanism/unwind reel, described above as well as the rewind/waste reel provided improved web tension control. Prior machines utilized a simple electric friction brake regulated by a dancer providing minimal control. The dedicated servo motor arrangement permits larger rolls by powering the spindle holding the label roll and more consistent web tension, thereby balancing loads on the metering roller.

The web modules also feature sealed web guide rollers improve roller life, especially when operating in non-environmentally controlled areas. The design excludes contaminants prior to reaching the bearings which eliminates the use of sealed bearings to exclude contaminants which add undesirable friction.

The web modules further feature a single tooling plate and cartridge design which simplifies maintenance. Prior machine used a sandwich like structure of closely spaced tooling plates to support rotating shafts on the web modules which made servicing difficult in very cramped quarters, for example power transmission belts could not be replaced without first removing the rotating shaft. By using a single plate which houses individual cartridges that space bearings apart for rotating shaft assemblies, the mechanical systems are much easier to access, for example power transmission belts can be replaced without removing the rotating shaft.

The web module also supports larger spools permit larger label supply rolls, which reduces the frequency of roll changes. In an alternate embodiment, horizontal loading of rolls is incorporated for maximum label capacity.

It is therefore intended that the foregoing detailed description be regarded as illustrative rather than limiting, and that it be understood that it is the following claims, including all equivalents, that are intended to define the spirit and scope of this invention.

We claim:

1. A method for applying a heat transfer label to a contaminated article, said method comprising:

(a) filling said contaminated article with a product characterized by a first temperature;

(b) maintaining said first temperature within 1° F.;

(c) receiving said contaminated article after said filling by an in-feed mechanism;

(d) removing said contamination from said contaminated article;

(e) conveying said decontaminated article to a label applicator; and (f) applying a heat transfer label to said decontaminated article.

2. The method of claim 1, wherein said article comprises a surface characterized by a first surface temperature at the time of said in-feed mechanism receiving said article and a second surface temperature at the time said label applicator applies said heat transfer label to said article, said method comprising:

(g) heating said surface of said article such that said second surface temperature is no more than 2° F. above said first surface temperature.

3. The method of claim 1, further comprising:

(g) cooling said article prior to said receiving.

4. The method of claim 1, further comprising:

(g) applying said heat transfer label before said article becomes re-contaminated.

5. The method of claim 1, wherein said environmental contamination comprises condensation.

6. The method of claim 1, wherein said environmental contamination comprises dust.

7. The method of claim 1, wherein said removing further comprises blowing said environmental contamination off of said article.

8. The method of claim 7, wherein said blowing further comprises blowing ionized air.

9. The method of claim 1, wherein said removing further comprises at least one of evaporating, burning, or combination thereof said environmental contamination from said article.

10. The method of claim 1, wherein said removing further comprises sensing ambient environmental conditions and adjusting, automatically, said removal of said environmental contamination in response to said sensed ambient environmental conditions.

11. The method of claim 1 further comprising:

(g) sealing environmental contaminants out of said apparatus.

12. A method for applying a heat transfer label to a contaminated article, said method comprising:

(a) receiving said contaminated article by an in-feed mechanism;

(b) removing said contamination from said contaminated article;

(c) sensing ambient environmental conditions and adjusting, automatically, said removal of said environmental contamination in response to said sensed ambient environmental conditions;

(d) conveying said decontaminated article to a label applicator; and (e) applying a heat transfer label to said decontaminated article.

13. The method of claim 12, further comprising (f) filling said article with a product prior to said receiving.

14. The method of claim 13, wherein said product is characterized by a first temperature, said method further comprising:

(f) maintaining said first temperature within 1° F.

15. The method of claim 14, wherein said article comprises a surface characterized by a first surface temperature at the time of said in-feed mechanism receiving said article and a second surface temperature at the time said label applicator applies said heat transfer label to said article, said method comprising:

(g) heating said surface of said article such that said second surface temperature is no more than 2° F. above said first surface temperature.

16. The method of claim 12, further comprising (f) cooling said article prior to said receiving.

17. The method of claim 12, further comprising:

(f) applying said heat transfer label before said article becomes re-contaminated.

18. The method of claim 12, wherein said environmental contamination comprises condensation.

19. The method of claim 12, wherein said environmental contamination comprises dust.

20. The method of claim 12, wherein said removing further comprises blowing said environmental contamination off of said article.

21. The method of claim 20, wherein said blowing further comprises blowing ionized air.

22. The method of claim 12, wherein said removing further comprises at least one of evaporating, burning, or combination thereof said environmental contamination from said article.

23. The method of claim 12 further comprising:

(f) sealing environmental contaminants out of said apparatus.

24. An apparatus for applying a heat transfer label to an article, said apparatus comprising:

an in-feed mechanism, said in-feed mechanism operable to receive said article and remove environmental contamination from said article prior to said article having a heat transfer label applied;

a label applicator operative to apply a heat transfer label to said article; and a conveyor coupled with said in-feed mechanism and said label applicator and operative to convey said article from said in-feed mechanism to said label applicator;

wherein said article is filled with a chilled content characterized by a first temperature, said apparatus operative to apply said label to said article without raising said first temperature by more than 1° F.

25. The apparatus of claim 24, wherein said article is characterized by:

a first surface temperature at the time said in-feed mechanism receives said article; and a second surface temperature at the time said label applicator applies said heat transfer label to said article; and wherein said second surface temperature is no more than 2° F. above said first surface temperature; and further wherein said first temperature of said chilled content is not raised by more than 1° F. during said conveyance.

26. The apparatus of claim 24, wherein said conveyor and said label applicator are operative to apply said heat transfer label before said article becomes re-contaminated.

27. The apparatus of claim 24, wherein said environmental contamination comprises condensation.

28. The apparatus of claim 24, wherein said environmental contamination comprises dust.

29. The apparatus of claim 24, wherein said in-feed mechanism comprises an air-knife operable to blow said environmental contamination off of said article.

30. The apparatus of claim 29, wherein said air knife utilizes ionized air to blow said environmental contamination off of said article.

31. The apparatus of claim 24, wherein said in-feed mechanism comprises a heat source operative to at least one of evaporate, burn, or combination thereof said environmental from said article.

32. The apparatus of claim 24, wherein said in-feed mechanism comprises a sensor operative to sense ambient environmental conditions, said in-feed mechanism being further operative to automatically adjust said removal of said environmental contamination in response to said sensed ambient environmental conditions.

33. The apparatus of claim 24, further comprising an environmental seal operative to keep said environmental contaminants out of said apparatus.

34. An apparatus for applying a heat transfer label to an article, said apparatus comprising:

an in-feed mechanism, comprising:

a sensor operative to sense ambient environmental conditions;

wherein said in-feed mechanism is operable to receive said article, remove environmental contamination from said article prior to said article having a heat transfer label applied, and automatically adjust said removal of said environmental contamination in response to said sensed ambient environmental conditions;

a label applicator operative to apply a heat transfer label to said article; and a conveyor coupled with said in-feed mechanism and said label applicator and operative to convey said article from said in-feed mechanism to said label applicator.

35. The apparatus of claim 34, wherein said article is filled.

36. The apparatus of claim 34, wherein said article is chilled.

37. The apparatus of claim 34, wherein said article is filled with a chilled content characterized by a first temperature, said apparatus operative to apply said label to said article without raising said first temperature by more than 1° F.

38. The apparatus of claim 37, wherein said article is characterized by:

a first surface temperature at the time said in-feed mechanism receives said article; and a second surface temperature at the time said label applicator applies said heat transfer label to said article; and wherein said second surface temperature is no more than 2° F. above said first surface temperature; and further wherein said first temperature of said chilled content is not raised by more than 1° F. during said conveyance.

39. The apparatus of claim 34, wherein said conveyor and said label applicator are operative to apply said heat transfer label before said article becomes re-contaminated.

40. The apparatus of claim 34, wherein said environmental contamination comprises condensation.

41. The apparatus of claim 34, wherein said environmental contamination comprises dust.

42. The apparatus of claim 34, wherein said in-feed mechanism comprises an air-knife operable to blow said environmental contamination off of said article.

43. The apparatus of claim 42, wherein said air knife utilizes ionized air to blow said environmental contamination off of said article.

44. The apparatus of claim 34, wherein said in-feed mechanism comprises a heat source operative to at least one of evaporate, burn, or combination thereof said environmental contamination from said article.

45. The apparatus of claim 34 further comprising an environmental seal operative to keep said environmental contaminants out of said apparatus.

* * * * *